(12) United States Patent
Masui

(10) Patent No.: US 8,493,578 B2
(45) Date of Patent: Jul. 23, 2013

(54) PIXEL CLOCK GENERATOR AND IMAGE FORMING APPARATUS

(75) Inventor: Naruhiro Masui, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 224 days.

(21) Appl. No.: 12/998,063

(22) PCT Filed: Sep. 15, 2009

(86) PCT No.: PCT/JP2009/066572
§ 371 (c)(1),
(2), (4) Date: Mar. 14, 2011

(87) PCT Pub. No.: WO2010/032862
PCT Pub. Date: Mar. 25, 2010

(65) Prior Publication Data
US 2011/0164273 A1 Jul. 7, 2011

(30) Foreign Application Priority Data
Sep. 16, 2008 (JP) .................. 2008-236561

(51) Int. Cl.
*B41J 2/435* (2006.01)
*H04N 1/40* (2006.01)
(52) U.S. Cl.
USPC .......... 358/1.13; 358/471; 347/243; 347/247; 347/249; 347/250; 345/213; 455/260; 455/313
(58) Field of Classification Search
USPC ............... 358/471, 1.13, 1.14, 1.15; 347/249, 347/243, 247, 250; 345/213; 455/260, 313
See application file for complete search history.

(56) References Cited

U.S. PATENT DOCUMENTS
4,622,593 A 11/1986 Curry
4,635,000 A * 1/1987 Swanberg .................. 331/10
(Continued)

FOREIGN PATENT DOCUMENTS
EP 0 265 845 5/1988
EP 0 581 083 2/1994
(Continued)

OTHER PUBLICATIONS
Extended European Search Report dated Feb. 13, 2012.
(Continued)

*Primary Examiner* — Dennis Dicker
(74) *Attorney, Agent, or Firm* — Harness, Dickey & Pierce, P.L.C.

(57) ABSTRACT

A pixel clock generator includes a frequency divider 4 that generates a pixel clock PCLK based on a high frequency clock VCLK, a comparator 5 that calculates an error Lerr in the time obtained by integrating a cycle of the pixel clock PCLK for a target number RefN from a time when synchronization signals SPSYNC and EPSYNC are detected, a filter 6, and a frequency calculating unit 7 that sets a frequency dividing value M of the frequency divider 4. The filter 6 and the frequency calculating unit 7 calculate an average of a frequency of the pixel clock PCLK based on the error Lerr, determine a reference error value from the error Lerr in N-cycles, calculate offset values of the frequencies of N pieces of pixel clocks PCLK based on a difference between the reference error value and the error Lerr, and calculate the frequency dividing value M based on a result obtained by adding the circularly selected offset values and the average of the frequency of the pixel clock PCLK.

8 Claims, 34 Drawing Sheets

U.S. PATENT DOCUMENTS

| | | | |
|---|---|---|---|
| 4,872,065 A | 10/1989 | Isono et al. | |
| 4,893,136 A | 1/1990 | Curry | |
| 4,920,430 A | 4/1990 | Isono et al. | |
| 5,086,223 A | 2/1992 | Hidaka | |
| 5,453,851 A | 9/1995 | Faulhaber | |
| 6,178,031 B1 | 1/2001 | Rauch et al. | |
| 6,310,681 B1 * | 10/2001 | Taniwaki | 355/55 |
| 6,806,896 B2 * | 10/2004 | Conrow et al. | 347/248 |
| 7,009,430 B2 * | 3/2006 | Nihei et al. | 327/141 |
| 7,463,278 B2 * | 12/2008 | Ozasa et al. | 347/249 |
| 7,589,846 B2 * | 9/2009 | Yoshida | 358/1.13 |
| 7,791,634 B2 * | 9/2010 | Masui et al. | 347/249 |
| 2005/0275713 A1 * | 12/2005 | Kawai | 347/250 |
| 2007/0206234 A1 | 9/2007 | Ozasa et al. | |

FOREIGN PATENT DOCUMENTS

| | | |
|---|---|---|
| JP | 2000-152001 | 5/2000 |
| JP | 2001-183600 | 7/2001 |
| JP | 2003-103830 | 4/2003 |
| JP | 2004-262101 | 9/2004 |
| JP | 2006-076114 | 3/2006 |
| JP | 2006-305780 | 11/2006 |
| JP | 2007-229932 | 9/2007 |
| JP | 2008-143062 | 6/2008 |

OTHER PUBLICATIONS

International Search Report dated Dec. 22, 2009.

* cited by examiner

PIXEL CLOCK GENERATOR AND IMAGE FORMING APPARATUS

TECHNICAL FIELD

The present invention relates to a pixel clock generator and an image forming apparatus. More specifically, the present invention relates to a pixel clock generator used in laser printers, digital copiers, and the like, and an image forming apparatus including the pixel clock generator.

BACKGROUND ART

FIG. 36 is a general schematic configuration of a conventional image forming apparatus. As shown in FIG. 36, laser light output from a semiconductor laser unit 1009 is scanned by a rotating polygon mirror 1003, and forms an optical spot on a photosensitive element 1001, which is a medium to be scanned, via a scanning lens 1002. An electrostatic latent image is formed on the photosensitive element 1001 by exposing the photosensitive element 1001. At this time, a photodetector 1004 detects the laser light on each line.

A phase synchronization circuit 1006 generates a pixel clock whose phase is synchronized with a detection signal of the photodetector 1004, for each line, based on a clock generated by a clock generation circuit 1005. The phase synchronization circuit 1006 supplies the generated pixel clock to an image processing unit 1007 and a laser drive circuit 1008.

The semiconductor laser unit 1009 controls the emission time of the semiconductor laser, based on image data generated by the image processing unit 1007, and the pixel clock whose phase is adjusted by the phase synchronization circuit 1006 for each line. Accordingly, the semiconductor laser unit 1009 controls a forming position of the electrostatic latent image on the photosensitive element 1001.

In such a scanning optical system, the fluctuation of scanning speed results in the fluctuation of the image, thereby deteriorating the image quality. In particular, in a color image, color shift occurs due to the positional misalignment of dots of each color in the main scanning direction, thereby deteriorating color reproducibility and resolution. Accordingly, it is necessary to correct the fluctuation in scanning speed to obtain a high-quality image.

The fluctuation (error) in scanning speed may be broadly classified as follows:

(1) Error of Each Surface of Polygon Mirror (for Each Scanning Line) (Hereinafter, Appropriately Referred to as "Error of Each Surface")

A factor for the fluctuation of the scanning speed includes the fluctuation of distance from a rotation axis of a deflector such as a polygon mirror to a deflection reflection surface (in other words, eccentricity of the polygon mirror), and the irregularity of each surface of the polygon mirror. This type of error is an error with a periodicity of few lines (for example, the number of lines corresponding to the number of surfaces of the polygon mirror).

(2) Error Due to Fluctuation in Average Scanning Speed

The average scanning speed is an average speed for scanning each surface of the polygon mirror. A factor for the fluctuation in the scanning speed includes the fluctuation of rotation speed of the polygon mirror, and the fluctuation of the scanning optical system due to various environmental fluctuations such as temperature, humidity, and vibration. When the temperature or the like varies, the oscillation wavelength of the semiconductor laser, which is a light source, changes. Accordingly, the scanning speed sometimes varies due to the chromatic aberration of the scanning optical system. This type of error varies relatively slowly.

For example, in a multi-beam optical system, such as a semiconductor laser array that includes a plurality of light sources and performs simultaneous scanning with a plurality of light beams with a common scanning optical system, the following scanning speed fluctuation occurs.

(3) Error of Each Light Source

The main factors in the error of each light source include a difference between oscillation wavelengths of the light sources, and the fluctuation of the scanning speed depending on the chromatic aberration of the scanning optical system. Because the oscillation wavelength varies depending on each light source, the error described in (2) may differ from one light source to another. The scanning speed of the beam also differs by the assembling accuracy of the light sources.

In a multi-color image forming apparatus (referred to as "tandem-type") including a plurality of photosensitive bodies and scanning optical systems, the scanning speed difference between the scanning optical systems described below, significantly influences the image quality.

(4) Error of Each Scanning Optical System

The main factor in the error of each scanning optical system includes poor manufacturing accuracy, poor assembling accuracy, and deformation and the like with the elapse of time, of the parts of the scanning optical system. Due to the different light sources, the error described in (3) will also occur. Because the average scanning speed is different, the errors described in (1) and (2) also occur, respectively.

In such image forming apparatuses, some apparatuses commonly use a part of the scanning optical system. However, even in such an event, each optical path from the light source to a photosensitive element, which is a medium to be scanned, is different. Accordingly, the error occurs in each scanning optical system.

To correct the error of the scanning speed, for example, the frequency of the pixel clock may be changed based on the scanning speed (for example, refer to Patent Document 1 (Japanese Patent Application Laid-open Publication No. 2001-183600)). Here, the frequency of the oscillator that generates a pixel clock is controlled, so that the number counted by the pixel clock from the start to the end of the scanning may be a predetermined value (so-called phase locked loop (PLL) control).

However, in such a conventional technology, the frequency of the reference clock that performs phase comparison is the frequency of one line. Accordingly, the frequency is extremely low (a few thousandths to a few ten thousandths) compared with the frequency of the pixel clock that oscillates. Accordingly, sufficient PLL open loop gain cannot be obtained, whereby sufficient control accuracy cannot be obtained.

Because the conventional image forming apparatus is fragile against external disturbance, and the frequency of the pixel clock tends to vary. Accordingly, it is not possible to generate an accurate pixel clock. To correct the error of each surface, a control voltage of a voltage controlled oscillator (VCO), which is an oscillator, is changed for each scan. Accordingly, it takes some time until the pixel clock starts to oscillate stably.

The error of the scanning speed may also be corrected, by controlling the phase of the pixel clock based on the generated high frequency clock (for example, refer to Patent Document 2 (Japanese Patent Application Laid-open Publication No. 2004-262101)). Here, the phase of the pixel clock is controlled, so that the number counted by the high frequency clock from the start to the end of the scanning may be a predetermined value.

The high frequency clock is accurate, because it is generated from a reference clock generated by an accurate oscillator such as a crystal oscillator. Because the phase of the pixel clock is controlled based on the high frequency clock, the control accuracy of the pixel clock will also be improved.

However, in such a conventional technology, the error of the scanning speed is corrected by appropriately controlling the phase of the pixel clock. To do so, phase control data for one scanning line needs to be generated. In addition, to reduce a local deviation due to the phase change of the pixel clock, in other words, to generate a highly accurate pixel clock, high resolution phase control is necessary. Accordingly, the phase control data will be increased.

It is not easy to generate the phase control data quickly and accurately, and an extremely high speed control circuit is required to perform real-time control. Accordingly, it is not easy to perform the conventional technology. The phase control data also needs to be generated for each surface, to correct the error in each surface. Accordingly, a large amount of phase control data needs to be generated and stored to perform highly accurate correction. Accordingly, it is not easy to perform the conventional technology.

The scanning speed also varies as the following, while scanning one line, due to the accuracy error and the assembly error of the units in the scanning optical system.

(5) Nonlinear Error

FIG. 37 (a) is an example of a nonlinear error in the scanning speed of one line. A horizontal axis x is a position of a scanning line, and a vertical axis is a scanning speed V(x) corresponding to the position x. A dashed-dotted line Vavg is an average of the scanning speed of one line. When the scanning speed varies in this manner, a deviation $\Delta$ is generated as shown in FIG. 37 (b). The deviation $\Delta$ is a deviation from the ideal value obtained by scanning at a constant speed.

The deviation $\Delta$ represents a misalignment of dots, and degrades image quality. If scanning is performed in the direction towards the position X1 from X2, in FIG. 37, the deviation $\Delta$ from the ideal value is as shown by the dotted line. Accordingly, in particular, if the scanning is performed in both directions, in the scanning optical system in which an asymmetric misalignment is generated about the scanning center, the color shift is increased and the image quality degrades significantly. The amount and distribution of the nonlinear error may differ in each surface, depending on the accuracy of each surface of the polygon mirror. The error also varies in each scanning optical system.

To correct the nonlinear error in the scanning speed, the frequency of the pixel clock may be modified and corrected, corresponding to the position in the scanning line (for example, refer to Patent Document 3 (Japanese Patent. Application Laid-open Publication No. 2000-152001)).

However, in such a conventional technology, the center frequency of the pixel clock is generated in a similar manner to the conventional one. Accordingly, the accurate pixel clock as described above cannot be generated, and it is difficult to sufficiently correct the pixel clock. Consequently, it is not sufficient for obtaining a high quality image.

To solve such problems, there is a method of generating a pixel clock for correcting any scanning speed errors and nonlinear errors that would occur as described above in (1) to (5) with high accuracy (for example, refer to Patent Document 4 (Japanese Patent Application Laid-open Publication No. 2006-305780) and Patent Document 5 (Japanese Patent Application Laid-open Publication No. 2007-229932)).

However, in the conventional technologies disclosed in the Patent Documents 4 and 5, a relatively high frequency jitter (for example, jitter generated in several tens cycles) may remain in the rotation fluctuation (jitter), if the rotation speed of the polygon mirror is accelerated to increase the speed of the device.

Accordingly, in the above conventional technologies, high speed pull-in is performed by controlling and reducing the errors in all the surfaces, until the frequency of the pixel clock of each surface falls within a predetermined error range. After the frequency of the pixel clock of each surface fell within a predetermined error range, the error between the surfaces is lowered, by separately controlling each surface.

However, when the frequency of the pixel clock of each surface fell within a predetermined error range, the control is performed by obtaining an error of each surface (once every time the polygon mirror rotates), and by using the obtained error. Accordingly, the sampling frequency is reduced, thereby reducing the gain.

For example, if the polygon mirror has six surfaces, and the error is sampled in all the surfaces, the gain is reduced to a sixth, compared with before when the frequency of the pixel clock of each surface fell within a predetermined error range.

In the conventional technologies, the control bandwidth cannot be increased to stably control a system that, has a useless time of one sampling time (for example, for the stable control, the control bandwidth can only be increased up to about a few tenth to a tenth of the sampling frequency). Accordingly, there is a problem that high frequency jitter of several tens cycles cannot be suppressed sufficiently.

The present invention has been made in view of the above circumstances and intended to provide a pixel clock generator and an image forming apparatus that can increase the control bandwidth, even if the speed of the device is increased, and that can sufficiently suppress high frequency jitter.

DISCLOSURE OF INVENTION

According to one aspect of the present invention, there is provided a pixel clock generator including: a high frequency clock generating unit that generates a high frequency clock; a pixel clock generating unit that generates a pixel clock based on the high frequency clock; an error calculating unit that detects a first synchronization signal and a second synchronization signal, and calculates an error between a first time period starting from a time when the first synchronization signal is detected until a time when the second synchronization signal is detected and a second time period obtained by integrating a cycle of the pixel clock for a target number of times; and a frequency setting unit that sets a frequency of the pixel clock to be generated by the pixel clock generating unit based on the error calculated by the error calculating unit. The frequency setting unit includes a pixel clock frequency average calculating unit that calculates an average of the frequency of the pixel clock based on the error calculated by the error calculating unit, and a pixel clock frequency offset value calculating unit that determines a reference error value from an error in N-cycles that is a predetermined operation cycle from the error calculated by the error calculating unit, and calculates offset values of frequencies of N pieces of pixel clocks based on a difference between the reference error value and the error. The frequency setting unit circularly selects the N pieces of offset values calculated by the pixel clock frequency offset value calculating unit, and calculates the frequency of the pixel clock generated by the pixel clock generating unit based on a result obtained by adding selected offset values and the average of the frequency of the pixel clock calculated by the pixel clock frequency average calculating unit.

With this configuration, a pixel clock generator according to the present invention controls an average of the frequency of a pixel clock and the offset value of the frequency of the pixel clock in parallel, corresponding to the fluctuation of the scanning time, and sets the frequency of the pixel clock based on the addition result. Accordingly, the control bandwidth can be increased even if the speed of the device is increased, thereby sufficiently suppressing high frequency jitter.

It is also possible that a pixel clock frequency offset value calculating unit determines an average of errors in N-cycles calculated by an error calculating unit as a reference error. Any one of the errors in the N-cycles calculated by the error calculating unit may be determined as the reference error.

Furthermore, the frequency setting unit further includes a frequency correcting unit that divides the first time period into a plurality of time windows, and corrects the frequency of the pixel clock to be generated by the pixel clock generating unit based on predetermined frequency modulation data for each of the time windows.

With this configuration, the pixel clock generator according to the present invention can generate a highly accurate pixel clock in which the nonlinear error is also corrected, because the frequency of the pixel clock is corrected for each divided time window.

Moreover, the pixel clock generator further includes a stop processing unit that stores the average of the frequency of the pixel clock, the offset values of the frequencies of the N pieces of pixel clocks, and a first error difference pattern that is composed of a difference between the reference error value and each of the N pieces of errors before the pixel clock generator is stopped in a storage medium, and a start processing unit that sets the average of the frequency of the pixel clock stored in the storage medium as the average calculated by the pixel clock frequency average calculating unit, sets the offset values of the frequencies of the N pieces of pixel clocks as the offset values calculated by the pixel clock frequency offset value calculating unit, obtains a second error difference pattern that is composed of a difference between each of the N pieces of errors calculated by the error calculating unit and the reference error value determined by the error calculating unit, and changes a phase of the operation cycle so that the first error difference pattern and the second error difference pattern come closest.

With this configuration, the pixel clock generator according to the present invention can store the values of the units in a storage medium before stopping, and sets the values stored in the storage medium as initial values, at the start of operation. Accordingly, the correction time of the frequency of the pixel clock is reduced, thereby reducing the start-up time.

Furthermore, according to another aspect of the present invention, there is provided an image forming apparatus that forms an image by driving a light source by a pulse modulation signal obtained by pulse-modulating image data based on a pixel clock scanning a target medium with a light beam output from the light source. The image forming apparatus includes: a high frequency clock generating unit that generates a high frequency clock; a pixel clock generating unit that generates the pixel clock based on the high frequency clock; an error calculating unit that detects a first synchronization signal corresponding to a scanning start point and a second synchronization signal corresponding to a scanning end point, and calculates an error between a first time period starting from a time when the first synchronization signal is detected until a time when the second synchronization signal is detected and a second time period obtained by integrating a cycle of the pixel clock for a target number of times; and a frequency setting unit that sets a frequency of the pixel clock to be generated by the pixel clock generating unit based on the error calculated by the error calculating unit. The frequency setting unit includes a pixel clock frequency average calculating unit that calculates an average of the frequency of the pixel clock based on the error calculated by the error calculating unit, and a pixel clock frequency offset value calculating unit that determines a reference error value from an error in N-cycles that is a predetermined operation cycle from the error calculated by the error calculating unit, and calculates offset values of frequencies of N pieces of pixel clocks based on a difference between the reference error value and the error. The frequency setting unit circularly selects the N pieces of offset values calculated by the pixel clock frequency offset value calculating unit, and calculates the frequency of the pixel clock generated by the pixel clock generating unit based on a result obtained by adding selected offset values and the average of the frequency of the pixel clock calculated by the pixel clock frequency average calculating unit.

With this configuration, the image forming apparatus according to the present invention controls the average of the frequency of the pixel clock and the offset value of the frequency of the pixel clock in parallel, corresponding to the fluctuation of the scanning time, and sets the addition result as the frequency of the pixel clock. Accordingly, the control bandwidth can be increased, even if the speed of the device is increased, thereby sufficiently suppressing high frequency jitter.

Moreover, the frequency setting unit further includes a frequency correcting unit that divides the first time period into a plurality of time windows, and corrects the frequency of the pixel clock to be generated by the pixel clock generating unit based on predetermined frequency modulation data for each of the time windows.

With this configuration, the image forming apparatus according to the present invention corrects the frequency of the pixel clock for each divided time window. Accordingly, it is possible to generate a highly accurate pixel clock in which the nonlinear error is also corrected.

Furthermore, the image forming apparatus further includes an optical scanner that includes a polygon mirror including a plurality of deflection reflection surfaces provided at a periphery of a rotation axis thereof, and scans the target medium with the light beam incident on the polygon mirror by deflecting the light beam, and a number N of the offset values calculated by the pixel clock frequency offset value calculating unit is determined to be same as number of the deflection reflection surfaces of the polygon mirror.

The present invention can advantageously provide the pixel clock generator and the image forming apparatus that can increase the control bandwidth even if the speed of the device is increased, and that can sufficiently suppress high frequency jitter.

BEST MODE(S) FOR CARRYING OUT THE INVENTION

Exemplary embodiments according to the present invention are described below with reference to the accompanying drawings.

First Embodiment

Figure 1:
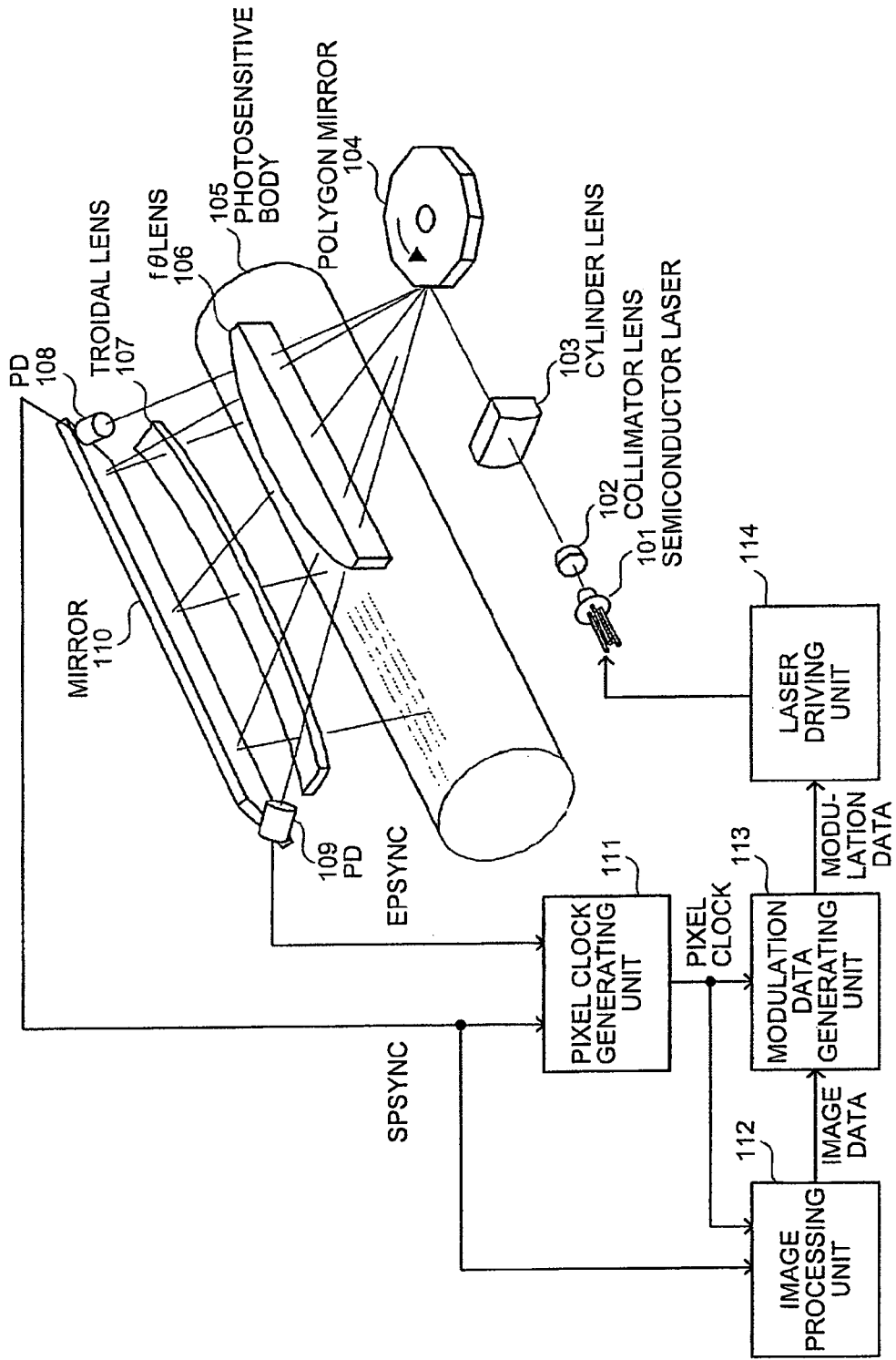
FIG. 1 is a schematic configuration of an image forming apparatus according to a first embodiment of the present invention.

As shown in FIG. 1, an image forming apparatus according to the present embodiment includes a semiconductor laser 101, a collimator lens 102, a cylinder lens 103, a polygon mirror 104, a photosensitive element 105, an fθ lens 106, a toroidal lens 107, photodetectors (hereinafter, simply referred to as "PD") 108 and 109, a mirror 110, a pixel clock generating unit 111, an image processing unit 112, a modulation data generating unit 113, and a laser driving unit 114.

In the present embodiment, the collimator lens 102, the cylinder lens 103, the polygon mirror 104, the fθ lens 106, the toroidal lens 107, and the mirror 110 form an optical scanner of the present invention.

Laser light (beam) output from the semiconductor laser 101, which is a light source, passes through the collimator lens 102 and the cylinder lens 103 to be shaped. The laser light enters the polygon mirror 104, which is a polariscope, to which a plurality of deflection reflection surfaces (hereinafter, simply referred to as "surface") are provided at a periphery of a rotation axis thereof. Accordingly, the laser light is reflected so as to periodically scan the photosensitive element 105, which is a medium to be scanned.

The laser light reflected by the polygon mirror 104 passes through the fθ lens 106, the mirror 110, and the toroidal lens 107, illuminates the photosensitive element 105, and forms an optical spot. Accordingly, an electrostatic latent image corresponding to the output of the semiconductor laser 101 is formed on the photosensitive element 105.

PDs 108 and 109 are arranged at both ends of the mirror 110, and the PDs 108 and 109 detect the start and the end of the scan, respectively. In other words, the laser light reflected by the polygon mirror 104 is led into the PD 108 before scanning a line on the photosensitive element 105, and led into the PD 109 after the scan is completed.

The PDs 108 and 109 convert the entering laser light to a first synchronization signal SPSYNC and a second synchronization signal EPSYNC, respectively, and supply the signals to the pixel clock generating unit 111.

The pixel clock generating unit 111 measures the time interval during which the laser light performs scanning between the PD 108 and the PD 109, from the two synchronization signals SPSYNC and EPSYNC. The pixel clock generating unit 111 then generates a pixel clock PCLK of a frequency obtained so that a predetermined target number of clocks fall within the time interval, and supplies the generated pixel clock PCLK to the image processing unit 112 and the modulation data generating unit 113.

The first synchronization signal SPSYNC, which is an output signal from the PD 108, is also supplied to the image processing unit 112, as a line synchronization signal. The image processing unit 112 generates image data based on the pixel clock PCLK.

The modulation data generating unit 113 generates modulation data from the entering image data based on the pixel clock PCLK. The laser driving unit 114 drives the semiconductor laser 101, based on the modulation data generated by the modulation data generating unit 113.

Figure 2:
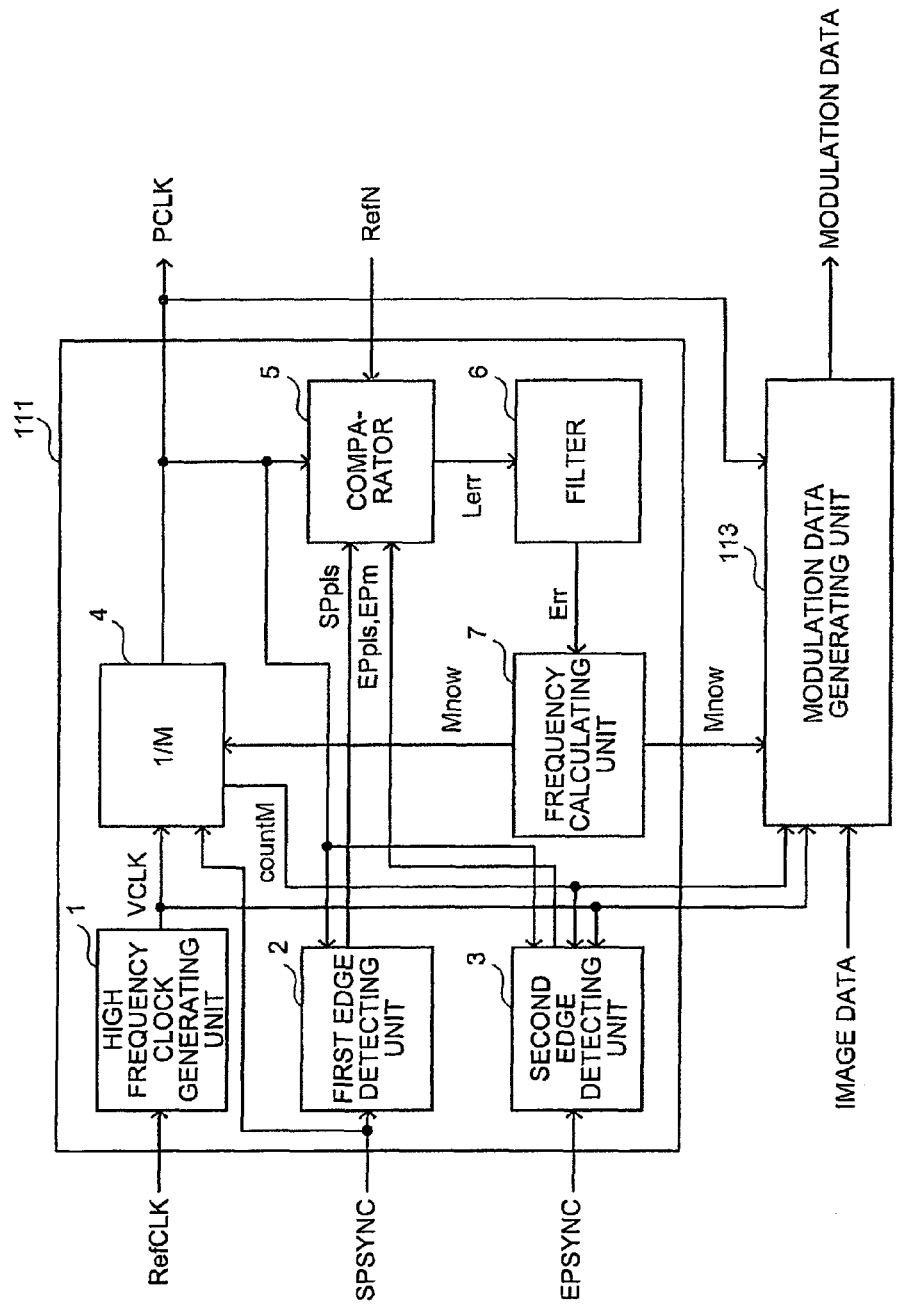
FIG. 2 is a schematic of a pixel clock generating unit and a modulation data generating unit included in the image forming apparatus according to the first embodiment.

As shown in FIG. 2, the pixel clock generating unit 111 includes a high frequency clock generating unit 1, a first edge detecting unit 2, a second edge detecting unit 3, a frequency divider 4, a comparator 5, a filter 6, and a frequency calculating unit 7.

The frequency divider 4 is a pixel clock generating unit of the present invention, the comparator 5 is an error calculating unit of the present invention, and the filter 6 and the frequency calculating unit 7 are a frequency setting unit of the present invention.

The high frequency clock generating unit 1 is formed of a general PLL circuit, and generates a high frequency clock VCLK obtained by multiplying a reference clock RefCLK. As a reference clock RefCLK supplied to the high frequency clock generating unit 1, for example, the high frequency clock generating unit 1 can generate an accurate high frequency clock VCLK, by using a clock generated by an accurate crystal oscillator The first edge detecting unit 2 detects the rise of the first synchronization signal SPSYNC, based on the high frequency clock VCLK. On detecting the rise of the synchronization signal SPSYNC, the first edge detecting unit 2 outputs a detection pulse SPpls synchronized with the pixel clock PCLK to the comparator 5.

The second edge detecting unit 3 detects the rise of the second synchronization signal EPSYNC, based on the high frequency clock VCLK. On detecting the rise of the synchronization signal EPSYNC, the second edge detecting unit 3 outputs a detection pulse EPpls and a count value EPm of the frequency divider 4, to the comparator 5.

The frequency divider 4 generates a pixel clock PCLK obtained by frequency dividing the high frequency clock VCLK generated by the high frequency clock generating unit 1 by M. The frequency divider 4, for example, includes an M counter. A count value countM obtained by counting the high frequency clock VCLK is output to the second edge detecting unit 3 and the modulation data generating unit 113.

Because the frequency divider 4 starts counting at the rise of the synchronization signal SPSYNC, the pixel clock generating unit 111 can generate a pixel clock whose phase is synchronized with the scanning start point.

A frequency dividing ratio M in the frequency divider 4 is changed, according to a pixel clock frequency instruction signal Mnow output from the frequency calculating unit 7. In this manner, the frequency divider 4 generates the pixel clock PCLK by frequency dividing the high frequency clock VCLK oscillated stably with high accuracy. Accordingly, when the frequency dividing ratio M is changed, the frequency of the pixel clock PCLK can be changed quickly and stably. Consequently, even if the frequency is changed for each line, it is possible to shift quickly.

The comparator 5 measures a time Tline between the two synchronization signals SPSYNC and EPSYNC, based on the high frequency clock VCLK. The comparator 5 then calculates a difference between a reference time RefN determined in advance based on the writing frequency and a distance between the two photodetectors PDs 108 and 109, and the measured time Tline, as an error Lerr of a line to be measured (hereinafter, referred to as a "target line"). In other words, the comparator 5 calculates an error of the scanning speed, based on the difference between an appropriate scanning time (reference time RefN) and the scanning time Tline of the target line.

The comparator 5 may calculate the error Lerr, by counting based on the high frequency clock VCLK. However, because the frequency of the high frequency clock VCLK is very high, a number of bits need to be counted. Accordingly, it is disadvantageous in terms of circuit scale and power consumption.

Accordingly, in the present embodiment, the comparator 5 measures time Tline based on the pixel clock PCLK, and compares the measured time Tline with the reference time RefN. The comparator 5 then calculates the error Lerr of the target line based on the high frequency clock.

Figure 3:
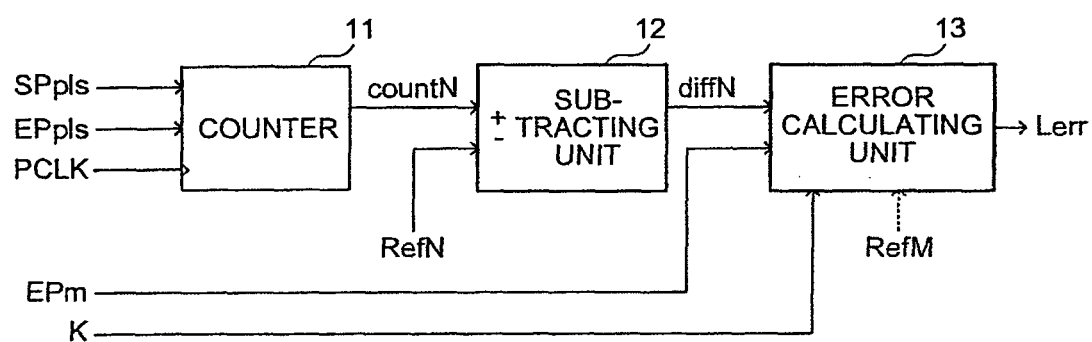
FIG. 3 is a schematic of a comparator included in the image forming apparatus according to the first embodiment.

As shown in FIG. 3, the comparator 5 includes a counter 11, a subtracting unit 12, and an error operating unit 13. The counter 11 counts a value based on the pixel clock PCLK, and outputs the count value countN to the subtracting unit 12. The count value countN is reset to "0" by SPpls, and the counting is stopped by EPpls.

The subtracting unit 12 outputs diffN obtained by subtracting the reference time RefN from a count value n obtained when the counter 11 stopped counting, to the error operating unit 13.

The error operating unit 13 performs the following operation (Equation 1), by using diffN output from the subtracting unit 12, a frequency setting value K of the line previous to the target line, and a count value EPm output from the second edge detecting unit 3. The error operating unit 13 then outputs an error Lerr using a cycle Tv of the high frequency clock VCLK as a unit. The frequency setting value K is an actual number of an average of one line of the frequency dividing ratio M set in the frequency divider 4, and can be obtained from a setting value holding unit 329, which will be described later, of the frequency calculating unit 7.

$$Lerr = diffN \cdot K + EPm \quad \text{(Equation 1)}$$

If the distance between the two photodetectors PDs 108 and 109 is not an integral multiple of the dot width, in other words, if the distance is not an integral multiple of the pixel clock cycle targeted by the reference time RefN, the error operating unit 13 may convert the fraction into the number of cycles of the high frequency clock VCLK, and carries out the following operation (Equation 2), using the converted value as RefM. Accordingly, the frequency of the pixel clock can be controlled more precisely.

$$Lerr = \text{diff}N \cdot K + EPm - RefM \qquad \text{(Equation 2)}$$

Figure 4:
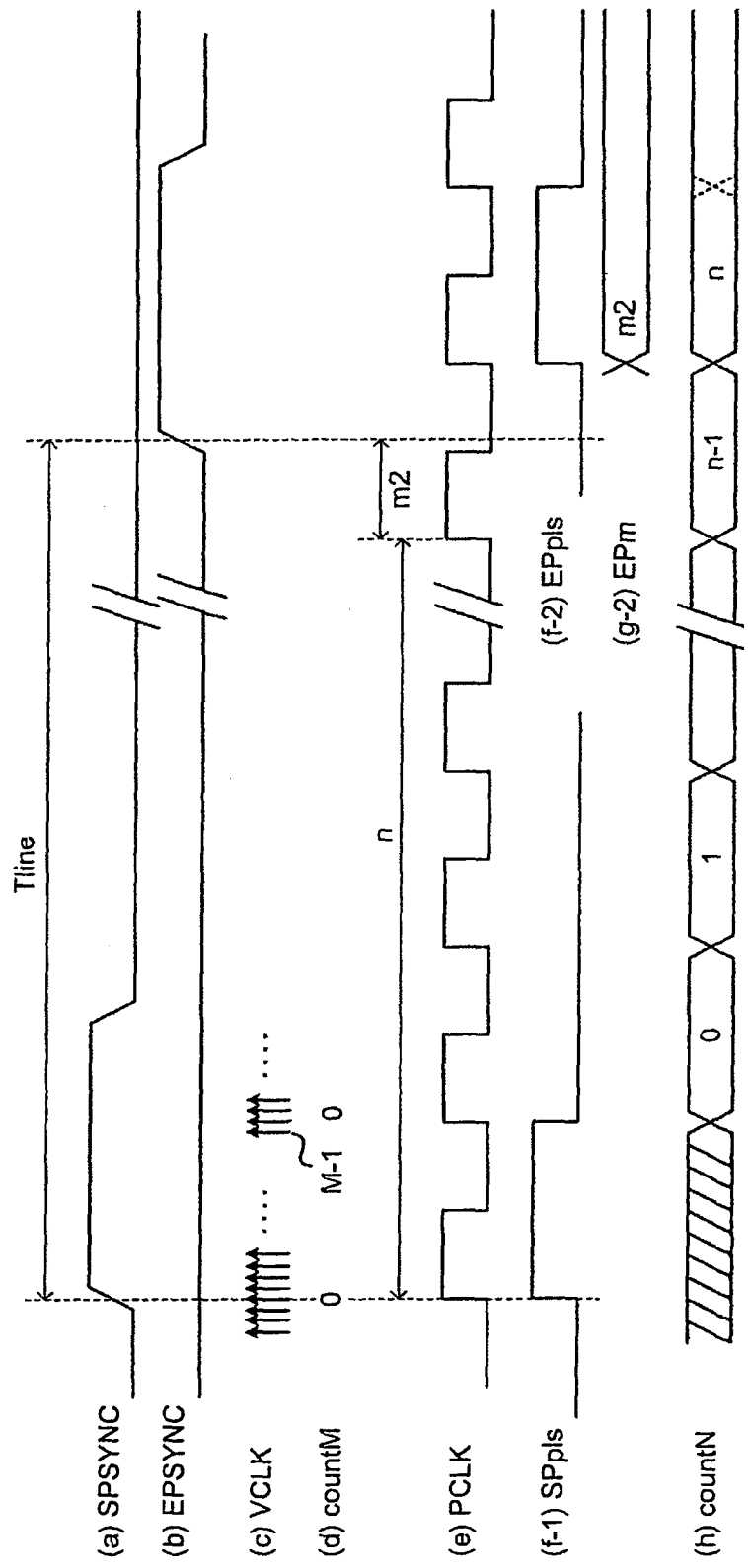
FIG. 4 is a timing chart for explaining an operation performed by the comparator included in the image forming apparatus according to the first embodiment.

FIG. 4 is a timing chart for explaining an operation performed by the comparator 5.

In FIG. 4, (a) is the first synchronization signal SPSYNC, (b) is the second synchronization signal EPSYNC, (c) is a rising edge of the high frequency clock VCLK, (d) is the count value countM of the frequency divider 4, and (e) is the pixel clock PCLK, respectively.

(f-1) is the detection pulse SPpls output from the first edge detecting unit 2, (f-2) is the detection pulse EPpls output from the second edge detecting unit 3, (g-2) is the count value EPm output from the second edge detecting unit 3, and (h) is a value of the counter 11 of the comparator 5, respectively.

In this manner, the comparator 5 calculates an error Lerr of the target line, at the first rising time of the pixel clock PCLK, after the scanning of one line is finished.

Figure 5:
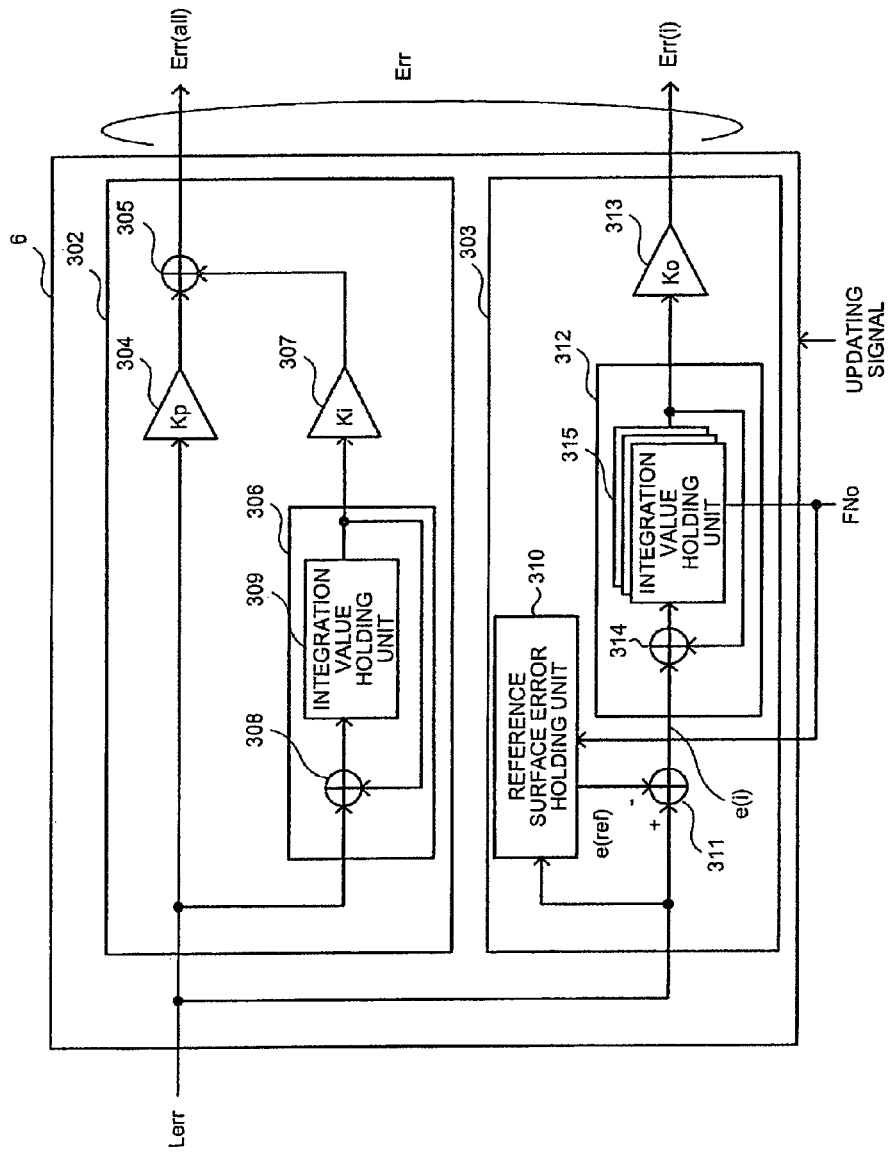
FIG. 5 is a schematic of a filter included in the pixel clock generating unit according to the first embodiment.

As shown in FIG. 5, the filter 6 includes an average surface error smoothing unit 302 and a surface error smoothing unit 303. The average surface error smoothing unit 302 outputs average surface error data Err(all) obtained by smoothing the error Lerr calculated for each surface of the polygon mirror 104.

The average surface error smoothing unit 302 has a PI (proportion+integration) type configuration, including a multiplying unit 304 that multiplies the error Lerr by a gain Kp, an integrating unit 306 that integrates the error Lerr, a multiplying unit 307 that multiplies an error integration value output from the integrating unit 306 by a gain Ki, and an adding unit 305 that adds outputs from the integrating unit 306 and the multiplying unit 307. The average surface error smoothing unit 302 outputs the addition result of the adding unit 305 as average surface error data Err(all).

The integrating unit 306 includes an adding unit 308 and an integration value holding unit 309. The adding unit 308 adds the error Lerr of the target line and an integration value up to the previous line held in the integration value holding unit 309. The integrating unit 306 then updates the value held in the integration value holding unit 309 with the addition result.

The surface error smoothing unit 303 calculates surface error data Err(i) obtained by smoothing a difference e(i) between an error Lerr (0) of a specific reference surface (here, 0 surface is used, but any surface may be used) of the polygon mirror 104 and an error Lerr(i) of each surface (i surfaces). The surface error smoothing unit 303 outputs the calculated surface error data Err(i).

The surface error smoothing unit 303 includes a reference surface error holding unit 310, a subtracting unit 311, an integrating unit 312, and a multiplying unit 313. The reference surface error holding unit 310 holds an error Lerr relative to the reference surface of the polygon mirror 104 as a reference surface error e(ref). The subtracting unit 311 subtracts the reference surface error e(ref) held in the reference surface error holding unit 310 from the error Lerr of the target line, and outputs a subtraction result e(i). The integrating unit 312 integrates the subtraction result e(i) of the subtracting unit 311 for each surface of the polygon mirror 104, and outputs an integration value corresponding to the surface to be measured (hereinafter, referred to as "target surface") of the polygon mirror 104. The multiplying unit 313 multiplies the integrating unit 312 by an output gain Ko. The surface error smoothing unit 303 outputs the output of the multiplying unit 313 as surface error data Err(i) of each surface.

The integrating unit 312 selects a target surface, based on a surface selecting signal FNo supplied from an operation controlling unit 330, which will be described later. For example, if the polygon mirror 104 has six surfaces, a value i expressed by the surface selecting signal FNo is incremented within a range from 0 to 5, so as to circulate through each line.

If a surface at i=0 is a reference surface, the reference surface error holding unit 310 holds an error Lerr at i=0, and updates the error Lerr being held at the next i=0.

The integrating unit 312 includes an adding unit 314 and integration value holding units 315. Each surface (six in the present embodiment) of the integration value holding units 315 has a holding unit holding an integration value of the surface error, relative to the reference surface of each surface of the polygon mirror 104. The integration value holding unit 315 outputs an integration value of the surface error of a surface corresponding to the surface selecting signal FNo.

The adding unit 314 adds the subtraction result e(i) of the subtracting unit 311 and the integration value of the surface error output based on the surface selecting signal FNo, and updates the integration value of the surface error of the target surface, held in the integration value holding unit 315, with the addition result.

If the target surface is the reference surface (0 surface), the difference e(0) is always 0. Accordingly, it is possible to omit the holding unit corresponding to the 0 surface, and the integration value holding unit 315 may output 0 as an integration value of the surface error, at i=0.

Figure 6:
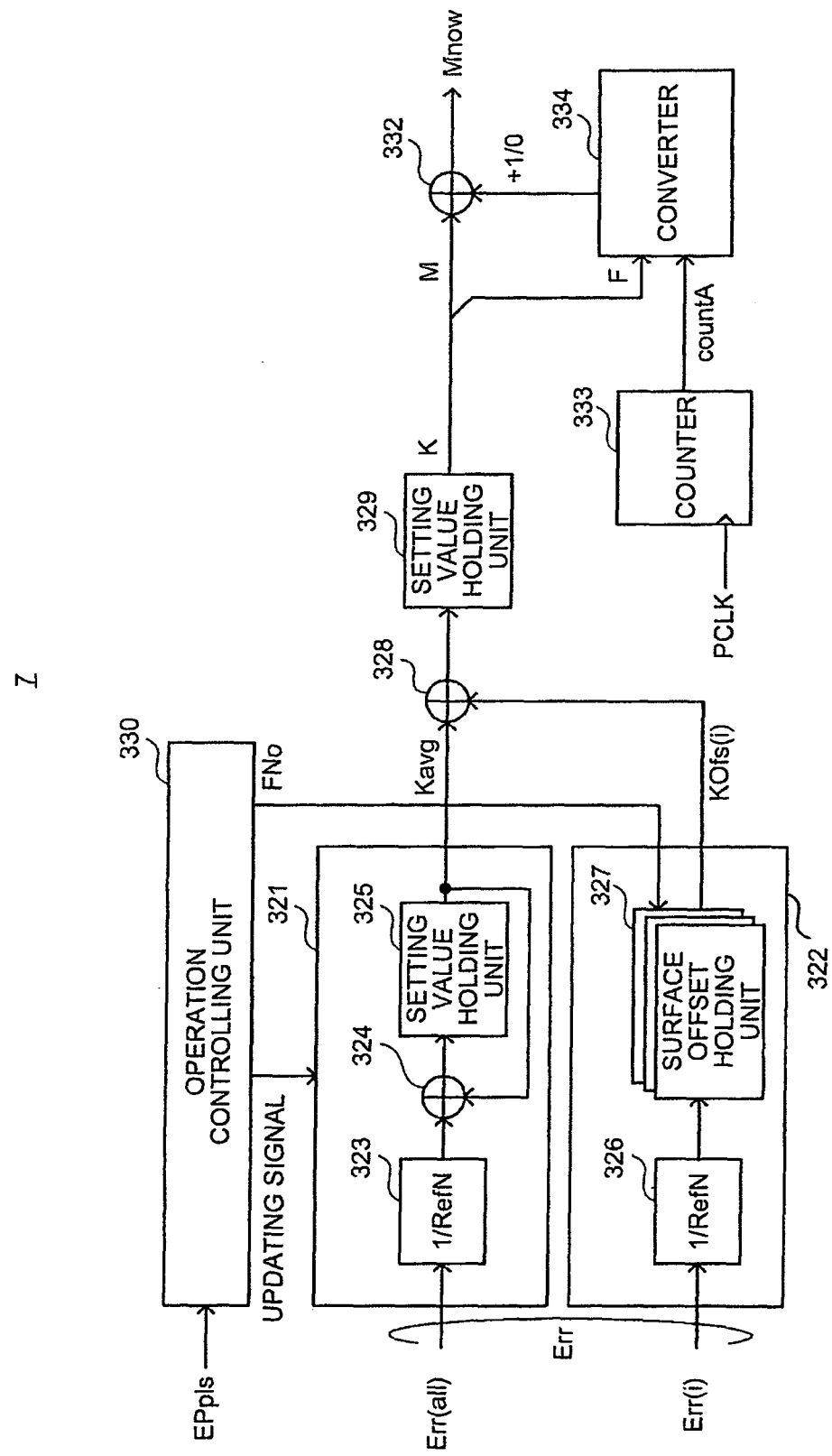
FIG. 6 is a schematic of a frequency calculating unit included in the pixel clock generating unit according to the first embodiment.

As shown in FIG. 6, the frequency calculating unit 7 includes an average surface frequency calculating unit 321, surface offset holding units 327, an adding unit 328, the setting value holding unit 329, the operation controlling unit 330, an adding unit 332, a counter 333, and a converter 334.

The operation controlling unit 330 generates a surface selecting signal FNo supplied to the units in the filter 6 and the frequency calculating unit 7, and an updating signal for instructing holding units in the filter 6 and the frequency calculating unit 7 to update the values (the timing to transmit the updating signal to each holding unit is different. However, it is collectively shown in the diagram).

The average surface frequency calculating unit 321 includes a multiplying unit 323, an adding unit 324, and a setting value holding unit 325. The multiplying unit 323 multiplies the average surface error data Err(all) by an inverse of the reference value RefN.

The setting value holding unit 325 holds an average surface frequency setting value Kavg that indicates an average of a frequency setting value K set for each surface of the polygon mirror 104. The adding unit 324 adds the multiplication result of the multiplying unit 323 and the average surface frequency setting value Kavg held in the setting value holding unit 325, and updates the average surface frequency setting value Kavg held in the setting value holding unit 325 with the addition result.

In this manner, the average surface frequency calculating unit 321 performs the following operation (Equation 3) based on the average surface error data Err(all) and a current average surface frequency setting value $Kavg_n$ to calculate the next setting value $Kavg_{n+1}$.

$$Kavg_{n+1} = Kavg_n + Err\text{(all)}/RefN \qquad \text{(Equation 3)}$$

A surface offset frequency calculating unit 322 includes a multiplying unit 326 and the surface offset holding units 327. Each surface of the surface offset holding unit 327 has a holding unit holding a surface offset value KOfs(i) indicating a difference of the frequency setting value K relative to the reference surface of each surface of the polygon mirror 104.

The surface offset holding unit 327 also outputs the surface offset value KOfs(i) of a surface corresponding to the surface selecting signal FNo.

The multiplying unit 326 multiplies the surface error data Err(i) by an inverse of the reference value RefN, and calculates a surface offset value KOfs(i) for each pixel. The multiplying unit 326 then updates the surface offset value KOfs(i) of the target surface held in the surface offset holding unit 327 with the multiplication result.

In general, a range that can be obtained by the surface offset value KOfs(i) is much smaller value compared with the frequency setting range of the pixel clock. Accordingly, the number of bits of a value being held can be significantly reduced, by holding the average surface frequency setting value Kavg and the surface offset value KOfs(i), than holding the frequency setting value K of the pixel clock for each surface of the polygon mirror 104. Consequently, the circuit scale and the power consumption can be advantageously reduced.

As described above, the surface error data Err(i) is obtained by smoothing the difference between the error Lerr of the reference surface and the error Lerr of each surface of the polygon mirror 104. An error component generated in each surface of the polygon mirror 104 is extracted relative to the reference surface. If the same device is used under the same condition (for example, if the rotation speed of the polygon mirror 104 is the same), the surface error data Err(i) is substantially the same value.

The adding unit 328 adds the average surface frequency setting value Kavg calculated by the average surface frequency calculating unit 321 and the surface offset value KOfs(i) output from the surface offset frequency calculating unit 322, and outputs the result as a frequency setting value K(i) of the target surface. The setting value holding unit 329 holds the frequency setting value K(i) output from the adding unit 328 for each surface.

In this manner, the setting value holding unit 329 holds the frequency setting value K(i) of the target surface whose surface error is corrected, and the setting value holding unit 329 outputs the frequency setting value K for the target surface.

Accordingly, the frequency setting value K of each surface is Kavg for the 0 surface, which is the reference surface, and Kavg+KOfs(i) for the other surfaces.

Accordingly, the average surface value of the frequency setting value K is Kavg+1/Nf·ΣKOfs(i). Here, Nf is the number of surfaces of the polygon mirror 104, and ΣKOfs(i) is a sum of KOfs(i), when i went around from 1 to (Nf−1).

The frequency dividing ratio Mnow set in the frequency divider 4 is a natural number. However, the frequency setting value K is an actual number. Accordingly, the frequency setting value K can be divided into an integer portion M and a decimal portion F of a-digits (binary notation). At Na=$2^a$, the frequency setting value K can be expressed as K=M+F/Na.

Accordingly, the adding unit 332, the counter 333, and the converter 334 can bring the frequency dividing ratio set in the frequency divider 4 close to K in average. This is possible by making the frequency dividing ratio Mnow set in the frequency divider 4 to M+1 for F times in Na cycle, and to M in the other cycle. A rounding error of the frequency setting value K is RefN/Na at maximum. Accordingly, "a" of the decimal portion is determined in advance so as to fall within a desired error allowable value.

A bit string corresponding to the integer portion M of the frequency setting value K is made to enter the adding unit 332, and a bit string corresponding to the decimal portion F of the frequency setting value K is made to enter the converter 334.

The counter 333 is an a-bit counter that counts the value' corresponding to the pixel clock PCLK, and outputs the count value countA. The converter 334 outputs "1" during F cycle for the Na cycle, and outputs "0" for the remaining Na−F cycle, to the adding unit 332, based on the count value countA.

In particular, the converter 334 evenly outputs "1" for F times, during the Na cycle. Accordingly, the converter 334 outputs "1", if Arev[0:a-1] obtained by reversing the bit arrangement of the count value countA[a-1:0] is smaller than F, and outputs "0", if Arev[0:a-1] is not smaller than F.

The adding unit 332 sets Mnow indicating a setting value of the frequency dividing ratio obtained by adding the integer portion M of the frequency setting value K and the output of the converter 334, in the frequency divider 4.

Figure 7:
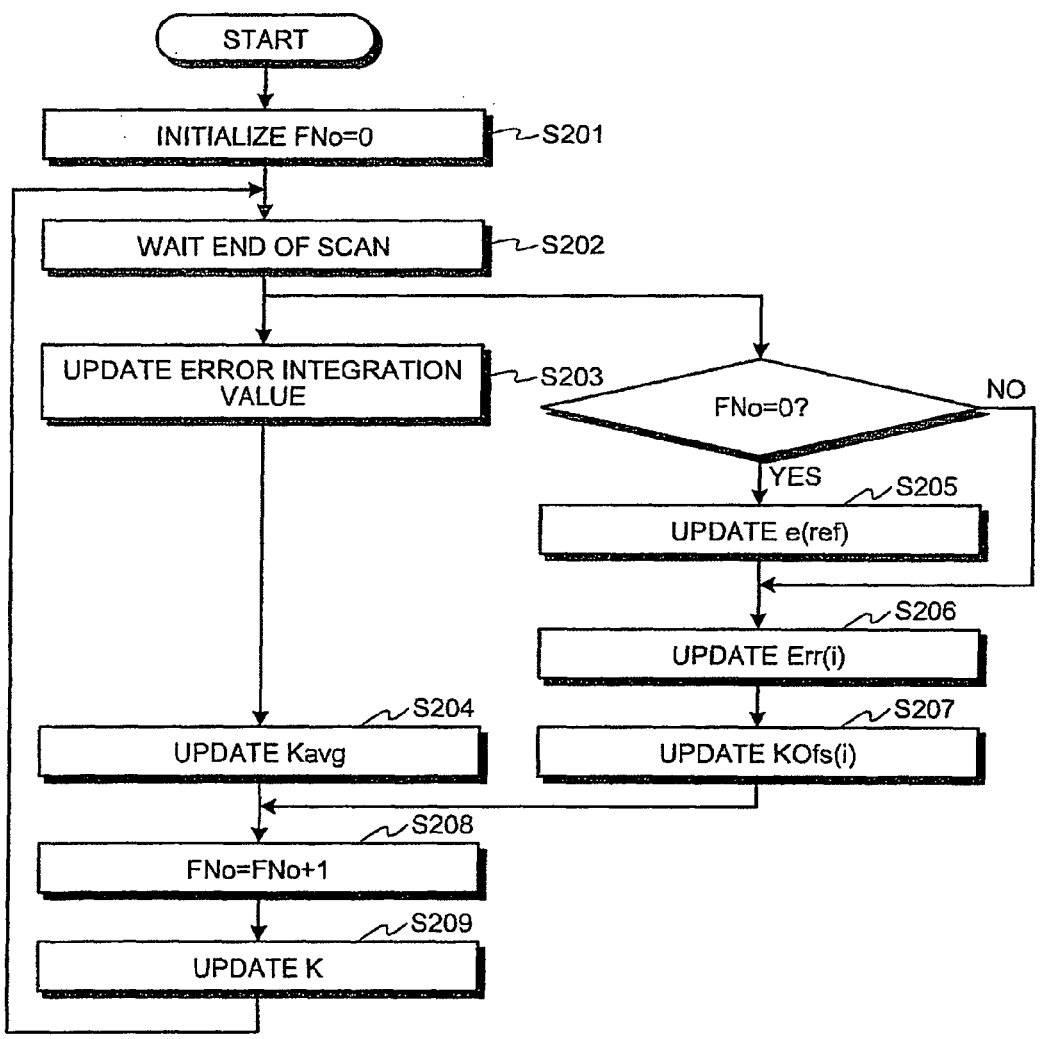
FIG. 7 is a flowchart of an operation of frequency setting value calculation performed by the filter and the frequency calculating unit included in the pixel clock generating unit according to the first embodiment.

FIG. 7 is a flowchart of an operation of frequency setting value calculation performed by the filter 6 and the frequency calculating unit 7.

The operation controlling unit 330 selects 0 as the surface selecting signal FNo, and initializes the values held in the holding units of the filter 6 and the frequency calculating unit 7 (Step S201). Here, the values held in the integration value holding units 309 and 315, and the surface offset holding units 327 are initialized to "0", and the values held in the setting value holding units 325 and 329 are initialized to a predetermined target frequency setting value.

By keeping the accuracy of the target frequency setting value as high as possible, the pull-in time can be shortened. Accordingly, even if signals (such as a synchronization light signal and the like used for turning the light source on to detect the synchronization signals SPSYNC and EPSYNC) are generated based on the pixel clock PCLK, the signals can be generated at the target timing. Consequently, there is no need to allow significant flexibility in the generation timing, by taking the deviation from the frequency setting value K into consideration.

The operation of the frequency setting value calculation does not start until scanning of one line is finished. In other words, the operation does not start until the operation controlling unit 330 detects the end of scan, based on EPpls (Step S202). The waiting time includes the time required to determine the calculation of the error Lerr.

If the operation controlling unit 330 detects the end of scan, the integrating unit 306 adds the error Lerr to the error integration value up to the previous line, thereby updating the error integration value (Step S203).

The average surface error smoothing unit 302 calculates average surface error data Err(all), by performing the following operation (Equation 4). Here, ΣLerr is an integration value of Lerr.

$$Err\,(all) = Kp \cdot Lerr + Ki \cdot \Sigma Lerr \quad \text{(Equation 4)}$$

Based on the calculation result, the average surface frequency calculating unit 321 calculates the next average surface frequency setting value $Kavg_{n+1}$, and the average surface frequency setting value Kavg is updated with $Kavg_{n+1}$ (Step S204).

In parallel with Steps S203 and 204, the surface offset value KOfs(i) is updated as the following.

If the operation controlling unit 330 detects the end of scan, the reference surface error e(ref) held in the reference surface error holding unit 310 is updated with the error Lerr, if FNo=0 (Step S205). The operation of the frequency setting value calculation skips Step S205, if FNo≠0.

Because the reference surface error e(ref) held in the reference surface error holding unit 310 is updated after the first line (FNo=0) is scanned, the initial value may be any value. In other words, there is no need to initialize the value.

The surface error smoothing unit 303 performs the following operation (Equation 5), calculates the surface error data Err(i) (here, i is a surface number indicated by FNo) of the target surface, and updates the integration value corresponding to the target surface (i) (Step S206). Here, Σe(i) is an integration value of a difference e(i) between the error Lerr of the target line and the reference surface error e(ref).

$$Err(i) = Ko \cdot \Sigma e(i) \qquad \text{(Equation 5)}$$

Based on the surface error data Err(i), the surface offset frequency calculating unit 322 calculates the surface offset value KOfs(i), and updates the surface offset value KOfs(i) (Step S207).

When Steps S204 and S207 are both executed, FNo is incremented (+1) (if FNo=5, returns to FNo=0) (Step S208). If FNo is incremented, the surface offset frequency calculating unit 322 outputs the surface offset value KOfs(i) for the next line. The adding unit 328 then adds the surface offset value KOfs(i) and the average surface frequency setting value Kavg, thereby updating the frequency setting value K for the next line (Step S209). The steps so far are executed until the scanning of the next line is started (until SPSYNC is detected) (in other words, outside the effective scanning period).

The operation of the frequency setting value calculation is returned to Step S202, and the processes from Step S203 to S209 are repeatedly executed.

As described above, the present embodiment focuses on the characteristics of various error factors. The present embodiment includes a plurality of control systems suitable for correcting the characteristics of the error factors, and corrects the various errors by operating the control systems in parallel. Accordingly, contradictory problems such as increasing the speed of the device and increasing the control bandwidth can be solved at the same time.

In the present embodiment, the error factor is divided into an "average surface error" (an average error of one cycle, when the error varies periodically. Here, one rotation of the polygon mirror is one cycle, and because the error is an average of errors of six surfaces, it is referred to as the average surface error) and a "difference from the average surface error".

Figure 8:
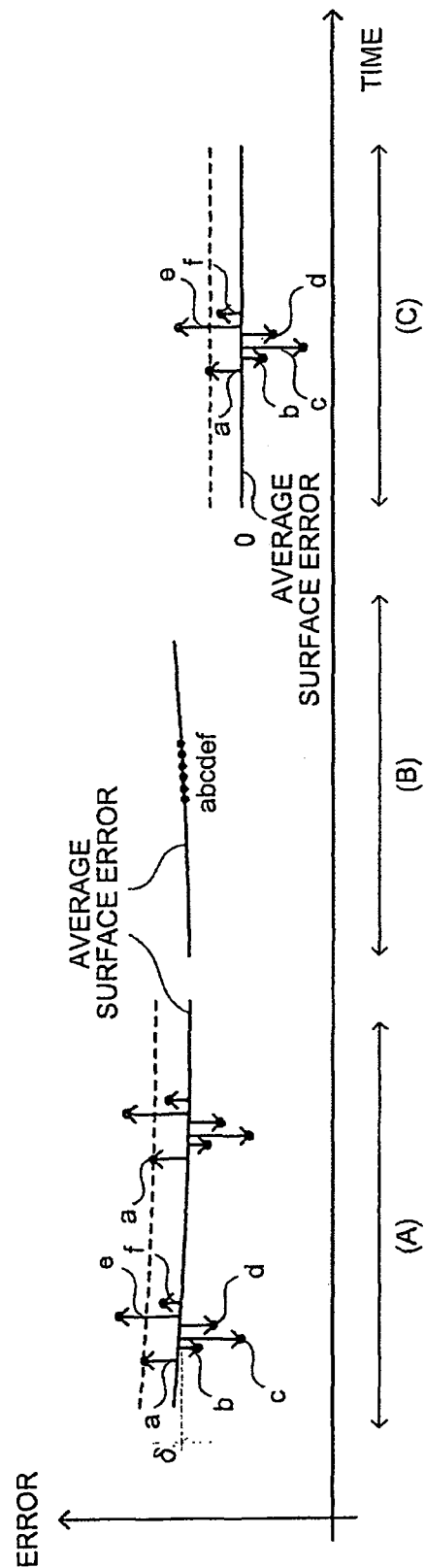
FIG. 8 is an exemplary graph of a relationship between error components according to the first embodiment.

FIG. 8 is an exemplary graph of a relationship between the two error components. The vertical axis is an error, the horizontal axis is time, the solid line is the average surface error, and arrows a to f are differences of 0 to 5th surfaces (surface number is relative) from the average surface error. Upper arrows show positive values, and lower arrows show negative values.

A period of (A) is a state in which both error components are not corrected. The difference from the average surface error varies only a little, when the error is sampled from each surface (in other words, the arrow a does not vary much with time). Accordingly, if an offset for each surface is added to the average surface pixel clock frequency, so as to eliminate the difference from the average surface error, the error component can be corrected. The control bandwidth can be lowered sufficiently.

A period of (B) is a state in which only the difference from the average surface error is corrected. The difference from the average surface error is corrected to "0" in all the surfaces. Accordingly, the error of each surface is matched with the average surface error (solid line).

The average surface error includes error components other than the difference from the average surface error, and all the surfaces are similarly varied (for example, if the rotation speed of the polygon mirror 104 varies, the scanning speed varies in all the surfaces). Because the control is performed by sampling errors in all the surfaces, high bandwidth control can be performed. Accordingly, high-speed response can be achieved, thereby suppressing high frequency jitter.

The difference from the average surface error is generated as a periodical error. However, if the control bandwidth is lower than one rotation cycle of the polygon mirror 104, the error can be smoothed. Because the difference from the average surface error is also controlled to be 0, in parallel, the periodical error can be reduced to an ignorable level.

A period of (C) is a state in which only the average surface error is corrected. If it is assumed that a certain surface (0 surface) is a reference surface, and the difference from the average surface error at the reference surface is 0, as shown by the broken line, the average surface error is shifted for a predetermined amount as much as a difference a of the 0 surface. Accordingly, even if the difference from the reference surface error is corrected, the similar effect as the above can be obtained (it is assumed that a fluctuation amount δ of the average surface error in the period from 0 surface to the 5th surface is minimal, and is an ignorable level).

In this manner, in the present embodiment, the most nearest average surface error need not to be calculated by averaging a plurality of errors. Instead, all it is required is to obtain the error of the reference surface. Accordingly, the circuit scale can be reduced. In the present embodiment, the "average surface error" and the "difference from the average surface error" are controlled in parallel by a suitable control system, respectively. Consequently, a high bandwidth and highly accurate control can be performed.

In the present embodiment, a system of the average surface error smoothing unit 302 and the average surface frequency calculating unit 321 (hereinafter, referred to as "control system 1") controls the "average surface error" as an average pixel frequency of each surface in which the error is not corrected. The control system 1 is a pixel clock frequency average value calculating unit in the present invention, and the fluctuations of the scanning speed of (2) to (4) can be corrected. At this time, the errors are controlled by always sampling the errors from all the surfaces. Accordingly, high-bandwidth control can be achieved, thereby suppressing high frequency jitter.

A system of the surface error smoothing unit 303 and the surface offset frequency calculating unit 322 (hereinafter, referred to as "control system 2") control the "difference from the average surface error". The control system 2 is a pixel clock frequency offset value calculating unit in the present invention, and this is added with the control system 1. Accordingly, the fluctuation of the scanning speed (1) can be corrected, thereby performing highly accurate control.

Because the two systems control the scanning speed in parallel, the high bandwidth and highly accurate control can be performed. The error Lerr of the cycle of six surfaces is an "error in N-cycles" in the present invention. In other words, one rotation cycle of the polygon mirror 104 is an "operation cycle" in the present invention.

The frequency of the fluctuation of the "average surface error" corrected by the control system 1 is higher than the frequency of the fluctuation of the "difference from the average surface error" corrected by the control system 2. Accordingly, if the control bandwidth of the control system 1 is in a bandwidth sufficiently higher than the control bandwidth of the control system 2, the two control systems do not interfere with each other. Consequently, it is possible to perform stable control.

Characteristics and a setting example of the control systems 1 and 2 will now be described.

Figure 9:
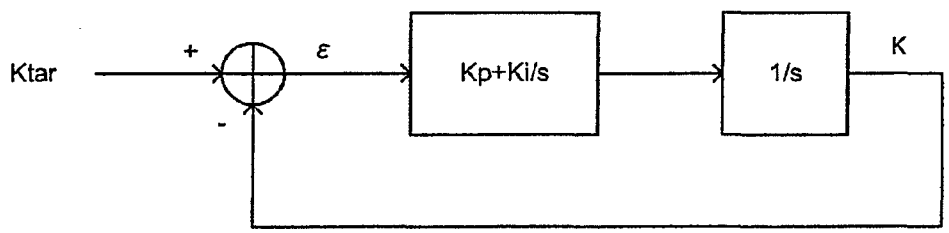
FIG. 9 is a schematic of a control system 1 made of the filter and the frequency calculating unit included in the pixel clock generating unit according to the first embodiment.

In terms of the control system 1, if a value to be controlled is the frequency setting value K, and the target value is replaced by Ktar, the control schematic is given in FIG. 9.

An open loop gain G1(s) can be written in the s-domain as the following (Equation 6). Because the control schematic in FIG. 9 is a known PI (proportional integration) control system, the detailed descriptions thereof will be omitted.

$$G1(s)=(Kp+Ki/s)\cdot 1/s \tag{Equation 6}$$

If the number of pixel clocks n counted by the comparator 5 and a fraction EPm less than one cycle of the pixel clock are used, the following (Equation 7) is satisfied.

$$Ktar\cdot RefN=K\cdot n+EPm \tag{Equation 7}$$

Accordingly, a deviation 6 between the target value Ktar and the control value K is given by the following (Equation 8).

$$\epsilon=Ktar-K=1/RefN(K\cdot n+EPm)-K=1/RefN((n-RefN)\cdot K+EPm) \tag{Equation 8}$$

The following (Equation 9) is satisfied by modifying the (Equation 1) calculated by the error operating unit 13 according to the present embodiment.

$$Lerr=(n-RefN)\cdot K+EPm \tag{Equation 9}$$

Accordingly, (Equation 10) is satisfied by the (Equation 8) and the (Equation 9).

$$\epsilon=1/RefN\cdot Lerr \tag{Equation 10}$$

Consequently, the control system 1 according to the present embodiment is equivalent to the control system shown in the control schematic in FIG. 9. As a result, the control bandwidth of the control system 1 can be set by gain coefficients Kp and Ki.

Figure 10:
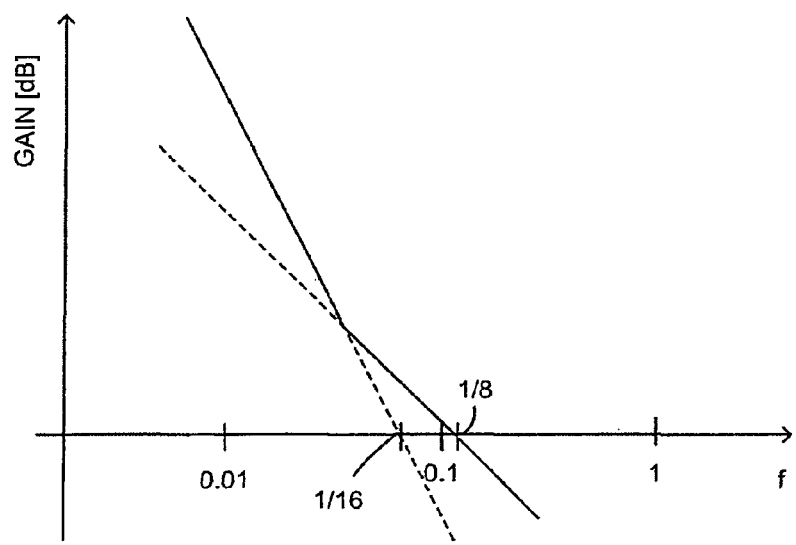
FIG. 10 is an exemplary graph of open loop characteristics of the control system 1 shown in FIG. 9.

For example, if Kp=⅛ and $K_i$=1/256, the open loop characteristics (approximate line) obtained by normalizing the sampling frequency (in other words, the scanning line frequency) to 1[Hz], is as shown by the solid line in FIG. 10.

In FIG. 10, the horizontal axis is the normalized frequency (log scale) and the vertical axis is a gain (dB). In all the control systems, in terms of sampling at each surface (i), if the target value Ktar is divided into an average surface component Kta and a surface offset component Kti, it can be expressed as Ktar=Kta+Kti. Similarly, the frequency setting value K can be expressed as K=Kavg+KOfs(i).

Figure 11:
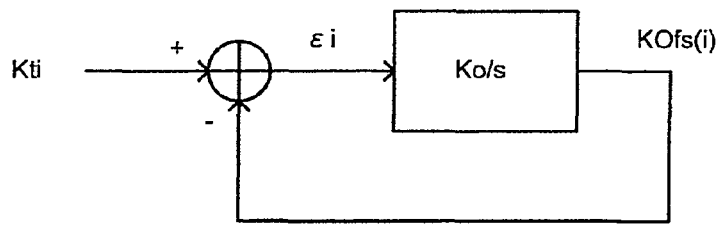
FIG. 11 is a schematic of a control system 2 made of the filter and the frequency calculating unit included in the pixel clock generating unit according to the first embodiment.

If the surface offset component of the reference surface is 0, a reference surface deviation ϵr is expressed as ϵr=Kta−Kavg, and the deviation ϵ is expressed as ϵ=Kta+Kti−(Kavg+KOfs(i)). Accordingly, a deviation ϵi of the surface offset in the control system 2 is a difference between the deviation ϵ of each surface and the reference surface deviation ϵr. Accordingly, it is given by ϵi=ϵ−ϵr=Kti−KOfs(i). Consequently, the control schematic of the control system 2 is as shown in FIG. 11. In the present embodiment, the control systems are arranged in parallel in each surface. In the present embodiment, the circuit scale is reduced by including the holding units of each value in each surface, and by commonly using the operating unit.

An open loop gain G2(s) of the control system 2 is given by the following (Equation 11). However, the sampling frequency of the control system 2 is the same as the rotation frequency of the polygon mirror 104, because the sampling is performed on a specific surface. Accordingly, if the polygon mirror has six surfaces, the sampling frequency of the control system 2 is one-sixth of the scanning line frequency.

$$G2(s)=Ko/s \tag{Equation 11}$$

Accordingly, the control bandwidth of the control system 2 can be set by a gain coefficient Ko.

When the control bandwidth of the control system 1 is set as the example described above, it is approximately ⅛·fs (fs: sampling frequency). To sufficiently lower the bandwidth, for example, it may be set to Ko=1/64 (control bandwidth is 1/64·⅙·fs).

Because the control bandwidth does not require detailed setting, multiplying units can be formed by a bit shifter, if the gain coefficients are set to the power of two. Accordingly, it is possible to significantly reduce the circuit scale.

As described above, in the present embodiment, the target value is changed by the assembly accuracy and the like of the device, or by the scanning optical system. However, no target value of the pixel frequency is set with a known PI control system directly applied. Instead, by using the above configuration and by setting a target value to RefN, the target value can be easily and accurately obtained, while manufacturing the device, for example. Even if the pixel frequency is to be changed, the pixel frequency can be advantageously changed, without recalculating the target value.

The circuit scale can be reduced, by commonly using the multiplying unit 323 and the multiplying unit 326. In other words, a selecting unit that can switchably select Err(all) and Err(i) may be provided in a preceding stage of the multiplying unit 323 and the multiplying unit 326, and in the flowchart shown in FIG. 7, Kavg is calculated and updated so that Err(all) is selected until Step S204 is processed. After Steps S204 and S206 are processed, KOfs(i) is updated by processing Step S207 so that Err(i) is selected.

In the present embodiment, the reference surface error holding unit 310 holds the error Lerr of the specific reference surface, and outputs e(ref). However, in the present invention, an average of errors of one rotation of the polygon mirror 104 immediately before may be calculated and use the value as e(ref).

In other words, an average surface error in FIG. 8 may be obtained from the six surfaces immediately before (in other words, the error is updated for each surface), and use the value as the reference error value. In this manner, the fluctuation of the average surface error can be calculated accurately.

The conventional image forming apparatus reduces the power consumption by disabling the operation of a part of the device, when an image is not being formed. For example, in the aforementioned device, the power source is turned off, the rotation of the polygon mirror is stopped, and the operation of the pixel clock frequency control is also stopped.

Accordingly, to start writing again, the operation of the frequency setting value calculation needs to be performed from the beginning (from Step S201 in FIG. 7). However, the surface offset depends on the device, and does not change much on the resumption of the control. Accordingly, the control time can be reduced, by referring to the control value obtained before the operation of the frequency setting value calculation is finished.

In other words, by initializing (Step S201) as the following, the time required to complete the operation of the frequency setting value calculation can be reduced. Accordingly, it is possible to reduce the recovery time.

Before the operation of the frequency setting value calculation is stopped, an average surface frequency setting value Kavg and a surface offset value KOfs(i) of each surface are stored (a storing unit may be placed anywhere in the device, or the holding units may not be updated after the operation is stopped).

It is also possible to measure an error Lerr in a state that no surface offset value KOfs(i) of the surfaces is added (in other words, the pixel clock frequency is Kavg), and store a difference e(i) between the error of the corresponding surface and the error e(ref) of the reference surface, in correlation with the surface number FNo (value is i). In the present embodiment, six differences e(i) are stored. These are collectively referred to as "surface error pattern".

In the present embodiment, the surface number is relatively decided. Accordingly, if the polygon mirror 104 is once stopped, the correlation between the surface of the actual polygon mirror 104 and the surface number FNo may not be matched. Consequently, the stored (held) surface offset value KOfs(i) cannot be used as it is, when the operation of the frequency setting value calculation is resumed.

As a result, in the present embodiment, the operation controlling unit 330 includes a stop processing unit and a start processing unit of the present invention. At Step S201 in FIG. 7, as the initializing process shown in FIG. 12, the surface of the actual polygon mirror 104 is correlated with the surface number FNo, as that before the operation of the frequency setting value calculation is stopped.

Figure 12:
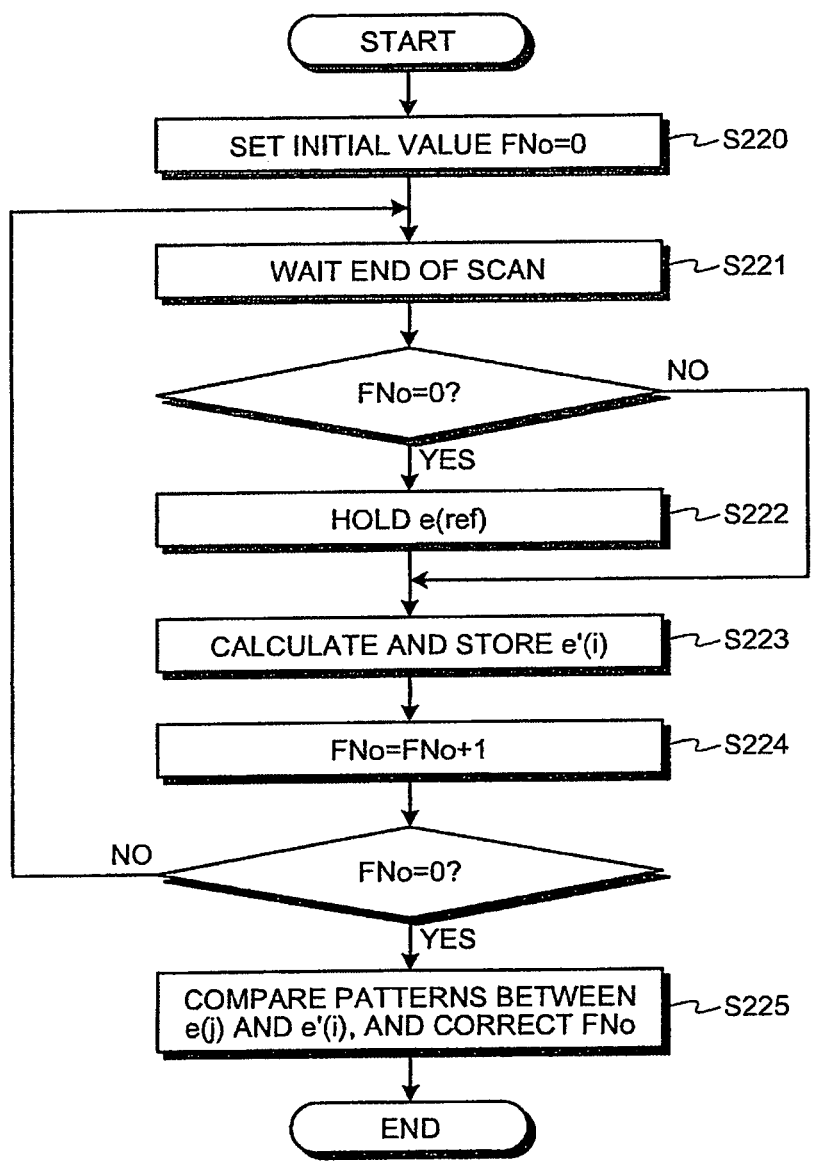
FIG. 12 is a flowchart of an initializing process performed by the filter and the frequency calculating unit included in the pixel clock generating unit according to the first embodiment.

In FIG. 12, the operation controlling unit 330 initializes the values held in the holding units (Step S220). Here, the operation controlling unit 330 sets the average surface frequency setting value Kavg and the surface offset value KOfs(i) of each surface stored in advance, to the holding units (if the holding units already hold the values, the process may be omitted). The operation controlling unit 330 then clears the integration value to "0". The controlling value and the holding value are not yet updated here. The operation controlling unit 330 initializes the surface number FNo to "0".

Then, similarly to the operation of the frequency setting value calculation shown in FIG. 7, a surface error pattern to be used after the resumption of operation is obtained. In other words, the initializing process is performed as follows: wait until the scanning of one line is finished (Step S221), and if FNo=0, the error Lerr is updated as the reference surface error e(ref) (Step S222), and if FNo≠0, Step S222 is skipped.

The operation controlling unit 330 then calculates a difference e(i) (=Lerr(i)−e(ref), i is a value of FNo) between the error Lerr of the target line and the reference surface error e(ref), and stores therein as an element of the surface error pattern (Step S223).

The operation controlling unit 330 then increments a surface number FNo (Step S224). Here, if FNo≠0, the initializing process is returned to Step S221, and if FNo=0, the operation controlling unit 330 correlates the surface number.

If it is assumed that the surface number correlated with the actual surface of the polygon mirror 104 before the operation of the frequency setting value calculation is stopped, is j (j=0 to 5), the surface number is correlated, by comparing the surface error pattern e(j) used before the operation of the frequency setting value calculation is stopped and a surface error pattern e'(i) obtained as aforementioned, after the operation of the frequency setting value calculation is resumed, and changing FNo in the order of the surface numbers closest to the combination of the surface error pattern.

Figure 13:
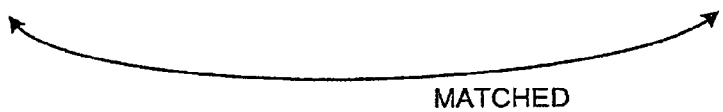
FIG. 13 is a conceptual schematic of surface error patterns according to the first embodiment.

FIG. 13 is an example of surface error patterns. Here, (a) is a surface error pattern e(j) before the operation of the frequency setting value calculation is stopped, and j is the surface number at this time. The operation controlling unit 330 calculates a difference e(j)−e(j+1) of each element of the surface error pattern e(j).

(b) is a surface error pattern e'(i) obtained after the operation of the frequency setting value calculation is resumed, and i is the surface number. Here, i and j are not matched. Similarly, the operation controlling unit 330 calculates a difference e'(i)−e'(i+1) of each element of the surface error pattern e'(i).

Because the fluctuation between the surface errors before stopping and after resuming the operation of the frequency setting value calculation is minimum, the phases of the differences of the elements of the surface error patterns are shifted. If the surface numbers are changed so as to match thereto, the surface number correlated with each surface of the polygon mirror 104 is matched, before stopping and after resuming the operation of the frequency setting value calculation.

In an example shown in FIG. 13, if 2 is added to the surface number (i'=i+2), the patterns are matched. Accordingly, the surface numbers are matched before stopping and after resuming the operation of the frequency setting value calculation.

In FIG. 12, as described above, the operation controlling unit 330 compares the surface error patterns before stopping and after resuming the operation of the frequency setting value calculation. The operation controlling unit 330 calculates a correction value of the surface number used to match the surface error patterns, and changes the surface number FNo (Step S225), thereby finishing the initializing process. Then, the operation of the frequency setting value calculation shown in FIG. 7 is returned to process Step S202.

In the initializing process, the control value before stopping the operation of the frequency setting value calculation is used as an initial value, and the correlation with the surface numbers are also matched. Accordingly, the average surface frequency setting value Kavg and the surface offset value KOfs(i) of each surface resume control from values approximately the same as the target values. Consequently, it is possible to set and determine the target value quickly, thereby reducing the recovery time.

If the average surface frequency setting value Kavg, the surface offset value KOfs(i) of each surface, and the surface error pattern e(j) are stored in a non-volatile memory before stopping the operation of the frequency setting value calculation, the initializing process can be executed, even if the power of the device is turned off (in other words, even if the power of the device is turned on). Accordingly, the similar effects can be obtained. Alternatively, the average surface frequency setting value Kavg, the surface offset value KOfs(i) of each surface, and the surface error pattern e(j) may be obtained during manufacturing of the device, and stored in the non-volatile memory.

Figure 14:
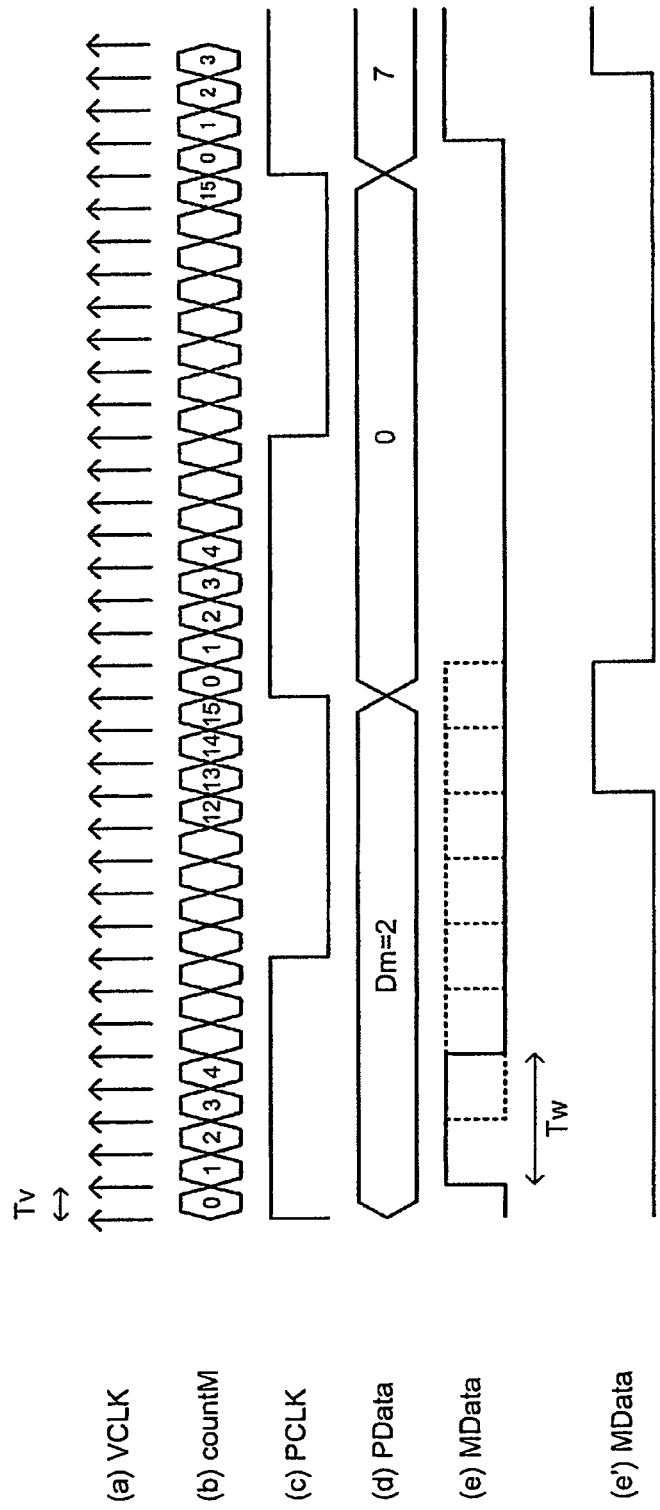
FIG. 14 is a timing chart for explaining an operation performed by the modulation data generating unit included in the image forming apparatus according to the first embodiment.

FIG. 14 is a timing chart for explaining an operation performed by the modulation data generating unit 113. Here, a generation of modulation data MData to which 8-value pulse width modulation is performed, based on the image data PData, will be described.

In FIG. 14, (a) is the rise of the high frequency clock VCLK having a cycle Tv, and (b) is a count value countM of the frequency divider 4. Here, it is assumed that a frequency dividing ratio in the frequency divider 4 is set to 16.

(c) is a pixel clock PCLK, and the cycle of the pixel clock PCLK is 16Tv. (d) is image data PData entering in synchronism with the pixel clock PCLK. (e) is modulation data MData in which the pulse width Tw is modulated, based on a value Dm of the image data PData.

The modulation data MData is generated based on the high frequency clock VCLK, and if Dm≠0, the modulation data MData is in "H", at countM=0. The modulation data MData is in "L", at countM=Dm/Nm·Mnow (Nm is the number of gradation, and here, it is 8).

(e') is modulation data MData that is in "H", at countM= (Nm−Dm)/Nm·Mnow, and in "L", at countM=0, if Dm≠8. The two generation modes may be formed so that they can be switched, and changed by each dot.

In this manner, the image forming apparatus according to the first embodiment controls the average Kavg of the frequency of the pixel clock PCLK and the offset value KOfs(i) of the frequency of the pixel clock PCLK in parallel, corresponding to the fluctuation of the scanning time. Because the frequency of the pixel clock PCLK is set, based on the frequency setting value K to which the values are added, even if the speed of the device is increased, the control bandwidth can be increased. Accordingly, it is possible to sufficiently suppress high frequency jitter.

Second Embodiment

Figure 15:
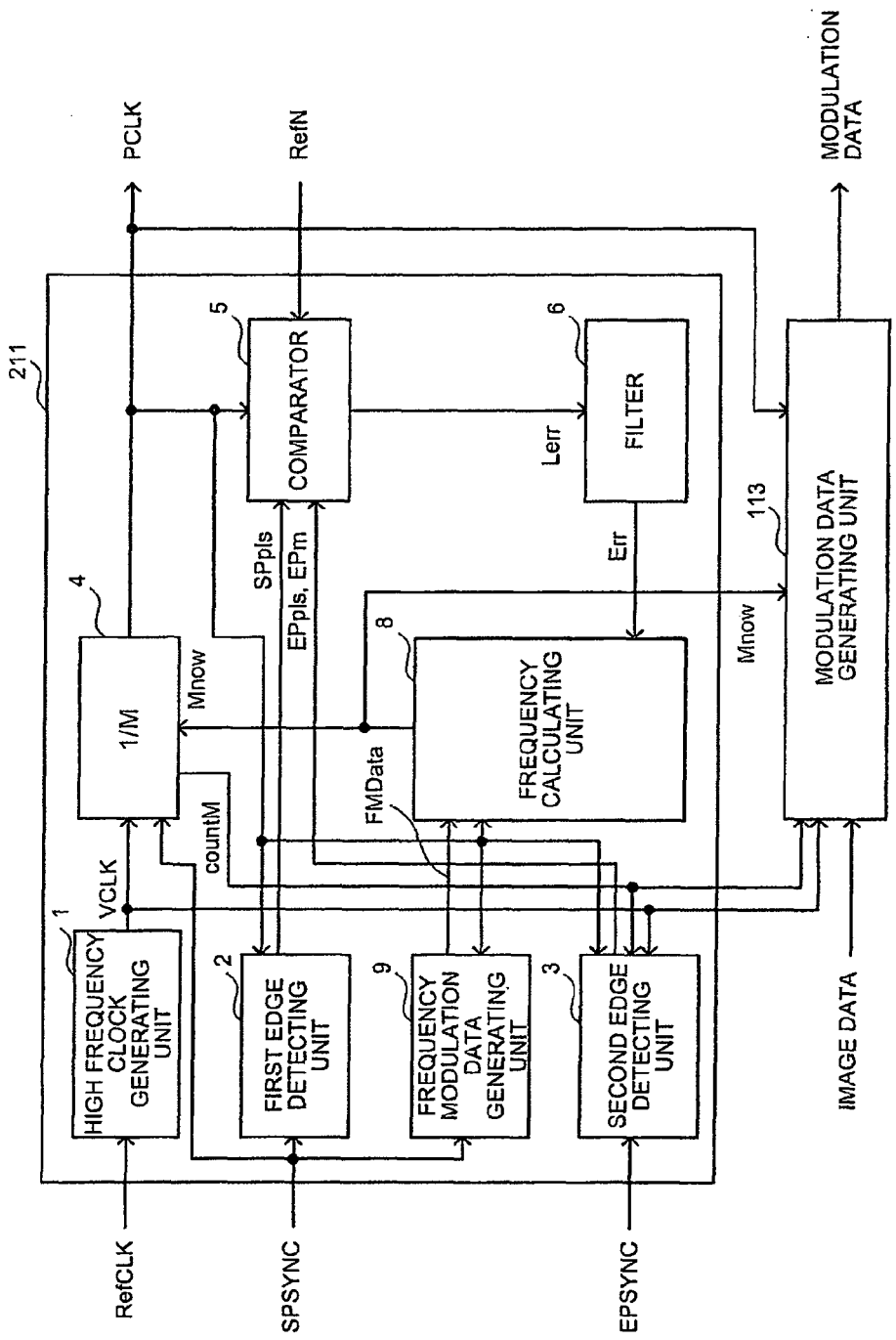
FIG. 15 is a schematic of a pixel clock generating unit and a modulation data generating unit included in an image forming apparatus according to a second embodiment of the present invention.

As shown in FIG. 15, a second embodiment is different from the first embodiment in including a pixel clock generating unit 211 instead of the pixel clock generating unit 111.

The pixel clock generating unit 211 is different from the pixel clock generating unit 111 according to the first embodiment of the present invention, in including a frequency calculating unit 8 instead of the frequency calculating unit 7, and also including a frequency modulation data generating unit 9. In other words, the frequency calculating unit 8 forms a frequency setting unit of the present invention, with the filter 6.

In the present embodiment, the same members as those in the first embodiment according to the present invention are denoted by the same reference numerals, and the detailed descriptions thereof will be omitted.

In FIG. 15, the frequency modulation data generating unit 9 generates frequency modulation data FMData corresponding to the scanning position (here, indicated by the number of pixel clock PCLK n) originating from the first synchronization signal SPSYNC.

The frequency modulation data FMData is a pixel clock frequency corresponding to the scanning speed V(n) at the scanning position n. Here, the frequency modulation data FMData is a difference between M(n) expressed by a frequency dividing value of the high frequency clock VCLK, and an average frequency signal Mavg of the pixel clock.

Figure 16:
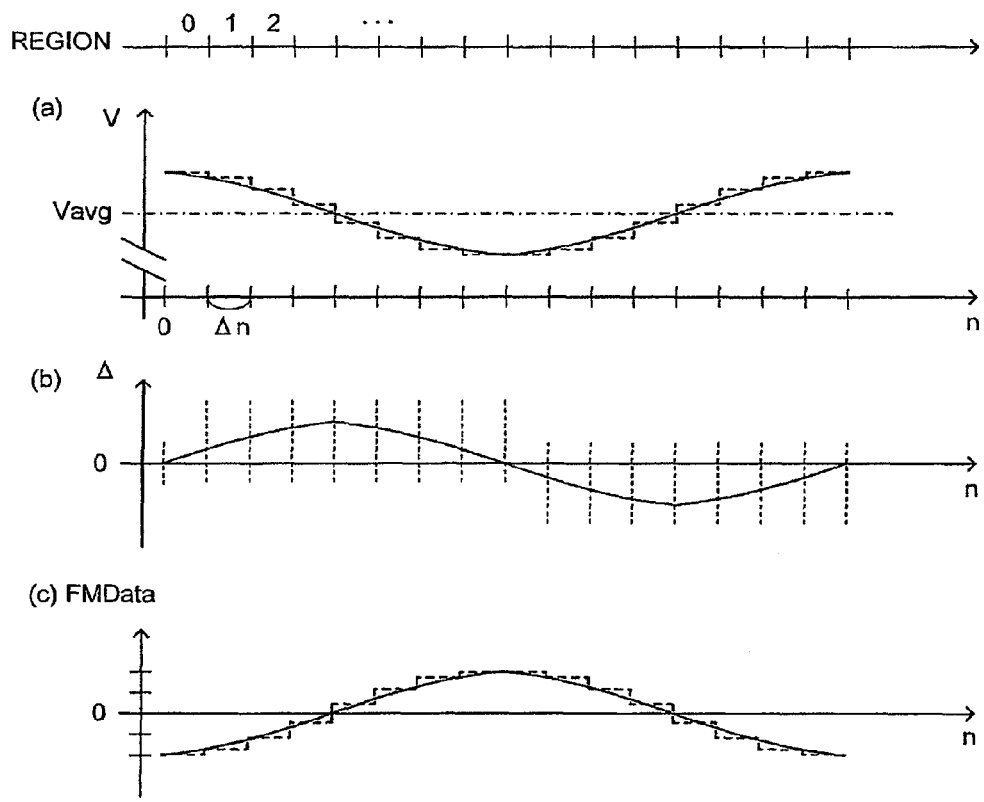
FIG. 16 is graphs of the scanning speed, the deviation, and a relationship of frequency modulation data corresponding to the scanning position according to the second embodiment.

In FIG. 16, (a) is an example of a scanning speed V(n) relative to the scanning position n. (b) is an example of a deviation Δ(n) of the scanning position n from the ideal position. (c) is an example of the frequency modulation data FMData(n).

The deviation Δ of the scanning position n from the ideal position is a value obtained by integrating V(n)−Vavg. The main factor in a nonlinear error in the scanning speed is the poor accuracy and the assembling error of the scanning optical system. To prevent this, for example, the frequency modulation data FMdata may be obtained in advance during the manufacturing of the device, and store the data in the frequency modulation data generating unit 9.

An example of obtaining the frequency modulation data FMData will now be described. The scanning is performed at a certain pixel clock frequency, and a deviation Δ of each scanning position from the ideal position is measured. Because a differential value of the deviation Δ is the scanning speed V, the value is converted into the pixel clock frequency, and the difference from the pixel clock average frequency signal Mavg is obtained. More easily, a gradient between predetermined scanning positions (Δn in FIG. 16) is approximated by the scanning speed V'. Consequently, in the region, a conversion value from the approximated value is used as the frequency modulation data (broken lines in FIG. 16).

In this manner, the frequency modulation data FMData can be easily obtained, and because the same data is used in the region, the amount of memory required to store data can also be reduced. To correct the scanning speed more accurately, the region Δn may be shortened.

The frequency modulation data FMData can easily be obtained, by obtaining difference data ΔM of the frequency dividing ratio M. The data can be converted into a pixel clock frequency instruction signal Mnow, by adding the difference data ΔM to the pixel clock average frequency signal Mavg.

To perform frequency modulation of the pixel clock more accurately, the frequency modulation data preferably includes not only the frequency dividing ratio M but also the decimal portion. Te decimal portion can be processed the same as the frequency dividing ratio M.

To perform the frequency modulation by dividing into regions as described above, it is preferable and easier to set the region length Δn to an integral multiple (more than 1) of Na. In the following explanation, the frequency modulation data FMData includes an integral portion ΔM and a decimal portion ΔF of a-digits.

Figure 17:
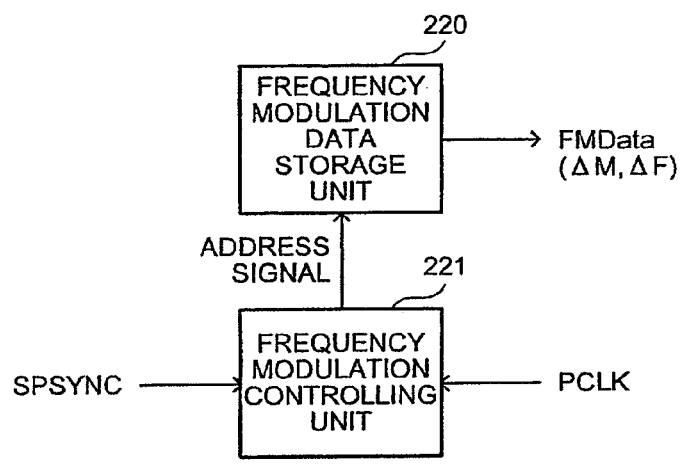
FIG. 17 is a schematic of a frequency modulation data generating unit included in the pixel clock generating unit according to the second embodiment.

As shown in FIG. 17, the frequency modulation data generating unit 9 includes a frequency modulation data storage unit 220 and a frequency modulation controlling unit 221.

The frequency modulation data storage unit 220 includes memory. In the frequency modulation data storage unit 220, the frequency modulation data FMData corresponding to the regions in the scanning line, is stored in advance in a storage region having a region number as an address. It is also possible to store the frequency modulation data FMData in the other storage, and load in the frequency modulation data storage unit 220 when the device is turned on.

The frequency modulation data storage unit 220 outputs the frequency modulation data FMData corresponding to the received address signal. The frequency modulation controlling unit 221 calculates the region numbers in the scanning line, and generates an address signal.

The frequency modulation controlling unit 221 clears the address to "0", by receiving the synchronization signal SPSYNC, counts the pixel clock PCLK, and increments the address signal every time the region length Δn is reached.

If the region length of each region is set in advance for the frequency modulation controlling unit 221, and if the address is incremented every time the frequency modulation controlling unit 221 reaches the region length, the region length can be changed corresponding to the frequency changing amount. Accordingly, it is possible to reduce the memory amount being stored, and improve the accuracy of the frequency correction at the same time.

If the scanning speed or the pixel clock frequency PCLK is changed, the frequency modulation data FMData needs to be changed proportionately. For example, to change the pixel density by only changing the pixel clock frequency PCLK, without changing the scanning speed (rotation speed of the polygon mirror 104), the frequency modulation data FMData obtained in advance may be changed in proportion to the magnification to be changed.

In other words, to reduce the pixel density by half, by reducing the pixel clock frequency PCLK used to calculate the frequency modulation data FMData by half, the data obtained by dividing the frequency modulation data FMData during calculation in half, may be stored in the frequency modulation data storage unit 220.

Figure 18:
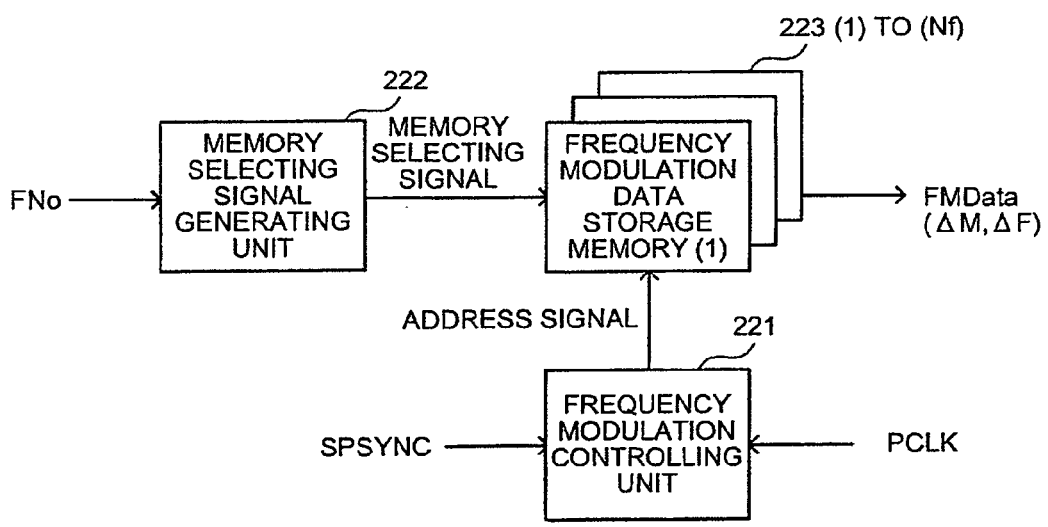
FIG. 18 is a schematic of another mode of the frequency modulation data generating unit included in the pixel clock generating unit according to the second embodiment.

If the nonlinear error in the scanning speed differs by each surface of the polygon mirror 104 and the like, and if the nonlinear error has a periodicity for each scanning line, the frequency modulation data FMData corresponding to each surface may be obtained in advance, and the frequency modulation data FMData corresponding to the surface may be used during scanning. FIG. 18 is a schematic of another frequency modulation data generating unit suitable for such an event.

In FIG. 18, the frequency modulation data generating unit 9 includes the frequency modulation controlling unit 221, a memory selecting signal generating unit 222, and frequency modulation data storage memories 223(1) to (Nf).

A configuration of the frequency modulation controlling unit 221 is the same as that of the frequency modulation controlling unit 221 shown in FIG. 17. Each of the frequency modulation data storage memories 223(1) to (Nf) includes memory. Each of the frequency modulation data storage memories 223(1) to (Nf) stores therein, if the polygon mirror has Nf surfaces, the frequency modulation data FMData corresponding to each region in the scanning line for each surface of the polygon mirror 104.

Each of the frequency modulation data storage memories 223(1) to (Nf) outputs frequency modulation data FMData corresponding to the received address signal and the memory selecting signal. The memory selecting signal generating unit 222 converts the surface selecting signal FNo output from the operation controlling unit 330 of the frequency calculating unit 8 into the memory selecting signal, and outputs the signal.

Because the surface selecting signal FNo indicates the relative surface number, the memory selecting signal generating unit 222 converts the surface selecting signal FNo into the memory selecting signal corresponding to the absolute surface number.

For example, on obtaining the frequency modulation data FMData, the memory selecting signal generating unit 222 performs scanning at a certain pixel clock frequency (without performing frequency control), and measures a deviation Δ of the scanning position on each surface from the ideal position.

At this time, because the scanning speed of each surface is different, the output Lerr of the comparator 5 takes different fixed value in each surface. In general, the absolute surface number of each surface can be specified at least from the permutation of the error Lerr.

Accordingly, the memory selecting signal generating unit 222 stores therein the frequency modulation data FMData obtained by calculating the deviation Δ of the error Lerr of each surface from the ideal position, in correlation with the memory number.

The memory selecting signal generating unit 222, in general operation, performs scanning at a certain pixel clock frequency (without performing frequency control), after the rotation of the polygon mirror 104 is stabled. The memory selecting signal generating unit 222 then obtains the surface selecting signal FNo and the error Lerr in a correlated manner, and correlates the surface selecting signal FNo with the memory number, by matching the arrangement of the errors Lerr and the arrangement of the stored errors Lerr.

To improve accuracy, the memory selecting signal generating unit 222 may use an average of the errors Lerr of a plurality of lines. In this manner, even if the nonlinear error in the scanning speed differs in each surface of the polygon mirror 104, the pixel clock frequency PCLK can be corrected, based on the nonlinear error. Accordingly, it is possible to generate more accurate pixel clock PCLK.

Figure 19:
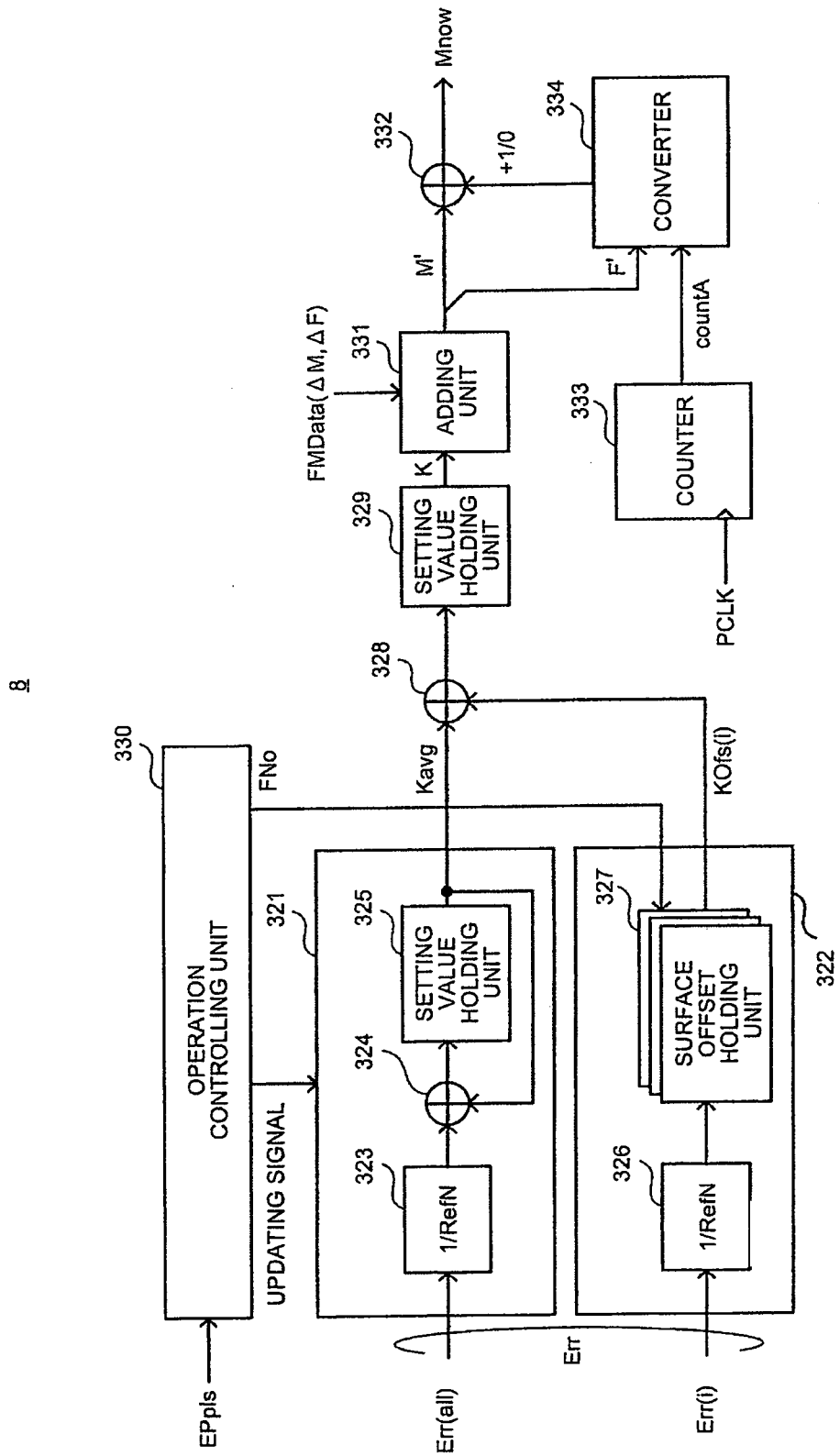
FIG. 19 is a schematic of a frequency calculating unit included in the image forming apparatus according to the second embodiment.

As shown in FIG. 19, the frequency calculating unit 8 is different from the frequency calculating unit 7 according to the first embodiment of the present invention, in including an adding unit 331 at the subsequent stage of the adding unit 328.

The adding unit 331 forms a frequency correcting unit of the present invention with the frequency modulation data generating unit 9.

The adding unit 331 adds ΔF to the decimal portion F of the frequency setting value K, and adds ΔM to the integer portion M of the frequency setting value K. If the figure is carried to the next left column when ΔF is added to the decimal portion F, the carry is added to the integer portion M.

In this manner, the image forming apparatus according to the second embodiment corrects the frequency of the pixel clock PCLK based on the predetermined frequency modulation data FMData, for each of the divided time windows Δn. Accordingly, it is possible to generate a highly accurate pixel clock PCLK in which the nonlinear error is also corrected.

Third Embodiment

Figure 20:
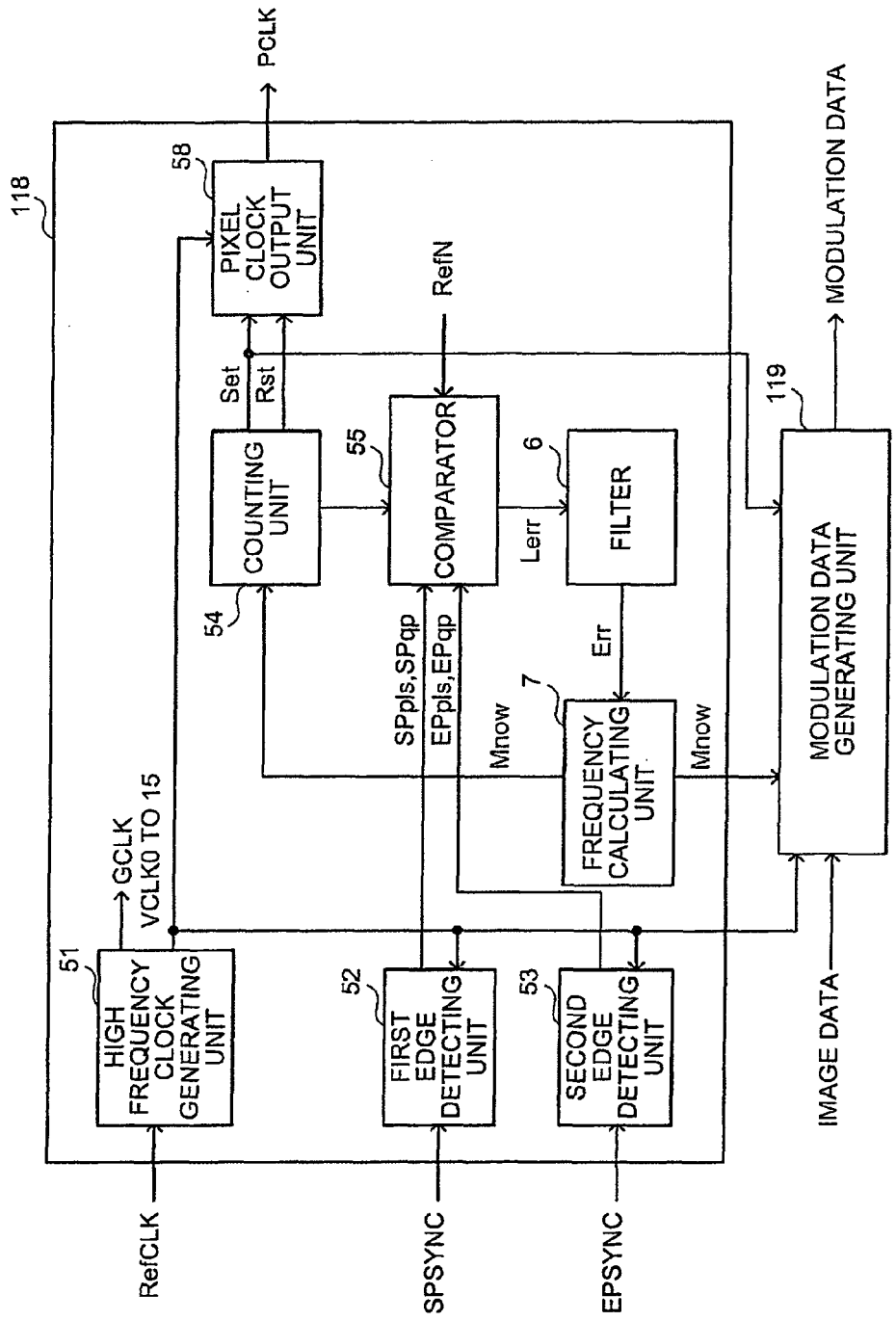
FIG. 20 is a schematic of a pixel clock generating unit and a modulation data generating unit included in an image forming apparatus according to a third embodiment of the present invention.

A third embodiment, as shown in FIG. 20, is different from the first embodiment in including a pixel clock generating unit 118 instead of the pixel clock generating unit 111, and including a modulation data generating unit 119 instead of the modulation data generating unit 113. In the present embodiment, the same members as those in the first embodiment are denoted by the same reference numerals, and the detailed descriptions thereof will be omitted.

The pixel clock generating unit 118 includes a high frequency clock generating unit 51, a first edge detecting unit 52, a second edge detecting unit 53, a counting unit 54, a comparator 55, the filter 6, the frequency calculating unit 7, and a pixel clock output unit 58.

The counting unit 54 forms a pixel clock generating unit of the present invention, and the comparator 55 forms an error calculating unit of the present invention.

The high frequency clock generating unit 51 multiplies the reference clock RefCLK, and generates a multiple-phase clock having an equally spaced phase difference. In the present embodiment, the high frequency clock generating unit 51 generates 16-phase multiple-phase clocks VCLK0 to VCLK15.

The high frequency clock generating unit 51 generates an internal operating clock GCLK obtained by frequency dividing one of the multiple-phase clocks by Q (here, Q=4), and supplies to the units in the pixel clock generating unit 118, although not shown.

Figure 21:
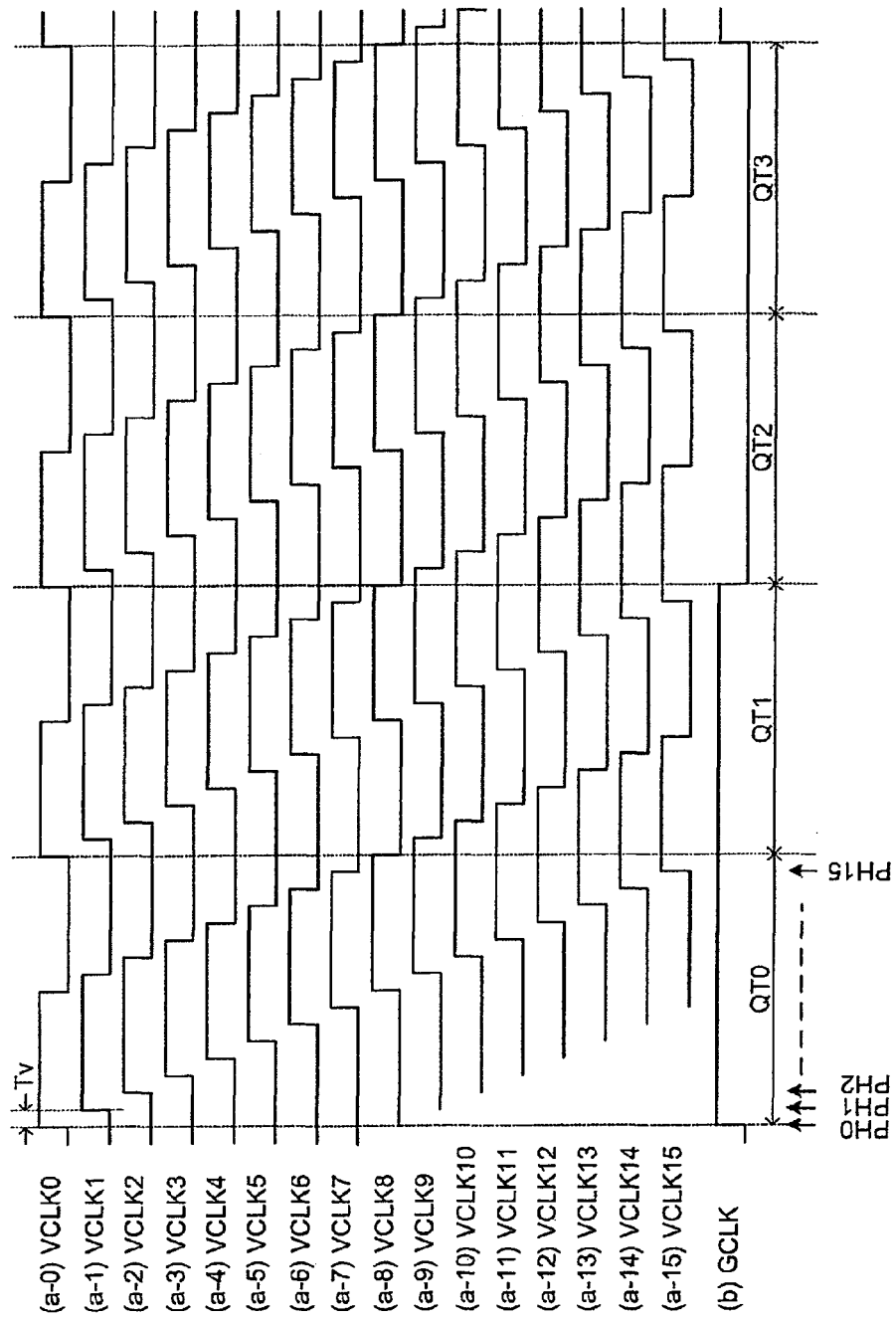
FIG. 21 is a timing chart for explaining an operation performed by a high frequency clock generating unit included in the image forming apparatus according to the third embodiment.

FIG. 21 is a timing chart of clocks generated by the high frequency clock generating unit 51. Here, (a-0) to (a-15) are multiple-phase clocks VCLK0 to VCLK15. The multiple-phase clocks VCLK0 to VCLK15 have equally spaced phase differences, and the time interval is set as Tv. (b) is a clock GCLK obtained by frequency dividing VCLK0 of (a-0) by four.

The pixel clock generating unit 118 operates based mainly on the clock GCLK. Here, the periods obtained by frequency dividing GCLK by four are sequentially referred to as QT0, QT1, QT2, and QT3. The times corresponding to the rises of the multiple-phase clocks VCLK0 to VCLK15 are referred to as PH0 to PH15, and time information QP in GCLK is indicated by the period QT and the phase PH.

The time information QP takes 64 values from 0 to 63, and in the present embodiment, the pixel clock PCLK is generated, based on the phase difference Tv of the multiple-phase clocks VCLK0 to VCLK15. In other words, the control operation on the frequency of the pixel clock PCLK is performed by using the time information QP (QT and PH), based on the operation clock GCLK.

In FIG. 20, the first edge detecting unit 52 detects the rise of the first synchronization signal SPSYNC, based on the multiple-phase clocks VCLK0 to VCLK15. On detecting the rise of the synchronization signal SPSYNC, the first edge detecting unit 52 outputs a detection pulse SPpls synchronized with the clock GCLK, and time information SPqp that indicates the period QT and the phase PH at the time when the rise is detected.

The second edge detecting unit 53 detects the rise of the second synchronization signal EPSYNC, based on the multiple-phase clocks VCLK0 to VCLK15. On detecting the rise of the synchronization signal EPSYNC, the second edge detecting unit 53 outputs a detection pulse EPpls synchronized with the clock GCLK, and time information EPqp that indicates the period QT and the phase PH at the time when the rise is detected.

The counting unit 54 measures the time based on the pixel clock frequency instruction signal Mnow output from the frequency calculating unit 7. A Set signal is generated every time the time indicated by the pixel clock frequency instruction signal Mnow is reached, and a Rst signal is generated at the time corresponding to a half of the time indicated by the pixel clock frequency instruction signal Mnow, after the Set signal is generated.

The Set signal is made of a SETpls signal synchronized with the clock GCLK, and time information SETqp. The Rst signal is made of an RSTpls signal synchronized with the clock GCLK and time information RSTqp. The counting unit 54 measures the time by using the phase difference Tv between the multiple-phase clocks VCLK0 to VCLK15 as a unit.

The pixel clock output unit 58 generates a pixel clock PCLK that switches between "H" and "L", based on the Set signal, and the Rst signal supplied from the counting unit 54, and outputs the clock.

The comparator 55 detects the time Tline between the two synchronization signals SPSYNC and EPSYNC. The comparator 55 calculates a difference between the reference time RefN determined in advance based on the write frequency and the distance between the two photodetectors PDs 108 and 109, and the measured time Tline, as an error Lerr of the target line. In other words, the comparator 55 obtains an error of the scanning speed, based on the difference between an appropriate scanning time (reference time RefN) and the scanning time Tline of the target line.

Here, the comparator 55 counts the number of SETpls fed in during a period starting from a time when SPpls is made to enter until a time when EPpls is made to enter, and compares the value with the reference value RefN. The comparator 55 then calculates an error Lerr of the target line, from the time information of the pulses, by using the phase difference Tv as a unit.

Figure 22:
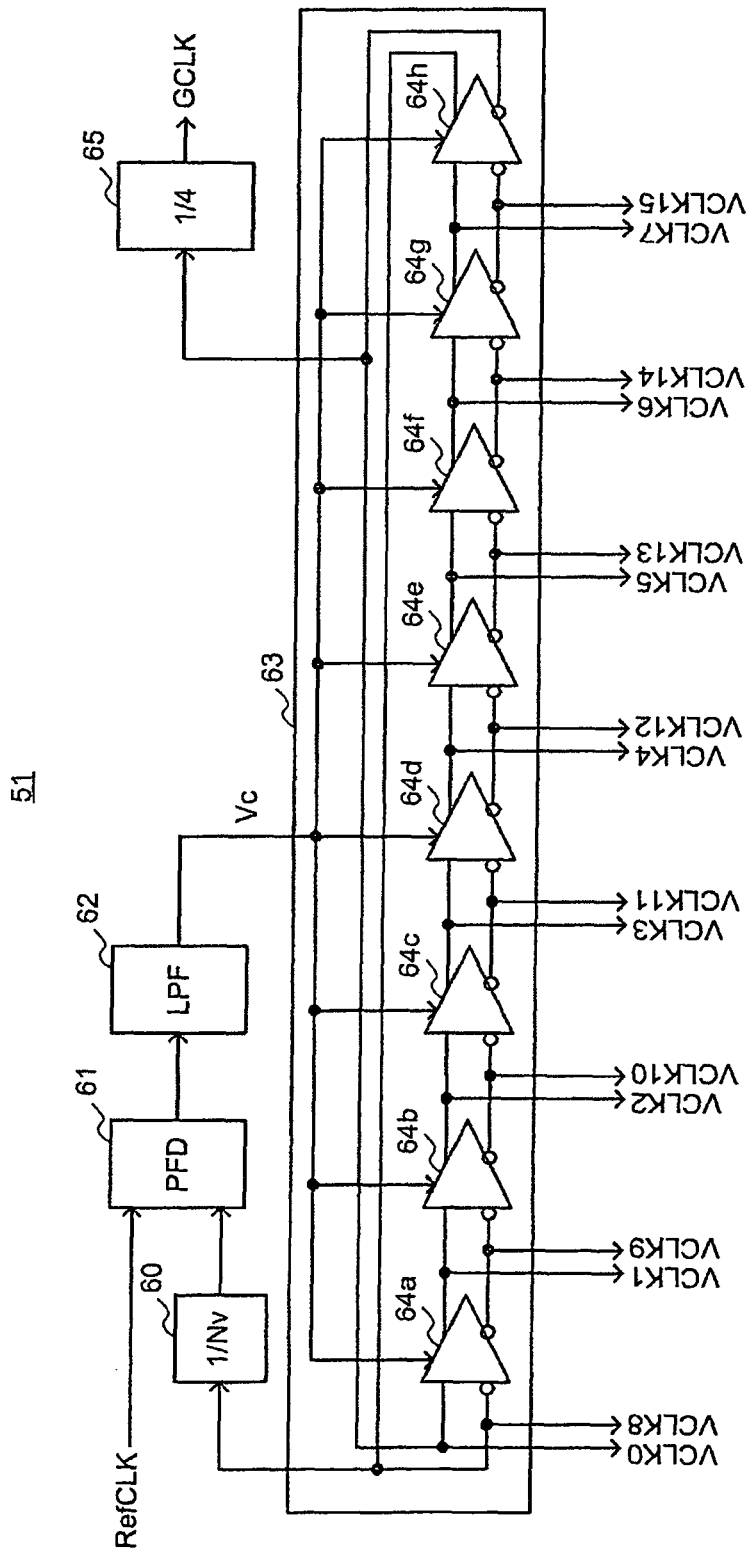
FIG. 22 is a schematic of the high frequency clock generating unit included in the image forming apparatus according to the third embodiment.

FIG. 22 is a schematic of the high frequency clock generating unit 51. The high frequency clock generating unit 51 generates the multiple-phase clocks VCLK0 to VCLK15 and the internal operating clock GCLK, from the reference clock RefCLK.

The high frequency clock generating unit 51 includes a frequency divider 60, a phase frequency detector (hereinafter, simply referred to as "PFD") 61, a low pass filter (LPF) 62, a Voltage Controlled Oscillator (hereinafter, simply referred to as "VCO") 63, and a frequency divider 65.

The VCO 63 includes a ring oscillator to which 8-stages of differential buffers 64a to 64h are connected, and generates 16-phase clocks VCLK0 to VCLK15. The frequency divider 60 frequency divides one of the multiple-phase clocks (here, VCLK8) by Nv.

The PFD 61 includes a charge pump, which is not shown, and drives the charge pump, by comparing the phases between the reference clock RefCLK and the output of the frequency divider 60, and using the comparison result. The LPF 62 smoothes the output from the charge pump, and supplies control voltage Vc to the VCO 63.

The differential buffers 64a to 64h of the VCO 63 change the delay amount based on the control voltage Vc, and controls phase synchronization. For example, if it is assumed that the frequency of the reference clock RefCLK is 100 MHz and a frequency dividing ratio Nv is 20, the multiple-phase clocks VCLK0 to VCLK15 include the equally spaced phase difference, at 2 GHz.

The frequency divider 65 generates a clock GCLK by frequency dividing one of the multiple-phase clocks VCLK0 to VCLK15 (here, it is VCLK0) by Q (here, Q=4).

In the present embodiment, an explanation is made by setting the number of phases of the multiple-phase clocks generated by the VCO 63 to 16. However, in the present invention, it is not limited to 16. Yet, it is preferable that the number of phases of the multiple-phase clocks generated by the VCO 63 is power of two, to simplify the operation. Similarly, it is also preferable that a frequency dividing ratio Q by which the frequency divider 65 generates GCLK is power of two.

Figure 23:
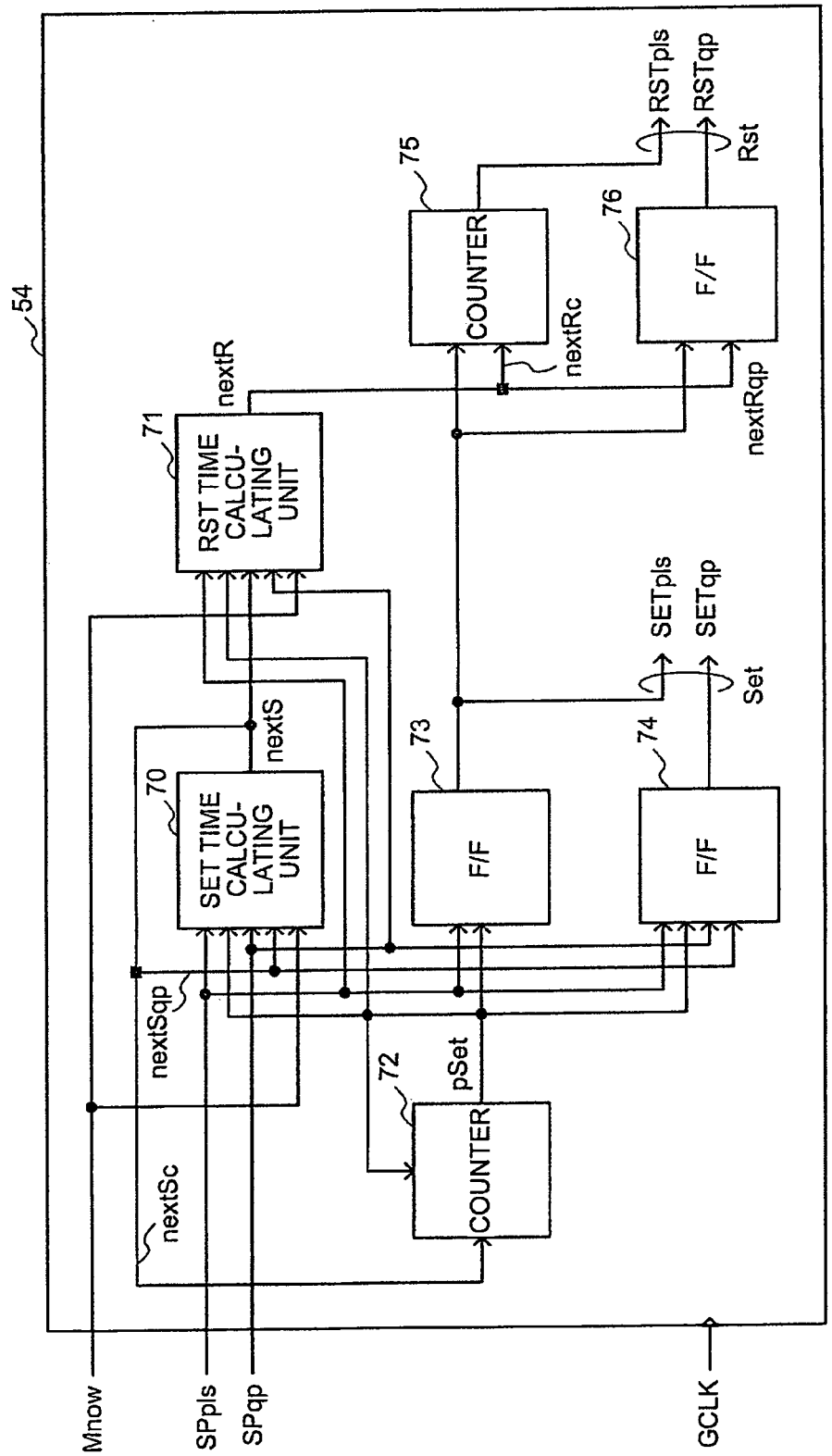
FIG. 23 is a schematic of a counting unit included in the image forming apparatus according to the third embodiment.

FIG. 23 is a schematic of the counting unit 54. The units in the counting unit 54 operate in synchronization with the clock GCLK.

The counting unit 54 includes a SET time operating unit 70, a RST time operating unit 71, a counter 72, flip-flops (hereinafter, simply referred to as "F/F") 73 and 74, a counter 75, and an F/F 76.

The SET time operating unit 70 calculates the rise time of the next pixel clock PCLK, by adding the time indicated by the pixel clock frequency instruction signal Mnow to the rise time of the current pixel clock PCLK. On receiving a pSet signal, the SET time operating unit 70 outputs set time information nextS indicating the rise time of the next pixel clock PCLK.

Here, it is assumed that a quotient obtained by dividing the set time information nextS by 64 is nextSC, and the remainder is nextSqp. In other words, nextSc=nextS[MSB:6] and nextSqp=nextS[5:0].

The SET time operating unit 70 starts generating PCLK by having the phase synchronized with the rise of SPSYNC (to be precise, after a predetermined signal processing time has passed, and here, it is after 2 GCLK). The first PCLK rise time information is SPqp.

The RST time operating unit 71 calculates the fall time of the next pixel clock PCLK, by adding a half of the time indicated by the pixel clock frequency instruction signal Mnow to the rise time of the current pixel clock PCLK. On receiving the pSet signal, the RST time operating unit 71 outputs reset time information nextR that indicates the fall time of the next PCLK.

Here, it is assumed that a quotient obtained by dividing the reset time information nextR by 64 is nextRc, and the remainder is nextRqp. In other words, nextRc=nextR[MSB:6] and nextRqp=nextR[5:0].

The reason why the RST time operating unit 71 adds a half of the time indicated by the pixel clock frequency instruction signal Mnow to the rise time of the current pixel clock PCLK, is to make a duty ratio of the pixel clock PCLK to approximately 50%. If there is no need to make the duty ratio to approximately 50%, a value that can simplify the operation may be added to the time.

The counter 72 counts a nextSc cycle based on the clock GCLK, and generates a pSet signal. When the count value matches with nextSC, the counter 72 sets the pSet signal to "H". If the pSet signal is in "H", the counter 72 clears the count value to "1".

The F/F 73 generates a SETpls signal, by delaying the pSet signal and the SPpls signal as much as 1 GCLK. The F/F 74 latches nextSqp by enabling the pSet signal, latches SPqp by enabling the SPpls signal, and generates a SETqp signal.

The SETpls signal indicates the rise of PCLK by a GCLK unit, and indicates the rise time in the GCLK cycle, with the SETqp signal synchronized therewith. In the following, the SETpls signal and the SETqp signal are collectively referred to as a "Set signal". The Set signal is supplied to the pixel clock output unit 58.

The counter 75 counts the nextRc cycle based on the clock GCLK, and generates an RSTpls signal. The counter 75 clears the count value to "1", when SETpls is in "H". If the count value matches with nextRC, the counter 75 sets the RSTpls signal in "H".

The F/F 76 latches nextRqp by enabling SETpls, and generates an RSTqp signal. The RSTpls signal indicates the fall of PCLK by a GCLK unit, and indicates the fall time in the GCLK cycle by the RSTqp signal.

In the following, the RSTpls signal and the RSTqp signal are collectively referred to as an "Rst signal". The Rst signal is supplied to the pixel clock output unit 58. The SETqp signal and the RSTqp signal may only be valid when the SETpls and RSTpls signals are in "H". Accordingly, in the present invention, the control timing of the units is not limited only to the present embodiment.

Figure 24:
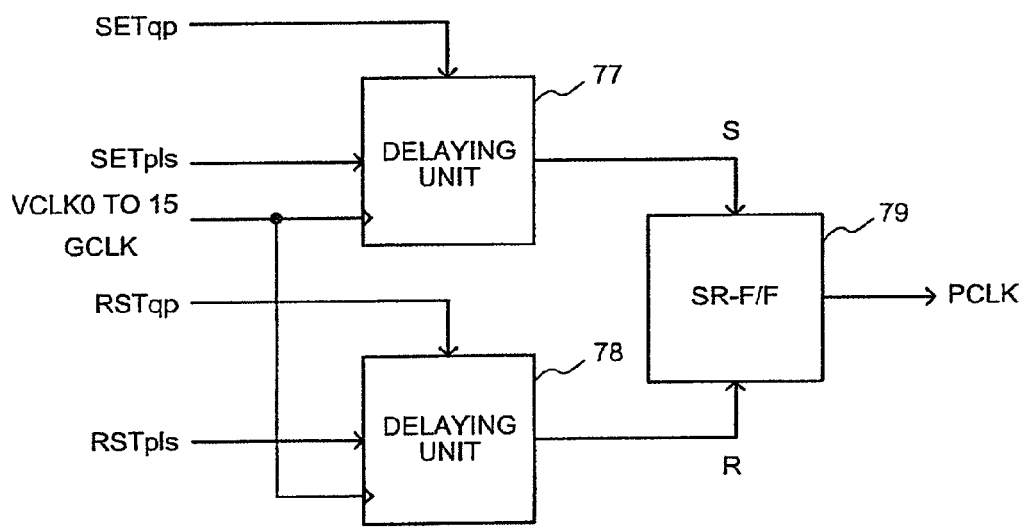
FIG. 24 is a schematic of a pixel clock output unit included in the image forming apparatus according to the third embodiment.

FIG. 24 is a schematic of the pixel clock output unit 58. The pixel clock output unit 58 includes delaying units 77 and 78, and a Set/Rest (SR)-F/F 79.

The delaying unit 77 outputs a pulse S obtained by delaying SETpls supplied from the counting unit 54, corresponding to the time information SETqp, based on the multiple-phase clocks VCLK0 to VCLK15. The delaying unit 77 also feeds the clock GCLK, to specify the period QT in the GCLK cycle.

It is also possible to feed a period signal QT indicating a period (in this case, the high frequency clock generating unit 51 generates the QT signal). In other words, the pulse S is a pulse obtained by delaying SETpls as much as SETqp·Tv.

The delaying unit 78 outputs a pulse R obtained by delaying RSTpls supplied from the counting unit 54, corresponding to the time information RSTqp, based on the multiple-phase clocks VCLK0 to VCLK15. The pulse R is a pulse obtained by delaying RSTpls as much as RSTqp·Tv.

The SR-F/F 79 outputs the pixel clock PCLK set to "H" at the rise of the pulse S, and resets to "L" at the rise of the pulse R.

Figure 25:
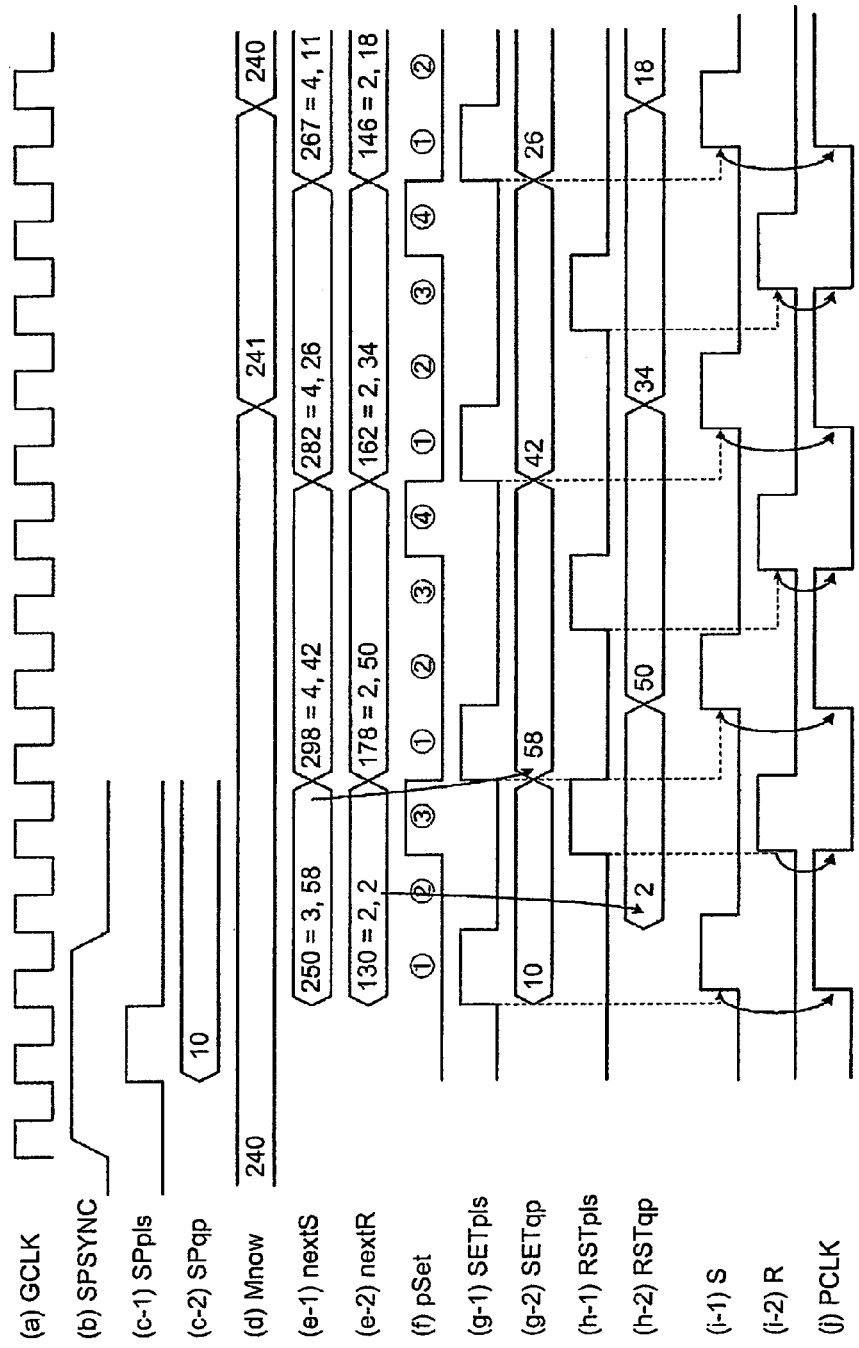
FIG. 25 is a timing chart for explaining operations performed by the counting unit and the pixel clock output unit included in the image forming apparatus according to the third embodiment.

FIG. 25 is a timing chart of signals of the counting unit 54 and the pixel clock output unit 58. In FIG. 25, (a) is a clock GCLK, (b) is SPSYNC, (c-1) is the SPpls signal, and (c-2) is the SPqp signal.

In this manner, on detecting the rise of SPSYNC, the first edge detecting unit 52 outputs an SPpls signal that is in "H" in a cycle period of the next GCLK, and an SPqp signal (here, it is 10) that indicates at when in the GCLK cycle the signal has risen.

(d) is a pixel clock frequency instruction signal supplied from a frequency calculating unit 7, and (e-1) is nextS that indicates the rise time of the next PCLK, calculated by the SET time operating unit 70.

Because PCLK rises in synchronization with the rise of SPSYNC, the next PCLK rises after SPqp+Mnow=250Tv. In nextS shown in (e-1), the value in the right side before the comma indicates nextSc, and the value after the comma indicates nextSqp. The next nextS is nextSqp+Mnow=298.

(e-2) is nextR that indicates the fall time of the next PCLK, calculated by the RST time operating unit 71. A value (=130) obtained by adding Mnow/2 to the rise of SPSYNC is the fall time of PCLK. Similarly to nextS shown in (e-1), the value in the right side before the comma indicates nextRc, and the value after the comma indicates nextRqp.

(f) is a pulse pSet output before one GCLK of SETpls, to update the SETqp signal. pSet is in "H", when the count value of the counter 72 matches with nextSc. A circled numbers in the diagram indicates the count value of nextSc.

(g-1) is a pulse SETpls obtained by delaying the SPpls and pSet signals by one GCLK. SETpls specifies the rise of PCLK by a GCLK unit. (g-2) is the rise time information SETqp of PCLK that indicates the delay value of SETpls. SETqp is updated with a value of nextSqp when pSet is in "H".

(h-1) is a pulse RSTpls that specifies the fall of PCLK by a GCLK unit. RSTpls is in "H", when the count value of the counter 75 matches with nextRc. (h-2) is the fall time information RSTqp of PCLK that indicates the delay value of RSTpls.

(i-1) is a pulse S obtained by delaying SETpls shown in (g-1) as much as a value indicated by SETqp in (g-2). The unit of the delay value is a phase difference Tv of the multiple-phase clocks VCLK0 to VCLK15.

(i-2) is a pulse R obtained by delaying RSTpls shown in (h-1) as much as a value indicated by RSTqp shown in (h-2).

(j) is a pixel clock PCLK generated so as to be in "H" at the rise of the pulse S in (i-1), and in "L" at the rise of the pulse R in (i-2).

Figure 26:
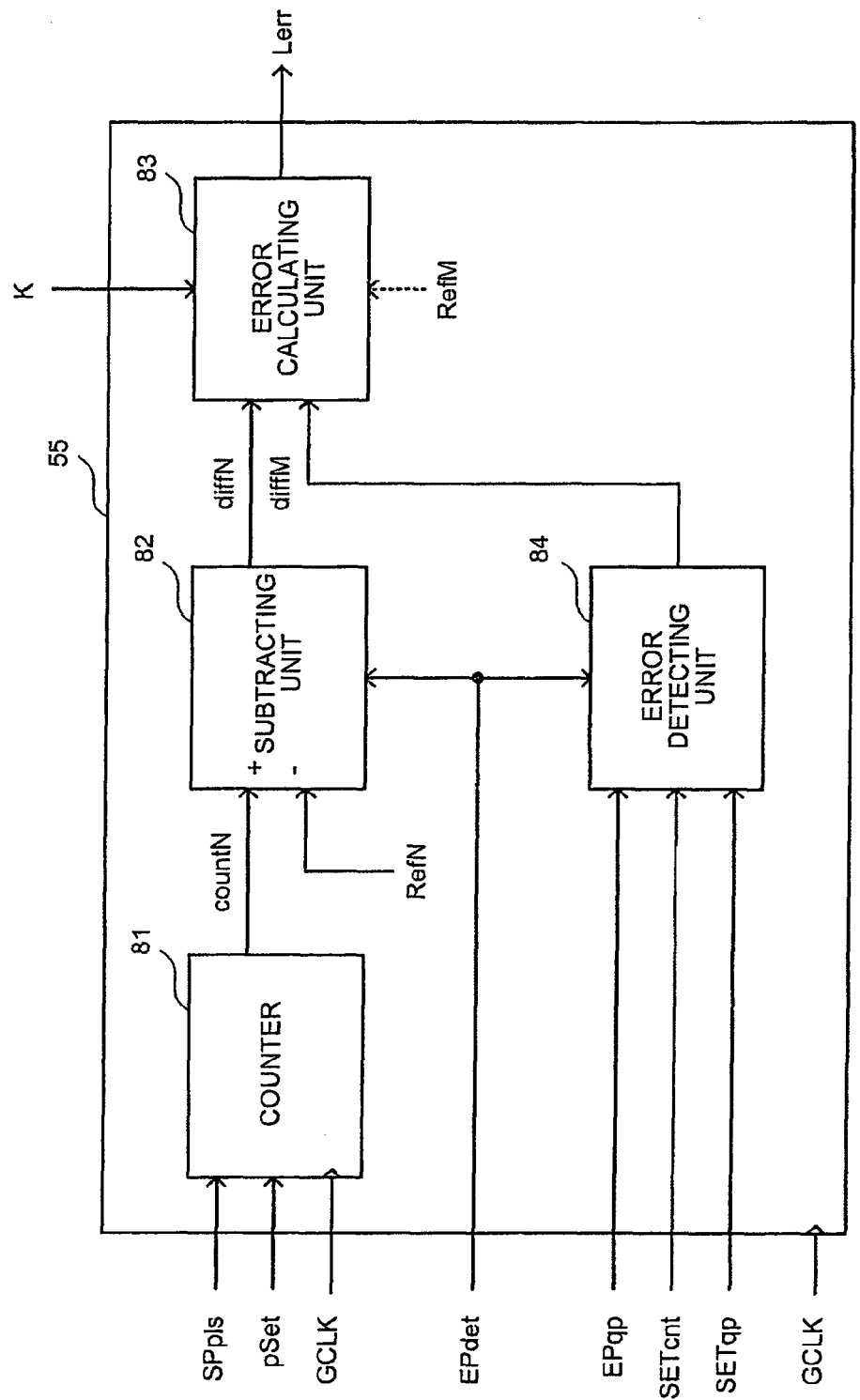
FIG. 26 is a schematic of a comparator included in the image forming apparatus according to the third embodiment.

FIG. 26 is a schematic of the comparator 55. Each unit of the comparator 55 operates in synchronization with the clock GCLK. The comparator 55 includes a counter 81, a subtracting unit 82, an error operating unit 83, and an error detecting unit 84.

The counter 81 clears the count value to "0", when SPpls is made to enter, and increments the count value every time pSet is made to enter. The counter 81 also outputs the count value countN to the subtracting unit 82.

The subtracting unit 82 subtracts a reference value RefN from the count value countN of the counter 81, when Epdet is in "H". The subtracting unit 82 then outputs a subtraction result diffN to the error operating unit 83.

The error detecting unit 84 performs the following operation (Equation 12), if it is assumed that SETqp and SETcnt are Endqp and Endcnt, respectively, when EPdet is in "H", and calculates a phase difference diffM. Mp is the number obtained by dividing the time information of GCLK, and in the present embodiment, Mp is 64.

$$\text{diff}M = \text{End}cnt \cdot Mp + (EPqp - \text{End}qp) \qquad \text{(Equation 12)}$$

The error operating unit 83 performs the following operation (Equation 13), and outputs an error Lerr using the phase difference Tv of the multiple-phase clocks VCLK0 to VCLK15 as a unit. The frequency setting value K is as described in the first embodiment.

$$L\text{err} = \text{diff}N \cdot K + \text{diff}M \qquad \text{(Equation 13)}$$

Similarly to the error operating unit 13 of the comparator 5 according to the first embodiment, the error operating unit 83 may control the pixel clock frequency more precisely, by performing the following operation (Equation 14).

$$L\text{err} = \text{diff}N \cdot K + \text{diff}M - \text{Ref}M \qquad \text{(Equation 14)}$$

Figure 27:
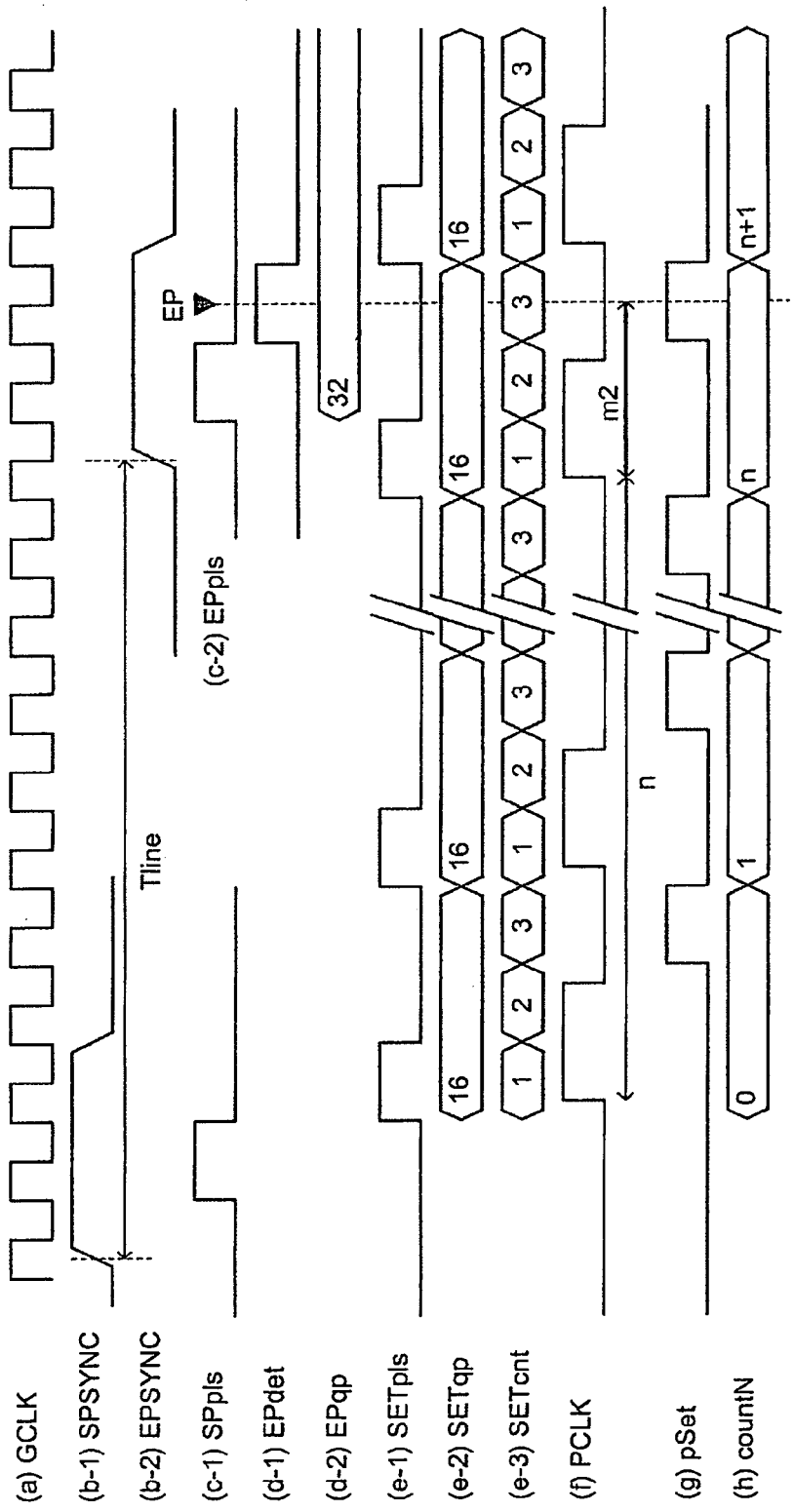
FIG. 27 is a timing chart for explaining an operation performed by the comparator included in the image forming apparatus according to the third embodiment.

FIG. 27 is a timing chart for explaining an operation performed by the comparator 55.

In FIG. 27, (a) is GCLK, (b-1) is the first synchronization signal SPSYNC, and (b-2) is the second synchronization signal EPSYNC, respectively. The time interval between the rises of the two synchronization signals SPSYNC and EPSYNC is the scanning time Tline of the target line.

(c-1) is SPpls, (c-2) is EPpls, (d-2) is time information EPqp of the synchronization signal EPSYNC, (e-1) is SETpls, and (e-2) is the time information SETqp that indicates the rise of PCLK, respectively.

(e-3) is a count value SETcnt of the counter 72, and in the present embodiment, the value is constant at Mnow=192. (f) is the pixel clock PCLK. The pixel clock PCLK is generated and synchronized with SPSYNC exactly after two GCLK. Accordingly, a scan end point EP is also detected at a point delayed by two GCLK from EPSYNC.

Accordingly, an error Lerr is detected from each signal value, when EPdet shown in (d-1) obtained by delaying EPpls shown in (c-2) by one GCLK is in "H".

(g) is pSet, (h) is a count value countN of the counter 81, cleared to "0" by SPpls shown in (c-1) and incremented by pSet shown in (g). In this manner, the number of cycles n of PCLK from the start of scan to the scan end point EP, and the phase error m2 are detected.

Figure 28:
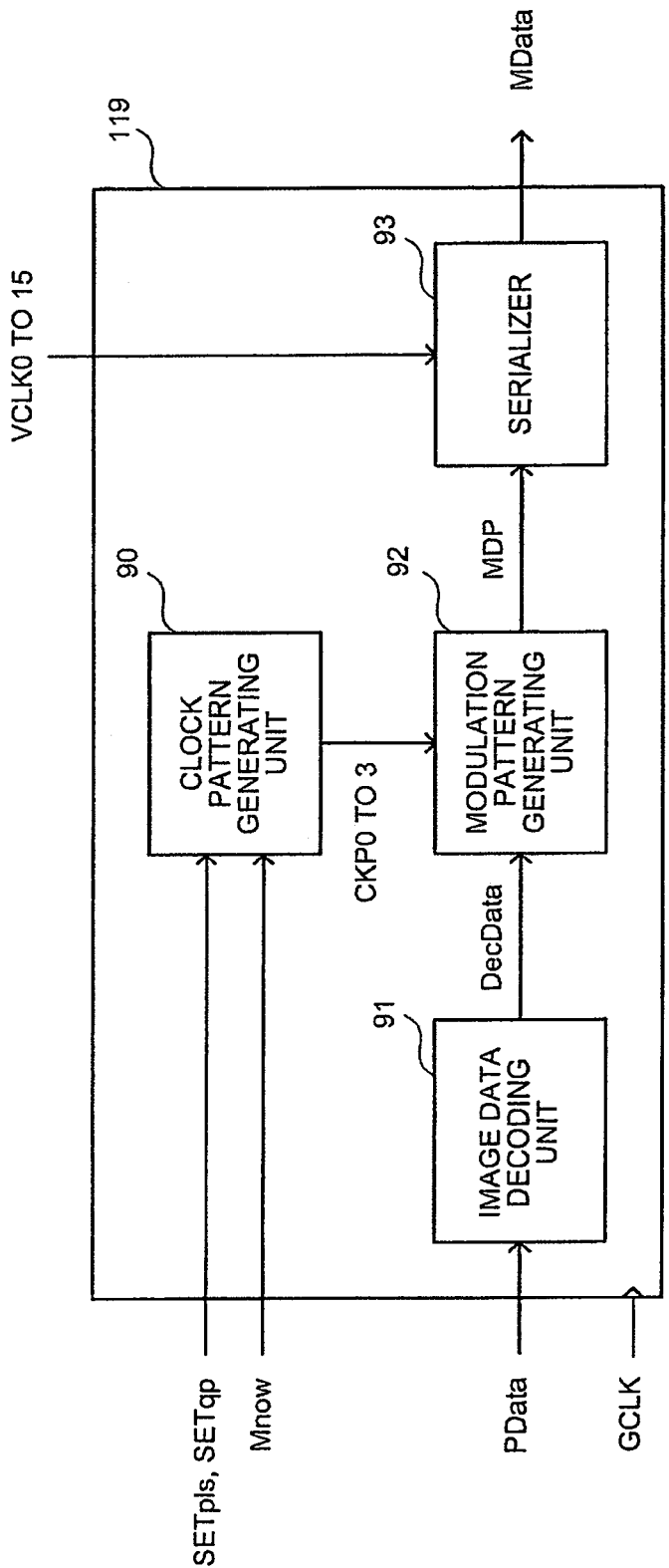
FIG. 28 is a schematic of a modulation data generating unit included in the image forming apparatus according to the third embodiment.

FIG. 28 is a schematic of the modulation data generating unit 119. Here, each unit of the modulation data generating unit 119 operates in synchronization with the clock GCLK. The modulation data generating unit 119 includes a clock pattern generating unit 90, an image data decoding unit 91, a modulation pattern generating unit 92, and a serializer 93.

The clock pattern generating unit 90 generates a clock pattern signal CKP corresponding to the clock having a predetermined phase difference of the pixel clock PCLK. The clock pattern signal CKP is generated from the Set signal supplied from the pixel clock generating unit 118 and including the SETpls and SETqp signals, and the pixel clock frequency instruction signal Mnow. In the present embodiment, the clock pattern signal CKP includes CKP0 to CKP3, and the phases of CKP0 to CKP3 are delayed as much as 0, $\pi/8$, $\pi/4$, $3\pi/8$, from the pixel clock PCLK, respectively.

The clock pattern signal CKP is a signal that changes based on GCLK, and 64-bit data corresponding to the 64 periods Tqp obtained by dividing the GCLK cycle by time information QP. If the period Tqp is in "H", the corresponding bit is "1", and if the period Tqp is in "L", the corresponding bit is "0".

The clock pattern generating unit 90 obtains offset data sofs0 to sofs3 that indicate the rise of the clock patterns, and offset data rofs0 to rofs3 that indicate the fall of the clock patterns.

Here, sofs0=SETqp, sofs1=SETofs+Mnow/8, sofs2=SETofs+Mnow/4, sofs3=SETofs+3Mnow/8, and rofs0 to rofs3 are obtained by adding Mnow/2 to sofs0 to sofs3, respectively.

The clock pattern generating unit 90 sequentially converts each bit from most significant bit (MSB) of the clock pattern CKP into sofs to "0", from sofs to rofs to "1", and from rofs onwards to "0", for each cycle of GCLK. If each offset data is equal to or more than 64, the clock pattern generating unit 90 performs the conversion by delaying one GCLK for each 64.

For example, if Mnow=192 and SETqp=16, CKP1 is sofs=40 and rofs=136 (=2GCLK+8). Accordingly, the pattern of the first GCLK cycle is "0" from MSB (=63) to 24th bits, and "1" from 23rd to 0 bit. The pattern of the second GCLK cycle is all "1", and the pattern of the third GCLK cycle is "1" from 63rd to 56th bits, and "0" from 55th to 0 bit.

The image data decoding unit 91 converts the image data PData into 8-value pulse width modulation data DecData (8 bits). The bits corresponds to the pulse width modulation data DecData, in the order from MSB to least significant bit (LSB), in time sequence of periods obtained by time-dividing one cycle of the pixel clock PCLK by eight.

For example, if PData=3, the image data decoding unit 91 converts as DecData='b11100000 ('b indicates binary notation). The image data decoding unit 91 may also convert as DecData='b00000111, or convert so that both modes can be switched by adding a mode switching signal. The conversion method may be randomly selected within the scope of the present invention.

The modulation pattern generating unit 92 generates a modulation pattern signal MDP, from the pulse width modulation data DecData and the clock pattern signals CKP0 to CKP3. The modulation pattern signal MDP, similarly to the clock pattern signal CKP, is a signal that changes based on GCLK, and 64 bits data corresponding to 64 periods Tqp obtained by dividing the GCLK cycle by the time information QP.

The serializer 93 generates modulation data MData in which the modulation pattern signal MDP is serially output in the order from MSB (in other words, in order of time) by each Tv time, based on the multiple-phase clocks VCLK0 to VCLK15.

Figure 29:
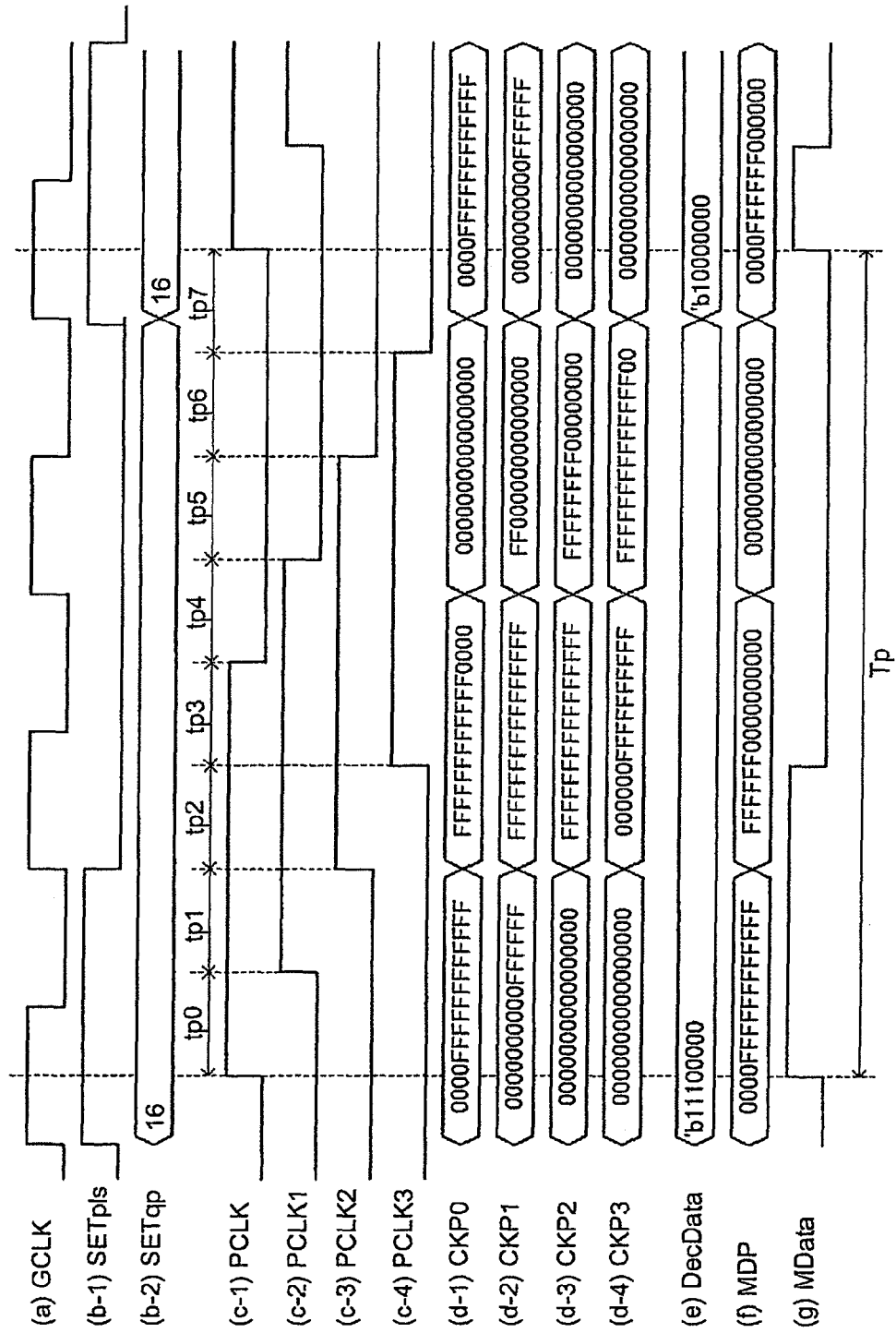
FIG. 29 is a timing chart for explaining an operation performed by the modulation data generating unit included in the image forming apparatus according to the third embodiment.

FIG. 29 is a timing chart for explaining an operation performed by the modulation data generating unit 119.

In FIG. 29, (a) is GCLK, which is a reference clock, (b-1) is SETpls, (b-2) is SETqp, and (c-1) is a pixel clock PCLK. Here, it is assumed that the pixel clock frequency instruction signal Mnow is 192.

(c-2), (c-3), and (c-4) are clocks PCLK1, PCLK2, and PCLK3, that are not actually generated, but obtained by delaying the phase of the pixel clock PCLK as much as $\pi/8$, $\pi/4$, and $3\pi/8$.

(d-1) to (d-4) are the clock patterns CKP0 to CKP3 that indicate PCLK, and PCLK1 to PCLK3. The clock patterns CKP0 to CKP3 are 64-bit data, ordered in time from MSB to LSB, and are in hexadecimal (HEX) notation.

Accordingly, patterns (PT0 to PT7 in order of time) that indicate the periods obtained by time dividing the pixel clock PCLK by eight (tp0 to tp7) are generated, from the clock patterns CKP0 to CKP3.

In other words, PT0=CKP0&~CKP1, PT1=CKP1&CKP2, ..., PT7=~CKP3&~CKP0. Here, & indicates AND operation, and ~ indicates NOT operation.

(e) is pulse width modulation data DecData, and (f) is a modulation pattern signal MDP. The modulation pattern signal MDP is obtained by calculating ({64{DecData[7-i]}}&PTi) when i is changed from 0 to 7, and then performing the OR operation. Here, {64{DecData[i]}} is data obtained by connecting DecData[i] for 64 bits.

(g) is the modulation data MData. The modulation data MData is generated by serializing the modulation pattern signal MData shown in (f). In FIG. 29, a pulse whose width is modulated so that the first 3/8 period of the PCLK cycle Tp is in "H", and the remainder period is in "L", is generated as modulation data MData.

In this manner, the image forming apparatus according to the third embodiment generates the pixel clock PCLK from the multiple-phase clocks VCLK0 to VCLK15, and controls the average Kavg of the frequency of the pixel clock PCLK and the offset value KOfs(i) of the frequency of the pixel clock PCLK in parallel, corresponding to the fluctuation in scanning time. The image forming apparatus sets the frequency of the pixel clock PCKL, based on the frequency setting value K to which the values are added. Accordingly, it is possible to increase the control bandwidth, even if the speed of the device is increased, thereby sufficiently suppressing high frequency jitter.

The modulation data generating unit 119 may generate patterns PT0 to PT7 that indicate the periods obtained by time dividing one cycle of the pixel clock PCLK by eight, instead of generating the clock patterns CKP0 to CKP3 obtained by shifting the phase of the pixel clock by π/8 each. Accordingly, the modulation pattern signal MDP can be generated from the patterns PT0 to PT7 and the pulse width modulation data DecData.

In the present embodiment, the modulation data generating unit 119 performed the 8-value pulse width modulation. However, the other modulation methods may also be applied. For example, a 16-value pulse width modulation may be performed. In this case, the image data decoding unit 91 converts the image data PData into 16-bit pulse width modulation data DecData, and the clock pattern generating unit 90 generates eight clock patterns CKP0 to CKP7 whose phases are shifted from the pixel clock PCLK by π/16 each. Accordingly, the modulation pattern generating unit 92 can similarly generate the modulation pattern signal MDP.

The schematic of the modulation data generating unit 119 shown in FIG. 28 may also be applied in the pixel clock output unit 58 shown in FIG. 24. In other words, the pixel clock output unit 58 can generate the pixel clock PCLK, by generating a clock pattern PCKP of the pixel clock PCLK (may use the clock pattern signal CKP0), and serially outputting the clock patterns PCKP in the order from MSB (in other words, in order of time) for each Tv time, based on the multiple-phase clocks VCLK0 to VCLK15.

Fourth Embodiment

Figure 30:
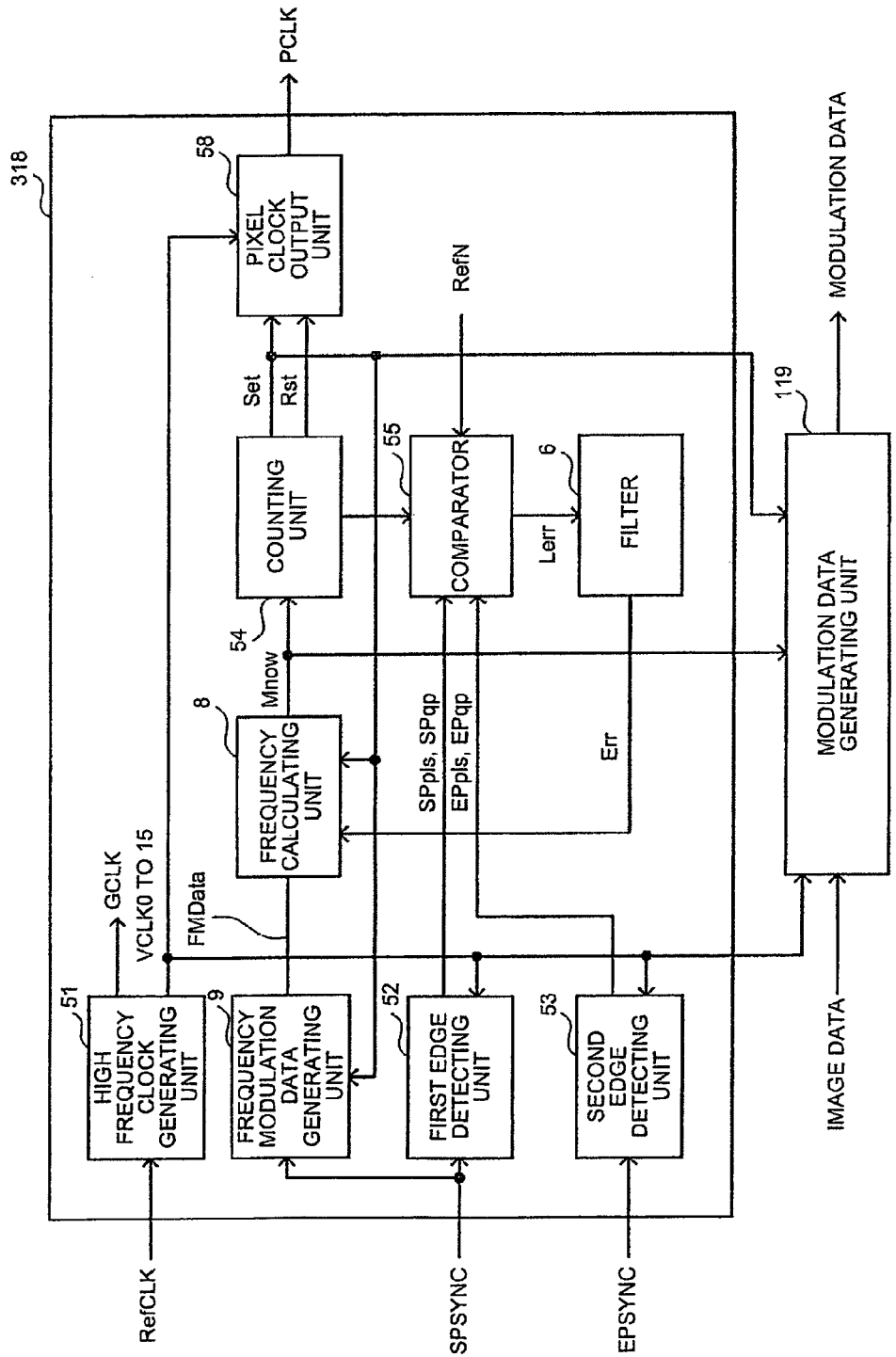
FIG. 30 is a schematic of a pixel clock generating unit and a modulation data generating unit included in an image forming apparatus according to a fourth embodiment of the present invention.

Similarly to the second embodiment including the pixel clock generating unit 211 instead of the pixel clock generating unit 111 according to the first embodiment, as shown in FIG. 30, a fourth embodiment is different from the third embodiment in including a pixel clock generating unit 318 instead of the pixel clock generating unit 118. In the present embodiment, the same members as those in the first embodiment are denoted by the same reference numerals, and the detailed descriptions thereof will be omitted.

The pixel clock generating unit 318 is different from the pixel clock generating unit 118 according to the third embodiment of the present invention, in including the frequency calculating unit 8 instead of the frequency calculating unit 7, and also including the frequency modulation data generating unit 9.

The frequency calculating unit 8 and the frequency modulation data generating unit 9 are similarly formed as the frequency calculating unit 8 and the frequency modulation data generating unit 9 of the pixel clock generating unit 211 according to the second embodiment. Accordingly, the detailed descriptions thereof will be omitted, by denoting the same reference numerals.

In the present embodiment, as shown in FIG. 30, the frequency calculating unit 8 and the frequency modulation data generating unit 9 may be operated based on a set pulse Set instead of the pixel clock PCLK.

In this manner, an image forming apparatus according to the fourth embodiment corrects the frequency of the pixel clock PCLK based on predetermined frequency modulation data FMData, for each of the divided time windows Δn. Accordingly, it is possible to generate a highly accurate pixel clock PCLK in which the nonlinear error is also corrected.

Fifth Embodiment

An image forming apparatus according to the present embodiment uses a multi-beam scanning optical system in which an image (electrostatic latent image) is formed by irradiating a photosensitive element with rays of light output from a plurality of light sources, by using a common scanning optical system. In the present embodiment, the same members as those in the first embodiment according to the present invention are denoted by the same reference numerals, and the detailed descriptions thereof will be omitted.

Figure 31:
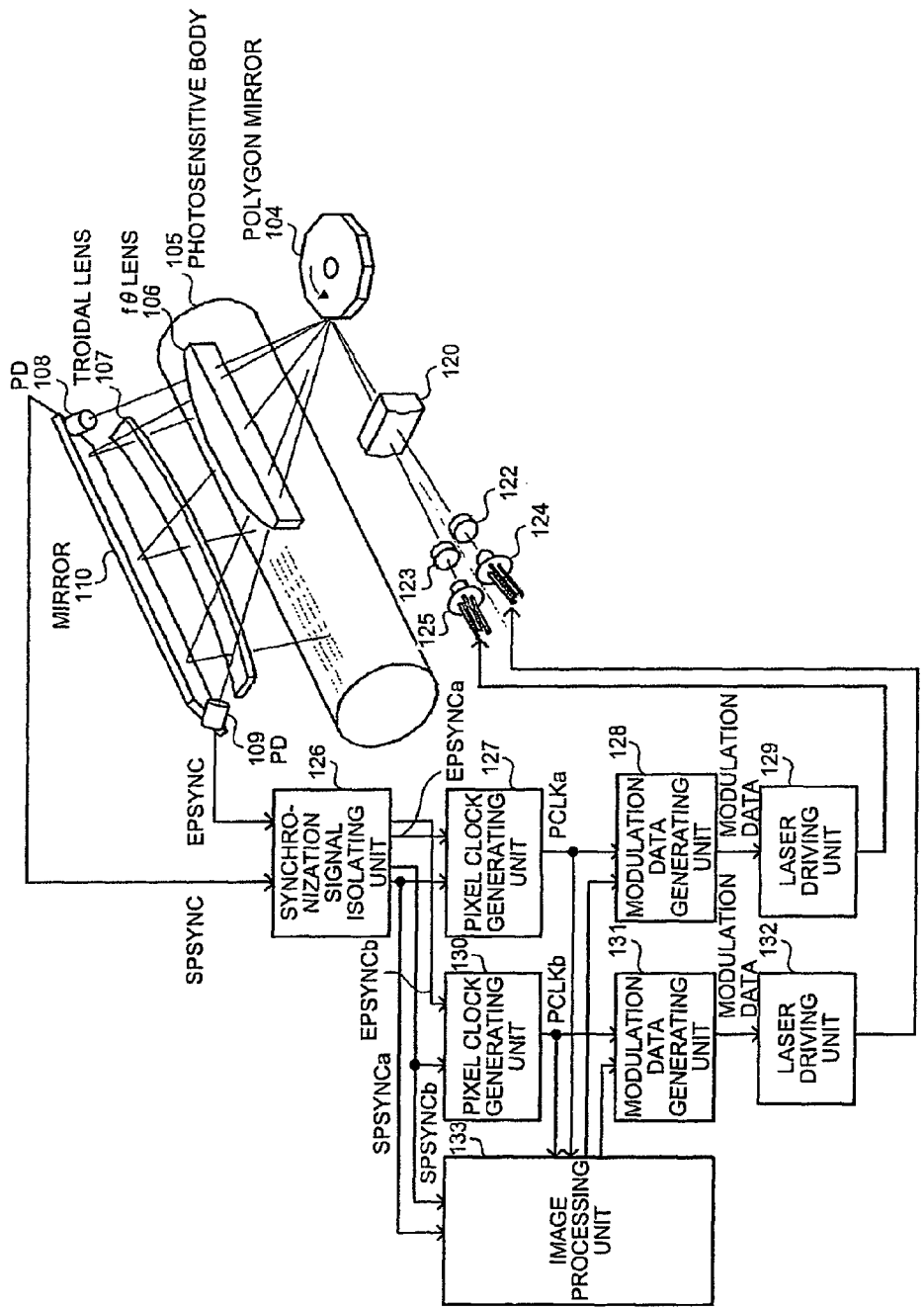
FIG. 31 is a schematic configuration of an image forming apparatus according to a fifth embodiment of the present invention.

As shown in FIG. 31, the image forming apparatus according to the present embodiment includes semiconductor lasers 124 and 125, collimator lenses 122 and 123, a cylinder lens 120, the polygon mirror 104, the photosensitive element 105, the V) lens 106, the toroidal lens 107, the PDs 108 and 109, the mirror 110, a synchronization signal isolating unit 126, pixel clock generating units 127 and 130, an image processing unit 133, modulation data generating units 128 and 131, and laser driving units 129 and 132.

In the present embodiment, the collimator lenses 122 and 123, the cylinder lens 120, the polygon mirror 104, the fθ lens 106, the toroidal lens 107, and the mirror 110 form an optical scanner of the present invention.

The semiconductor lasers 124 and 125 are laid out, so that the emission axes are aligned with the optical axes of the collimator lenses 122 and 123, the emission angle is symmetrical in the main scanning direction, and the emission axes intersect with each other at a reflection point on the polygon mirror 104.

A plurality of laser light beams output from the semiconductor lasers 124 and 125 are collectively scanned on the polygon mirror 104 through the cylinder lens 120. The laser light beams are emitted on the photosensitive element 105, through the fθ lens 106, the mirror 110, and the toroidal lens 107, thereby forming an optical spot. Accordingly, an electrostatic latent image is formed on the photosensitive element 105, corresponding to the outputs from the semiconductor lasers 124 and 125.

The image processing unit 133 stores therein image data of one line for each light source. The data is read out for each surface of the polygon mirror 104, and written simultaneously on two lines each.

The PDs 108 and 109 are arranged at both ends of the mirror 110, and detect the start and the end of the scan. In other words, the laser light beams reflected by the polygon mirror 104 are sequentially made to enter the PD 108, before scanning one line on the photosensitive element 105, and made to enter the PD 109, after the scanning is finished.

The PDs 108 and 109 convert the entering laser light beams into the first synchronization signal SPSYNC and the second synchronization signal EPSYNC, respectively, and supply to the synchronization signal isolating unit 126.

The two light sources are arranged so as to scan the photosensitive element 105 with a time difference. Accordingly, the synchronization signal isolating unit 126 divides the synchronization signal SPSYNC to synchronization signals SPSYNCa and SPSYNCb corresponding to each light source, and divides the synchronization signal EPSYNC to synchronization signals EPSYNCa and EPSYNCb corresponding to each light source.

Figure 32:
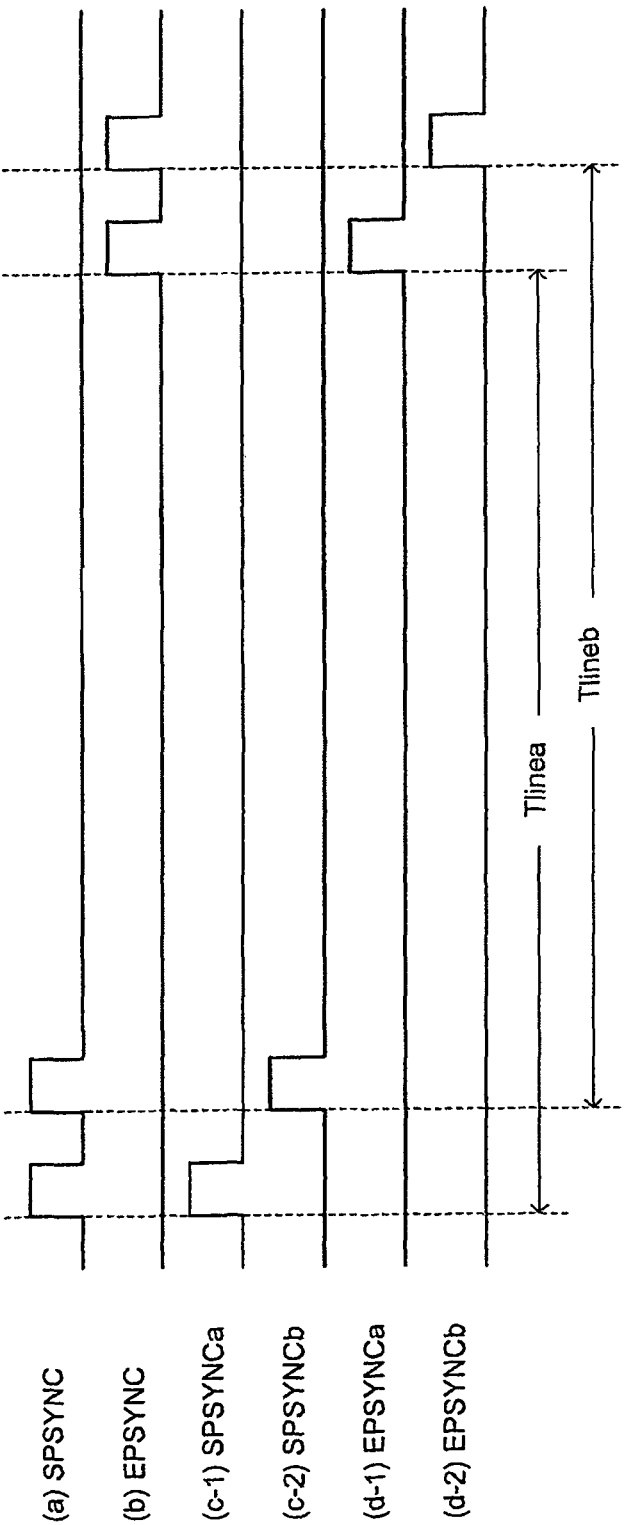
FIG. 32 is a timing chart of synchronization signals of the image forming apparatus according to the fifth embodiment.

FIG. 32 is a timing chart of the synchronization signals. (a) is the first synchronization signal SPSYNC, and (b) is the second synchronization signal EPSYNC. If the laser light output from the semiconductor laser 125 is scanned first, the synchronization signal isolating unit 126 divides the synchronization signal SPSYNC shown in (a), into SPSYNCa shown in (c-1) and SPSYNCb shown in (c-2). The synchronization signal isolating unit 126 also divides the synchronization signal EPSYNC shown in (b), into EPSYNCa shown in (d-1) and EPSYNCb shown in (d-2).

In FIG. 31, one set of the synchronization signals SPSYNCa and EPSYNCa being divided are supplied to the pixel clock generating unit 127, and the other set of the SPSYNCb and EPSYNCb are supplied to the pixel clock generating unit 130.

The pixel clock generating unit 127 measures the scanning time Tlinea from the two synchronization signals SPSYNCa and EPSYNCa, and generates a pixel clock PCLKa having a frequency obtained so that a predetermined number of clocks fall within the time interval.

The image processing unit 133 generates image data a, based on the pixel clock PCLKa. The modulation data generating unit 128 generates modulation data a from the entering image data a, based on the pixel clock PCLKa, and drives the semiconductor laser 125 through the laser driving unit 129.

The pixel clock generating unit 130 measures a scanning time Tlineb from the two synchronization signals SPSYNCb and EPSYNCb, and generates a pixel clock PCLKb having a frequency obtained so that a predetermined number of clocks fall within the time interval.

The image processing unit 133 generates image data b based on the pixel clock PCLKb. The modulation data generating unit 131 generates modulation data b from the entering image data b, based on the pixel clock PCLKb, and drives the semiconductor laser 124 through the laser driving unit 132.

The pixel clock generating units 127 and 130 are formed in a similar manner to the pixel clock generating unit 111 according to the first embodiment. The modulation data generating units 128 and 131 are formed in a similar manner to the modulation data generating unit 113 according to the first embodiment. The laser driving units 129 and 132 are formed in a similar manner to the laser driving unit 114 according to the first embodiment.

The pixel clock generating units 127 and 130 may be formed in a similar manner to the pixel clock generating unit 118 according to the second embodiment.

The pixel clock generating units 127 and 130 may be formed in a similar manner to the pixel clock generating unit 118 according to the third embodiment, and the modulation data generating units 128 and 131 may be formed in a similar manner to the modulation data generating unit 119 according to the third embodiment.

The pixel clock generating units. 127 and 130 may be formed in a similar manner to the pixel clock generating unit 318 according to the fourth embodiment, and the modulation data generating units 128 and 131 may be formed in a similar manner to the modulation data generating unit 119 according to the third embodiment.

Here, the pixel clock generating unit 127 and the pixel clock generating unit 130 may commonly use the high frequency clock generating unit 1 (or 51). By configuring in this manner, it is possible to reduce the circuit scale and reduce the power consumption.

The pixel clock generating unit 127 and the pixel clock generating unit 130 may commonly use the edge detecting units 2 and 3 (or 52 and 53), and separate the detection signal.

A part of operation performed by the filter 6 and the frequency calculating unit 7 (or 8) is only operated once per line. Accordingly, these may be commonly used and processed in chronological order for a plurality of pixel clock frequency operations.

In this manner, the image forming apparatus according to the fifth embodiment can increase the control bandwidth while increasing the speed of the device, even if the multibeam scanning optical system is applied. Consequently, it is possible to sufficiently suppress high frequency jitter.

Sixth Embodiment

An image forming apparatus according to the present embodiment is a tandem type multi-color image forming apparatus including a plurality of photosensitive bodies. The image forming apparatus includes separate photosensitive bodies corresponding to colors of cyan, magenta, yellow, and black, respectively, and includes scanning optical systems corresponding to the photosensitive bodies. The image forming apparatus forms an image (electrostatic latent image) corresponding to each color, on each photosensitive element. Consequently, the image forming apparatus according to the present embodiment forms a color image by transferring an image of each color on an image forming medium (such as paper).

The image forming apparatus according to the present embodiment can be obtained by simply providing four image forming apparatuses shown in FIG. 1. To reduce size, some image forming apparatuses commonly use a part of the scanning optical system. However, because optical paths are different, it may be assumed that a plurality of different image forming apparatuses is provided.

Figure 33:
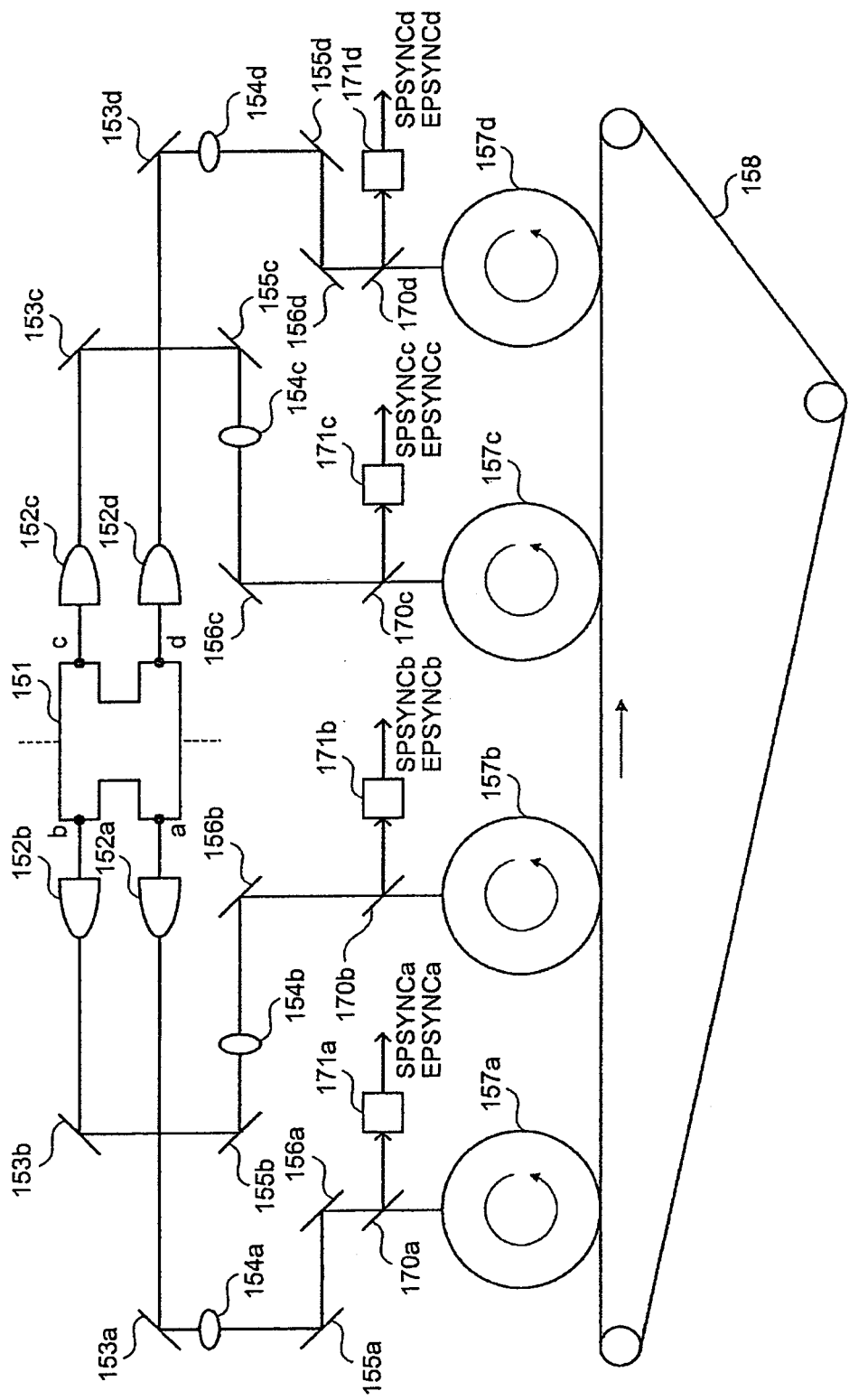
FIG. 33 is a schematic configuration of a part of the image forming apparatus according to the fifth embodiment.

As shown in FIG. 33, the image forming apparatus according to the present embodiment includes a polygon mirror 151, scanning lenses 152a to 152d, and 154a to 154d, folding mirrors 153a to 153d, 155a to 155d, and 156a to 156d, photosensitive bodies 157a to 157d, an intermediate transfer belt 158, mirrors 170a to 170d, and PDs 171a to 171d.

In the present embodiment, the polygon mirror 151, the scanning lenses 152a to 152d, and 154a to 154d, the folding mirrors 153a to 153d, 155a to 155d, and 156a to 156d, the mirrors 170a to 170d, and the PDs 171a to 171d form an optical scanner of the present invention.

Figure 34:
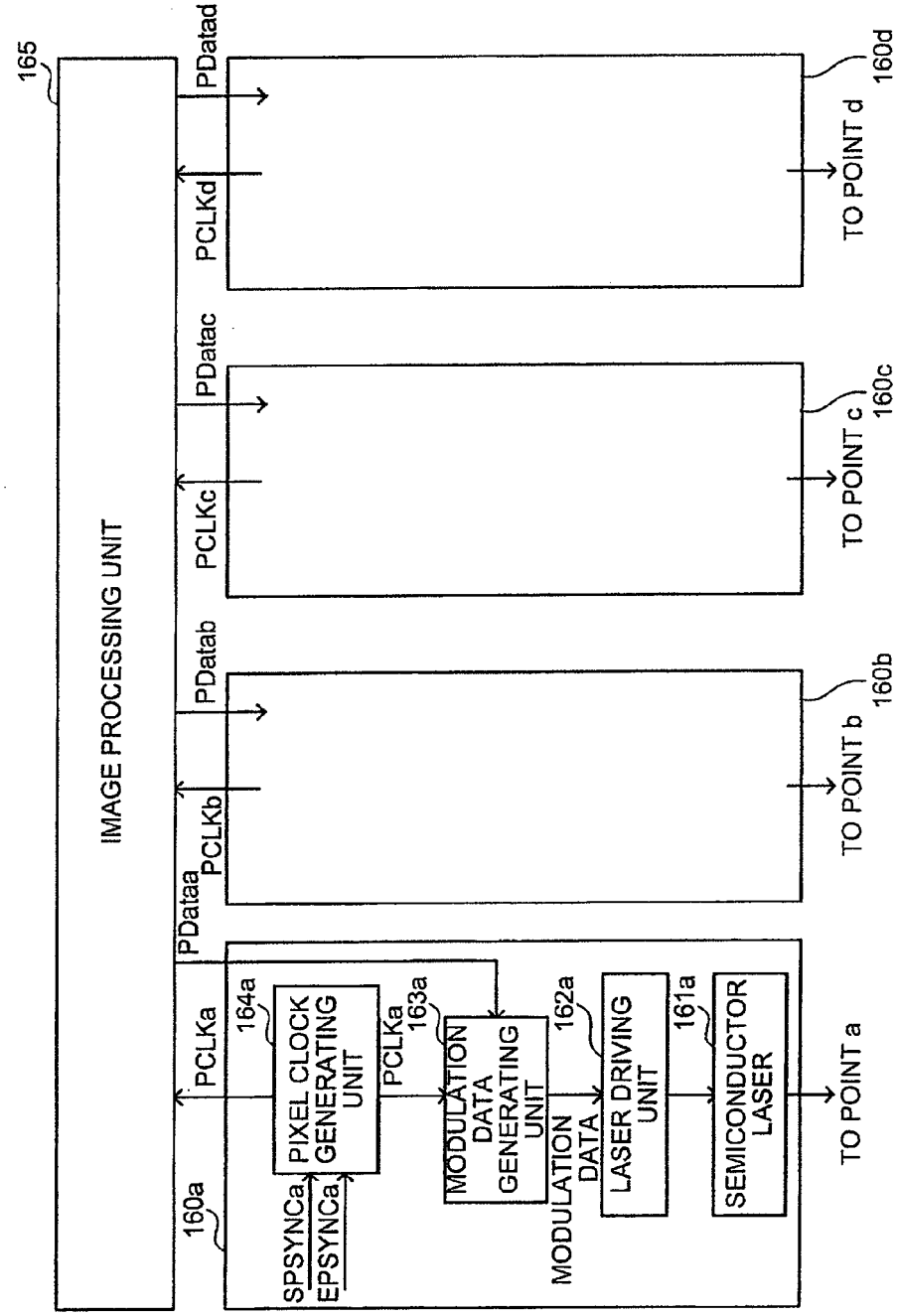
FIG. 34 is a schematic configuration of another part of the image forming apparatus according to the fifth embodiment.

As shown in FIG. 34, the image forming apparatus according to the present embodiment includes an image processing unit 165, and units 160a to 160d. The unit 160a includes a pixel clock generating unit 164a, a modulation data generating unit 163a, a laser driving unit 162a, and a semiconductor laser 161a.

Similarly to the unit 160a, the units 160b to 160d also include a pixel clock generating unit, a modulation data generating unit, a laser driving unit, and a semiconductor laser, although not shown.

The polygon mirror 151 is formed in two stages, and can rotate about the broken line in FIG. 33. The scanning optical systems commonly use the polygon mirror 151. The laser light output from the semiconductor laser 161a is reflected at a point a on the polygon mirror 151, through a collimator lens and a cylinder lens, which are not shown. Similarly, the laser light beams output from the semiconductor lasers of the units 160b to 160d are reflected at points b to d on the polygon mirror 151, respectively.

The laser light beams reflected by the polygon mirror 151 pass thorough the scanning lenses 152a to 152d, 154a to 154d, and the folding mirrors 153a to 153d, 155a to 155d, and 156a to 156d, respectively. The laser light beams scan on the photosensitive bodies 157a to 157d, which are media to be scanned, and form an electrostatic latent image. The scanning direction of the beam, in other words, the main scanning direction is in the depth direction in FIG. 33.

The letters a to d denoted to the reference numerals of the members correspond to the color emitted from each semiconductor laser, and used to form images corresponding to the colors of yellow, magenta, cyan, and black, respectively.

In this manner, the image forming apparatus according to the present embodiment forms a color image on an image forming medium that is placed on the intermediate transfer belt 158 and moves towards an arrow in FIG. 33, by transferring an electrostatic latent image of each color formed on the photosensitive bodies 157a to 157d thereto.

The mirrors 170a to 170d are arranged at both sides of the outside of the valid scanning range, and guide the laser light beams to the PDs 171a to 171d. The PD 171a converts the entering laser light into the first synchronization signal SPSYNCa and the second synchronization signal EPSYNCa, and supplies the signals to the unit 160a.

Similarly to the PD 171a, the PDs 171b to 171d supply the synchronization signals SPSYNCb and EPSYNCb, SPSYNCc and EPSYNCc, and SPSYNCd and EPSYNCd, to the units 160b to 160d.

The pixel clock generating unit 164a generates a pixel clock PCLKa whose frequency is controlled so as to correct the scanning speed error, based on the synchronization signals SPSYNCa and EPSYNCa. The pixel clock generating units of the units 160b to 160d also generate pixel clocks PCLKb to PCLKd, based on the synchronization signals.

The image processing unit 165 generates image data PDataa to PDatad, based on the pixel clocks PCLKa to PCLKd. The modulation data generating unit 163a generates modulation data from the entering image data PDataa, based on the pixel clock PCLKa, and the laser driving unit 162a drives the semiconductor laser 161a based on the modulation data.

The modulation data generating unit, the laser driving unit, and the semiconductor laser of the units 160b to 160d are formed in a similar manner to the modulation data generating unit 163a, the laser driving unit 162a, and the semiconductor laser 161a.

In the units 160b to 160d, the pixel clock generating unit is formed in a similar manner to the pixel clock generating unit 111 according to the first embodiment. The modulation data generating unit is formed in a similar manner to the modulation data generating unit 113 according to the first embodiment. The laser driving unit is formed in a similar manner to the laser driving unit 114 according to the first embodiment. The pixel clock generating unit may be formed in a similar manner to the pixel clock generating unit 118 according to the second embodiment.

The pixel clock generating unit may be formed in a similar manner to the pixel clock generating unit 118 according to the third embodiment, and the modulation data generating unit may be formed in a similar manner to the modulation data generating unit 119 according to the third embodiment of the present invention. The pixel clock generating unit may also be formed in a similar manner to the pixel clock generating unit 318 according to the fourth embodiment of the present invention.

Here, a reference value RefN that acts as a reference for the pixel clock frequency control is obtained in advance during the manufacturing of the image forming apparatus, for example, for each scanning optical system, and set in the pixel clock generating units. This is because the scanning time in each scanning optical system is different due to, for example, manufacturing accuracy, assembling accuracy, and deformation with the elapse of time of the parts of the scanning optical system, and the distance between the two photodetectors detecting the start and the end of scanning is also different due to assembling accuracy and the like. If an image is deteriorated with the elapse of time, for example, it is preferable to obtain the reference value RefN that acts as a reference for the pixel clock frequency control once again.

The scanning start detection position notified by the synchronization signal SPSYNC may be different in each scanning optical system. Accordingly, it is preferable to start writing an image after a predetermined time from the rise of the synchronization signal SPSYNC, in other words, after a predetermined cycle of the pixel clock PCLK (hereinafter, referred to as "write start offset"), and obtain the write start offset in advance for each scanning optical system.

Figure 35:
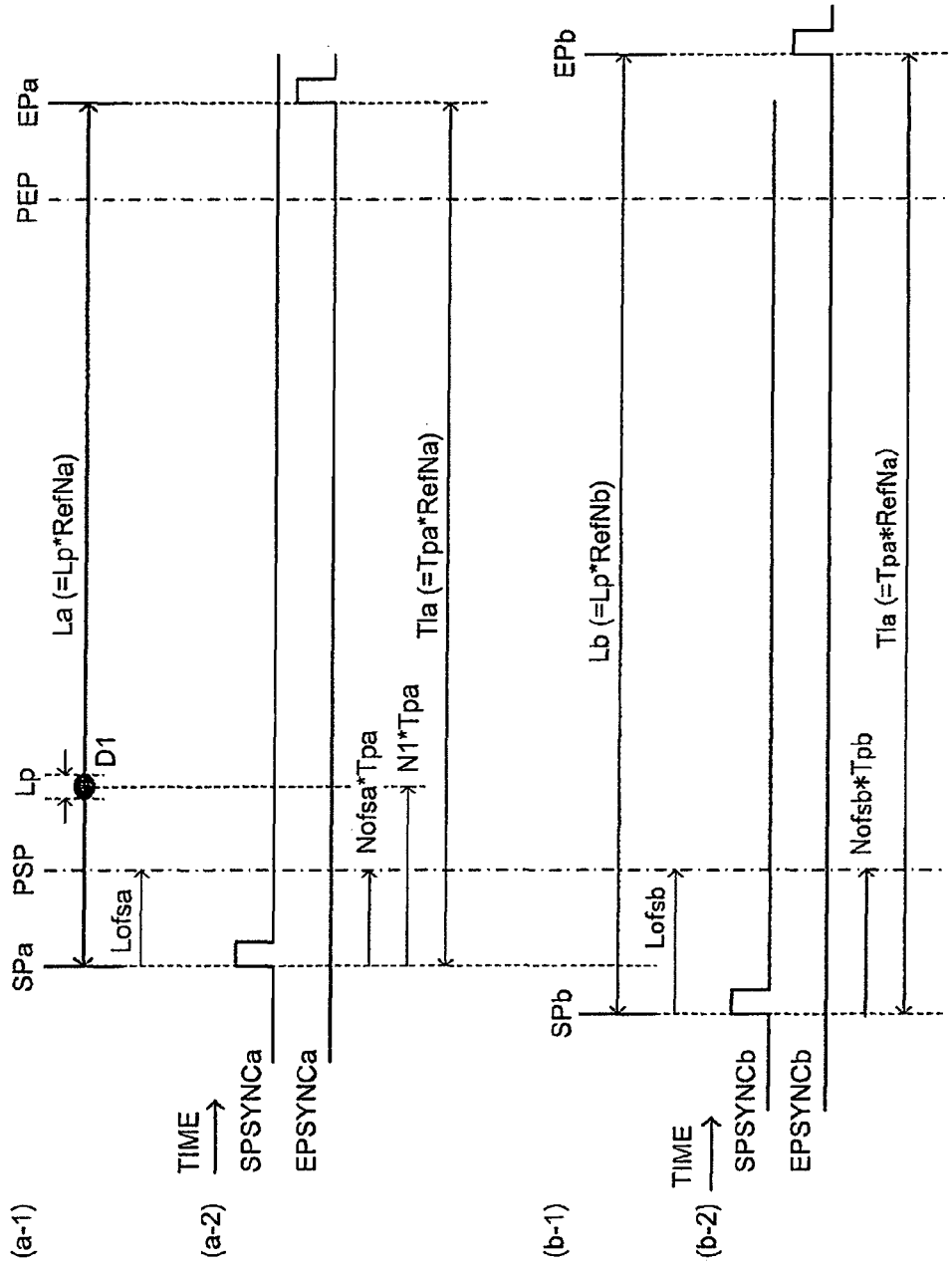
FIG. 35 is a timing chart of relationship between the scanning width and the scanning time of scanning optical systems in the image forming apparatus according to the fifth embodiment.
Figure 36:
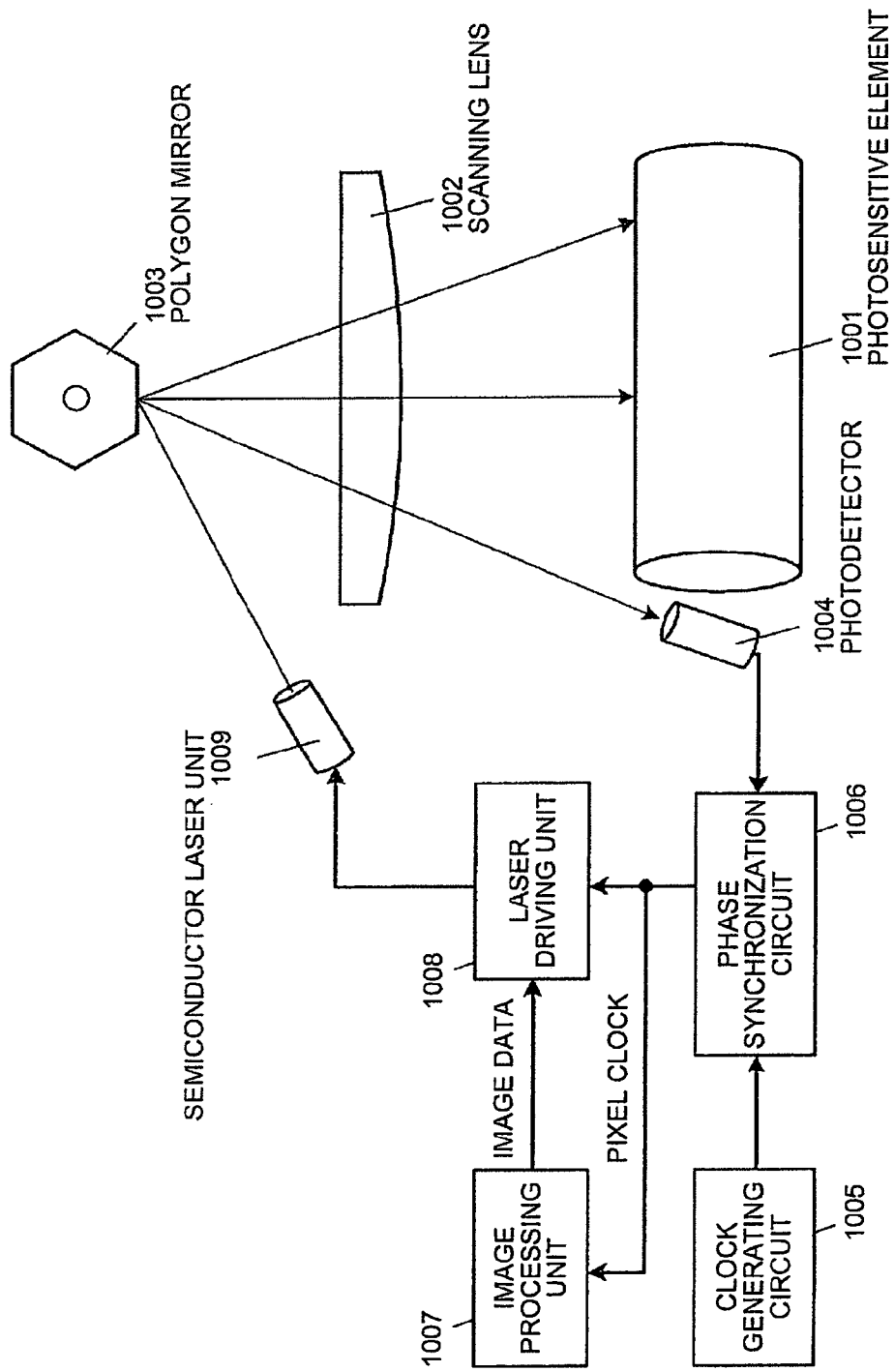
FIG. 36 is a schematic configuration of a conventional image forming apparatus.
Figure 37:
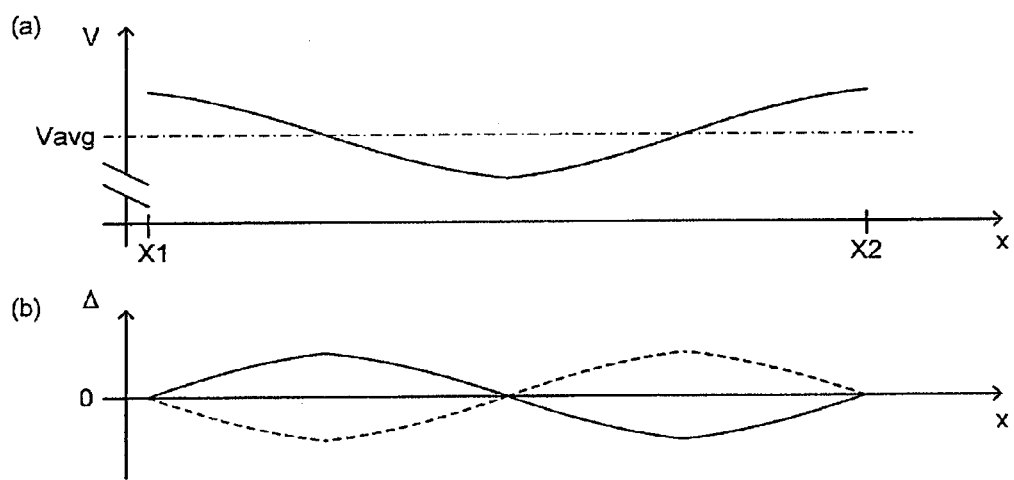
FIG. 37 shows graphs for explaining a nonlinear error according to the conventional image forming apparatus.

FIG. 35 is a timing chart of relationship between the scanning width and the scanning time of the scanning optical systems.

(a-1) is a scanning width of one line of a scanning optical system a. SPa and EPa are positions where the position of the PD 171a used to detect the start and the end of the scan is correlated on the photosensitive element 157a. La is the distance between the Spa and Epa.

If one dot width of an image is Lp, the number of dots in one line is La/Lp=RefNa, and this is set as a reference value RefN. A region where an image is actually formed is a region between PSP and PEP.

(a-2) is scanning time of one line of the scanning optical system a. The synchronization signals SPSYNC and EPSYNC are detected respectively, corresponding to the scanning start position Spa and the scanning end position EPa. The time interval is a scanning time Tla.

The scanning time Tla varies with various factors, as described above. However, because a pixel clock cycle Tpa is controlled so that the relationship of Tpa=Tla/RefNa is satisfied. Accordingly, a write pulse output from SPSYNC after a predetermined PCLK cycle (N1) always forms a dot on the same position on the scanning line (D1). The writing of an actual image starts after Nofsa cycle.

Similarly, (b-1) is a scanning width of one line of the scanning optical system b. If a distance between the start position SPb and the end position EPb of the scanning is Lb, Lb/Lp=RefNb is set as a reference value RefN.

(b-2) is a scanning time of one line of the scanning optical system b. Here, the time interval between the synchronization signals SPSYNC and EPSYNC is a scanning time Tlb. Similarly, the pixel clock cycle Tpb is controlled so that a relationship of Tpb=Tlb/RefNb is satisfied.

By setting a write start offset Nofsb of an image based on the distance difference between the scanning start positions SPa and SPb, the ranges PSP to PEP where an image is actually formed are matched, regardless of the scanning optical systems.

In this manner, the image forming apparatus according to the sixth embodiment can increase the control bandwidth while increasing the speed of the device, and sufficiently suppress high frequency jitter, even if it is the tandem type multi-color image forming apparatus including the photosensitive bodies 157a to 157d.

The invention claimed is:

1. A pixel clock generator comprising:
a high frequency clock generating unit that generates a high frequency clock;
a pixel clock generating unit that generates a pixel clock based on the high frequency clock;
an error calculating unit that detects a first synchronization signal and a second synchronization signal, and calculates an error between a first time period starting from a time when the first synchronization signal is detected until a time when the second synchronization signal is detected and a second time period obtained by integrating a cycle of the pixel clock for a target number of times; and
a frequency setting unit that sets a frequency of the pixel clock to be generated by the pixel clock generating unit based on the error calculated by the error calculating unit, wherein
the frequency setting unit includes
a pixel clock frequency average calculating unit that calculates an average of the frequency of the pixel clock based on the error calculated by the error calculating unit, and a pixel clock frequency offset value calculating unit that determines a reference error value from an error in N-cycles that is a predetermined operation cycle from the error calculated by the error calculating unit, and calculates offset values of frequencies of N pieces of pixel clocks based on a difference between the reference error value and the error, and the frequency setting unit circularly selects the N pieces of offset values calculated by the pixel clock frequency offset value calculating unit, and calculates the frequency of the pixel clock generated by the pixel clock generating unit based on a result obtained by adding selected offset values and the average of the frequency of the pixel clock calculated by the pixel clock frequency average calculating unit.

2. The pixel clock generator according to claim 1, wherein the pixel clock frequency offset value calculating unit determines an average of errors in N-cycles calculated by the error calculating unit as the reference error value.

3. The pixel clock generator according to claim 1, wherein the pixel clock frequency offset value calculating unit determines any one of errors in N-cycles calculated by the error calculating unit as the reference error value.

4. The pixel clock generator according to claim 1, wherein the frequency setting unit further includes a frequency correcting unit that divides the first time period into a plurality of time windows, and corrects the frequency of the pixel clock to be generated by the pixel clock generating unit based on predetermined frequency modulation data for each of the time windows.

5. The pixel clock generator according to claim 1, further comprising:
a stop processing unit that stores the average of the frequency of the pixel clock, the offset values of the frequencies of the N pieces of pixel clocks, and a first error difference pattern that is composed of a difference between the reference error value and each of the N pieces of errors before the pixel clock generator is stopped in a storage medium; and
a start processing unit that sets the average of the frequency of the pixel clock stored in the storage medium as the average calculated by the pixel clock frequency average calculating unit, sets the offset values of the frequencies of the N pieces of pixel clocks as the offset values calculated by the pixel clock frequency offset value calculating unit, obtains a second error difference pattern that is composed of a difference between each of the N pieces of errors calculated by the error calculating unit and the reference error value determined by the error calculating unit, and changes a phase of the operation cycle so that the first error difference pattern and the second error difference pattern come closest.

6. An image forming apparatus that forms an image by driving a light source by a pulse modulation signal obtained by pulse-modulating image data based on a pixel clock scanning a target medium with a light beam output from the light source, the image forming apparatus comprising:

a high frequency clock generating unit that generates a high frequency clock;

a pixel clock generating unit that generates the pixel clock based on the high frequency clock;

an error calculating unit that detects a first synchronization signal corresponding to a scanning start point and a second synchronization signal corresponding to a scanning end point, and calculates an error between a first time period starting from a time when the first synchronization signal is detected until a time when the second synchronization signal is detected and a second time period obtained by integrating a cycle of the pixel clock for a target number of times; and a frequency setting unit that sets a frequency of the pixel clock to be generated by the pixel clock generating unit based on the error calculated by the error calculating unit, wherein the frequency setting unit includes
a pixel clock frequency average calculating unit that calculates an average of the frequency of the pixel clock based on the error calculated by the error calculating unit, and
a pixel clock frequency offset value calculating unit that determines a reference error value from an error in N-cycles that is a predetermined operation cycle from the error calculated by the error calculating unit, and calculates offset values of frequencies of N pieces of pixel clocks based on a difference between the reference error value and the error, and the frequency setting unit circularly selects the N pieces of offset values calculated by the pixel clock frequency offset value calculating unit, and calculates the frequency of the pixel clock generated by the pixel clock generating unit based on a result obtained by adding selected offset values and the average of the frequency of the pixel clock calculated by the pixel clock frequency average calculating unit.

7. The image forming apparatus according to claim 6, wherein the frequency setting unit further includes a frequency correcting unit that divides the first time period into a plurality of time windows, and corrects the frequency of the pixel clock to be generated by the pixel clock generating unit based on predetermined frequency modulation data for each of the time windows.

8. The image forming apparatus according to claim 6, further comprising:
an optical scanner that includes a polygon mirror including a plurality of deflection reflection surfaces provided at a periphery of a rotation axis thereof, and scans the target medium with the light beam incident on the polygon mirror by deflecting the light beam, and
a number N of the offset values calculated by the pixel clock frequency offset value calculating unit is determined to be same as number of the deflection reflection surfaces of the polygon mirror.

* * * * *